(12) United States Patent
Lu et al.

(10) Patent No.: US 11,580,539 B2
(45) Date of Patent: *Feb. 14, 2023

(54) BLOCKCHAIN-BASED TRUSTABLE GUARANTEES

(71) Applicant: ALIPAY (HANGZHOU) INFORMATION TECHNOLOGY CO., LTD., Zhejiang (CN)

(72) Inventors: Xuming Lu, Hangzhou (CN); Hui Zhou, Hangzhou (CN); Guojun Ye, Zhejiang (CN)

(73) Assignee: Alipay (Hangzhou) Information Technology Co., Ltd., Zhejiang (CN)

(*) Notice: Subject to any disclaimer, the term of this patent is extended or adjusted under 35 U.S.C. 154(b) by 0 days.

This patent is subject to a terminal disclaimer.

(21) Appl. No.: 17/480,963

(22) Filed: Sep. 21, 2021

(65) Prior Publication Data
US 2022/0058639 A1  Feb. 24, 2022

Related U.S. Application Data

(63) Continuation of application No. 17/138,505, filed on Dec. 30, 2020, now Pat. No. 11,138,602, which is a
(Continued)

(51) Int. Cl.
*G06Q 20/38* (2012.01)
*G06F 16/23* (2019.01)
(Continued)

(52) U.S. Cl.
CPC ....... *G06Q 20/389* (2013.01); *G06F 16/2379* (2019.01); *H04L 9/008* (2013.01);
(Continued)

(58) Field of Classification Search
CPC .............. G06F 16/2379; G06Q 20/389; H04L 2209/56; H04L 9/008; H04L 9/085;
(Continued)

(56) References Cited

U.S. PATENT DOCUMENTS

| 10,785,036 B2* | 9/2020 | Keuffer ................. H04L 9/3221 |
| 2003/0140007 A1* | 7/2003 | Kramer ................. G06Q 20/12 |
| | | 705/40 |

(Continued)

FOREIGN PATENT DOCUMENTS

| CN | 101512535 | 8/2009 |
| CN | 107392608 | 11/2017 |

(Continued)

OTHER PUBLICATIONS

Zhang et al., "Overview of Blockchain Technology," Computer Engineering, May 2019, 45(5):1-12 (English abstract).

(Continued)

*Primary Examiner* — Gary S Gracia
(74) *Attorney, Agent, or Firm* — Fish & Richardson P.C.

(57) ABSTRACT

Disclosed herein are methods, systems, and apparatus for processing blockchain-based guarantee information. One of the methods includes receiving a first cyphertext of a first digital document specifying a guarantee from a first computing device associated with at least a first guarantor and one or more zero-knowledge proofs (ZKPs) related to one or more values associated with the guarantee, and the first digital document specifies one or more predetermined conditions of executing the guarantee; verifying that the one or more ZKPs are correct; storing the first cyphertext to a blockchain based on performing a consensus algorithm; receiving a first message from a second computing device associated with a beneficiary or a representative of the beneficiary.

20 Claims, 26 Drawing Sheets

Related U.S. Application Data continuation of application No. PCT/CN2020/074243, filed on Feb. 3, 2020.

(51) Int. Cl.
*H04L 9/00* (2022.01)
*H04L 9/08* (2006.01)
*H04L 9/32* (2006.01)

(52) U.S. Cl.
CPC ............ *H04L 9/085* (2013.01); *H04L 9/0894* (2013.01); *H04L 9/3218* (2013.01); *H04L 9/3239* (2013.01); *H04L 9/3247* (2013.01); *H04L 9/3297* (2013.01); *H04L 9/50* (2022.05); *H04L 2209/56* (2013.01)

(58) Field of Classification Search
CPC ... H04L 9/0891; H04L 9/0894; H04L 9/0897; H04L 9/3218; H04L 9/3239; H04L 9/3247; H04L 9/3297; H04L 67/1097; H04L 9/3221; H04L 9/50
See application file for complete search history.

(56) References Cited

U.S. PATENT DOCUMENTS

| | | | | |
|---|---|---|---|---|
| 2005/0144045 | A1* | 6/2005 | Corsi | G06Q 40/08 705/4 |
| 2009/0271618 | A1* | 10/2009 | Camenisch | G06F 21/445 713/155 |
| 2018/0137465 | A1* | 5/2018 | Batra | H04L 67/104 |
| 2018/0218176 | A1* | 8/2018 | Voorhees | G06Q 20/02 |
| 2018/0315026 | A1* | 11/2018 | Kraemer | G06Q 20/383 |
| 2018/0365201 | A1 | 12/2018 | Hunn et al. | |
| 2019/0018887 | A1* | 1/2019 | Madisetti | G06Q 20/06 |
| 2019/0034923 | A1* | 1/2019 | Greco | G06Q 20/389 |
| 2019/0205898 | A1* | 7/2019 | Greco | G06Q 20/389 |
| 2019/0251553 | A1* | 8/2019 | Ma | H04L 9/3247 |
| 2019/0251554 | A1* | 8/2019 | Ma | H04L 9/3247 |
| 2019/0251556 | A1* | 8/2019 | McCormick | G06F 16/25 |
| 2019/0253235 | A1* | 8/2019 | Zhang | H04L 9/3239 |
| 2019/0325044 | A1 | 10/2019 | Gray | |
| 2019/0327078 | A1* | 10/2019 | Zhang | H04L 63/102 |
| 2019/0356650 | A1 | 11/2019 | Leavy et al. | |
| 2020/0052903 | A1* | 2/2020 | Lam | H04L 9/3239 |
| 2020/0127847 | A1* | 4/2020 | Yang | H04L 9/3234 |
| 2020/0153639 | A1* | 5/2020 | Yang | H04L 9/0866 |
| 2020/0311695 | A1* | 10/2020 | Cao | G06Q 20/389 |
| 2020/0322128 | A1* | 10/2020 | Hu | H04L 9/3218 |
| 2020/0322129 | A1* | 10/2020 | Wei | G06F 21/53 |
| 2020/0322182 | A1* | 10/2020 | Anshuman | H04L 12/4679 |
| 2020/0333295 | A1* | 10/2020 | Schiffres | G01N 29/041 |

FOREIGN PATENT DOCUMENTS

| | | |
|---|---|---|
| CN | 108288159 | 7/2018 |
| CN | 108418783 | 8/2018 |
| CN | 108604344 | 9/2018 |
| CN | 109102295 | 12/2018 |
| CN | 109242675 | 1/2019 |
| CN | 109558517 | 4/2019 |
| CN | 109614820 | 4/2019 |
| CN | 109903026 | 6/2019 |
| CN | 110033272 | 7/2019 |
| CN | 110035046 | 7/2019 |
| CN | 110073633 | 7/2019 |
| CN | 110278193 A | 9/2019 |
| CN | 110321735 A | 10/2019 |
| CN | 110383311 | 10/2019 |
| CN | 110419055 | 11/2019 |
| CN | 110428249 | 11/2019 |
| CN | 110428334 | 11/2019 |
| CN | 110546667 | 12/2019 |
| CN | 110650189 | 1/2020 |
| CN | 110692228 | 1/2020 |
| CN | 110795501 | 2/2020 |
| CN | 110915164 | 3/2020 |
| CN | 110995420 | 4/2020 |
| CN | 111095865 | 5/2020 |
| WO | WO 2019072268 | 4/2019 |
| WO | WO 2019228556 | 12/2019 |
| WO | WO 2020015525 A1 | 1/2020 |
| WO | WO 2020258850 | 12/2020 |
| WO | WO 2021000337 | 1/2021 |

OTHER PUBLICATIONS

Ma et al., "An Efficient NIZK Scheme for Privacy-Preserving Transactions Over Account-Model Blockchain," IEEE Transactions on Dependable and Secure Computing, Jan. 24, 2020, 18(2):641-651.
International Preliminary Report on Patentability in International Appln. No. PCT/CN2020/074243, dated July 28, 2022, 5 pages.
U.S. Appl. No. 17/138,398, Lu, filed Dec. 30, 2020.
U.S. Appl. No. 17/138,505, Lu, filed Dec. 30, 2020.
U.S. Appl. No. 17/138,712, Lu, filed Dec. 30, 2020.
U.S. Appl. No. 17/138,730, Lu, filed Dec. 30, 2020.
U.S. Appl. No. 17/138,744, Lu, filed Dec. 30, 2020.
U.S. Appl. No. 17/139,423, Lu, filed Dec. 31, 2020.
U.S. Appl. No. 17/139,443, Lu, filed Dec. 31, 2020.
Crosby et al., "BlockChain Technology: Beyond Bitcoin," Sutardja Center for Entrepreneurship & Technology Technical Report, Oct. 16, 2015, 35 pages.
Extended European Search Report and Written Opinion in European Application No. 20725747.8, dated May 14, 2021, 8 pages.
Goldstein, bconference.kz [online], "Blockchain: From disruptive concept to business ready solution" Jun. 14, 2017, retrieved on Jun. 15, 2021, retrieved from URL<https://bconference.kz/wp-content/uploads/2017/06/microsoft.pdf>, 35 pages.
Nakamoto, "Bitcoin: A Peer-to-Peer Electronic Cash System," www.bitcoin.org, 2005, 9 pages.
PCT International Search Report and Written Opinion in International Application No. PCT/CN2020/074242, dated Nov. 17, 2020, 8 pages.
PCT International Search Report and Written Opinion in International Application No. PCT/CN2020/074243, dated Oct. 30, 2020, 8 pages.
PCT International Search Report and Written Opinion in International Application No. PCT/CN2020/074244, dated Nov. 17, 2020, 7 pages.
PCT International Search Report and Written Opinion in International Application No. PCT/CN2020/074245, dated Nov. 13, 2020, 8 pages.
PCT International Search Report and Written Opinion in International Application No. PCT/CN2020/074246, dated Nov. 17, 2020, 8 pages.
PCT International Search Report and Written Opinion in International Application No. PCT/CN2020/074247, dated Nov. 18, 2020, 7 pages.
PCT International Search Report and Written Opinion in International Application No. PCT/CN2020/074248, dated Nov. 17, 2020, 7 pages.
Wang et al., "Designing confidentiality-preserving Blockchain-based transaction processing systems," International Journal of Accounting Information Systems, Sep. 2018, 30:1-18.
Westpac.com.au [online], "Distributed Ledger Technology and Bank Guarantees for Commercial Property Leasing," Jul. 1, 2017, retrieved on Jun. 15, 2021, retrieved from URL<https://www.westpac.com.au/content/dam/public/wbc/documents/pdf/aw/media/WhitePaper_Blockchain_PoC_for_Bank_Guarantees.pdf>.
Wikipedia.org [online], "Privacy and blockchain," Dec. 23, 2019, retrieved on Jun. 15, 2021, retrieved from URL<https://en.wikipedia.org/w/index.php?title=Privacy_and_blockchain&oldid=932132324>, 8 pages.

\* cited by examiner

```
// standby letters of credit
table Sblc {
    sblcNo:string;
    sblcType:string;
    issueBankCode:string;
    beneficiaryBankCode:string;
    maxAggregateSum:Balance;
    maxAggregateSuminWord:string;
    principal:string;
    borrower:string;
    expiryDatetime: ulong = 0; //expiry datetime, utc time
    effectiveDatetime: ulong = 0; // sblc effective datetime ,utc time
    remainAggregateSum:Balance;
    totalLoanAmount:Balance;
    actionNolist: [SblcActionNo];
    status: string; }
```

FIG. 5

BLOCKCHAIN-BASED TRUSTABLE GUARANTEES

CROSS-REFERENCE TO RELATED APPLICATIONS

This application is a continuation of U.S. patent application Ser. No. 17/138,505, now allowed, filed on Dec. 30, 2020, which is a continuation of PCT Application No. PCT/CN2020/074243, filed on Feb. 3, 2020, and each application is hereby incorporated by reference in its entirety.

TECHNICAL FIELD

This specification relates to providing trustable guarantees based on blockchain technology.

BACKGROUND

Distributed ledger systems (DLSs), which can also be referred to as consensus networks, and/or blockchain networks, enable participating entities to securely, and immutably store data. DLSs are commonly referred to as blockchain networks without referencing any particular user case. Examples of types of blockchain networks can include public blockchain networks, private blockchain networks, and consortium blockchain networks. A consortium blockchain network is provided for a select group of entities, which control the consensus process, and includes an access control layer.

Digital networks have enabled people around the world to find information and interact with each other conveniently and efficiently. For example, social media platforms allow people to easily share messages, photos, and videos with friends and colleagues. Online shopping web sites allow consumers to easily find information on a variety of products and send payments electronically to purchase products from businesses all over the world. News web sites provide users with up-to-date information about events happening around the world. Media platforms provide a large collection of music and movies for users to download or stream online. Users can use various kinds of financial services online and international transactions can be more easily made. Ride hailing platforms allow riders to easily find and pay for transportation using mobile phones. As more people are connected to the Internet and more transactions are conducted digitally, the number of fraudulent online activities and disputes between parties also increase.

Traditional secure messaging network such as SWIFT normally supports peer to peer messages. The syntax of the messages is designed for the two parties involved to ensure data security and privacy. However, due to different international technical or financial regulations, messages can pass through multiple nodes before reaching their final destination, making them time-consuming, costly and lacking transparency. When more than two parties are involved, the routing of messages between multiple parties became increasingly inefficient under the peer to peer infrastructure.

It would be desirable to have a unified platform that can provide transparent, immutable, and verifiable messaging records, while ensuring data privacy of the parties involved.

SUMMARY

Described embodiments of the subject matter can include one or more features, alone or in combination.

For example, in one embodiment, a computer-implemented method performed by a computing system associated with at least one guarantor for processing guarantee information to be stored on a blockchain, the method comprises: receiving, from a computing device associated with an applicant, an application of a guarantee made by at least a first guarantor to a beneficiary, wherein the application includes information associated with an identity of the applicant, an identity of the beneficiary, and one or more predetermined conditions of executing the guarantee; generating a digital version of the guarantee based on the information included in the application; encrypting the digital version to generate cyphertext of the guarantee; generating one or more zero-knowledge proofs (ZKPs) related to one or more values associated with the guarantee; and sending the cyphertext of the guarantee and the one or more ZKPs to a blockchain network to store the cyphertext of the guarantee on a blockchain, wherein the cyphertext of the guarantee is stored on the blockchain through consensus of blockchain nodes of the blockchain network after the one or more ZKPs are successfully verified by the blockchain nodes.

In another embodiment, a computer-implemented method performed by a blockchain node of a blockchain network comprises: receiving a cyphertext of a digital document specifying a guarantee from a first computing device associated with a first guarantor and one or more ZKPs related to one or more values associated with the guarantee, wherein the guarantee is made by the first guarantor to a beneficiary, and the digital document specifies one or more predetermined conditions of executing the guarantee; verifying that the one or more ZKPs are correct; upon verifying that the one or more ZKPs are correct, storing the cyphertext to a blockchain based on performing a consensus algorithm; receiving a first message from a second computing device associated with a beneficiary or a representative of the beneficiary, the first message including an acceptance of the guarantee by the beneficiary; and updating a status of the guarantee to indicate that the guarantee has been accepted by the beneficiary.

In another embodiment, a computer-implemented method performed by a blockchain node of a blockchain network comprises: receiving a cyphertext of a digital document specifying a guarantee and one or more ZKPs related to one or more values associated with the guarantee, wherein the guarantee is made by at least a first guarantor to a beneficiary, and the digital document specifies one or more predetermined conditions of executing the guarantee; verifying the one or more ZKPs; upon successfully verifying the one or more ZKPs, storing the cyphertext to a blockchain based on performing a consensus algorithm; receiving a drawdown request of the guarantee from a first computing device associated with the beneficiary or a representative of the beneficiary; storing the drawdown request to the blockchain based on performing a consensus algorithm; delivering a first message about the drawdown request to a second computing device associated with the first guarantor; receiving a second message from the second computing device associated with the first guarantor indicating that the first guarantor agrees to make a payment to the beneficiary according to the guarantee; updating a status of the guarantee stored in the blockchain to indicate that a drawdown request of the guarantee has been processed by the first guarantor; delivering a third message to the first computing device associated with the beneficiary or the representative of the beneficiary indicating that the first guarantor agrees to make the payment to the beneficiary according to the guarantee; receiving a fourth message from the first computing device associated with the beneficiary or the representative of the beneficiary indicating that the payment from the first guarantor has been received by the beneficiary; and updating a status of the guarantee stored in the blockchain to indicate that the payment of the guarantee has been received by the beneficiary.

In another embodiment, a computer-implemented method performed by a blockchain node of a blockchain network comprises: receiving a cyphertext of a digital document specifying a guarantee and one or more ZKPs related to one or more values associated with the guarantee, wherein the guarantee is made by at least a first guarantor to a beneficiary, and the digital document specifies one or more predetermined conditions of executing the guarantee; verifying the one or more ZKPs; upon successfully verifying the one or more ZKPs, storing the cyphertext to a blockchain based on performing a consensus algorithm; receiving a first message from a first computing device associated with the beneficiary or a representative of the beneficiary indicating there is no outstanding claim for the guarantee; sending a second message to a second computing device associated with the first guarantor to confirm that the first guarantor is discharged from undertaking payment under the guarantee; receiving a third message from the second computing device associated with the first guarantor requesting a status of the guarantee to be changed to expired; and updating the status of the guarantee stored in the blockchain to indicate that the guarantee has expired.

In another embodiment, a computer-implemented method performed by a blockchain node of a blockchain network comprises: receiving a first cyphertext of a first digital document specifying a guarantee from a first computing device associated with at least a first guarantor and one or more ZKPs related to one or more values associated with the guarantee, wherein the guarantee is made by the at least a first guarantor to a beneficiary, and the first digital document specifies one or more predetermined conditions of executing the guarantee; verifying that the one or more ZKPs are correct; upon verifying that the one or more ZKPs are correct, storing the first cyphertext to a blockchain based on performing a consensus algorithm; receiving a first message from a second computing device associated with a beneficiary or a representative of the beneficiary, the first message including a request to modify the guarantee; sending a second message about the request to modify the guarantee to the first computing device; and receiving from the first computing device a second cyphertext of a second digital document specifying the guarantee, the second digital document representing a modified version of the first digital document in which the modification was made based on the request.

In another embodiment, a computer-implemented method performed by a blockchain node of a blockchain network comprises: receiving a cyphertext of a digital document specifying a guarantee from a first computing device associated with at least a first guarantor and one or more ZKPs related to one or more values associated with the guarantee, wherein the guarantee is made by the at least a first guarantor to a beneficiary, and the digital document specifies one or more predetermined conditions of executing the guarantee; verifying that the one or more ZKPs are correct; upon verifying that the one or more ZKPs are correct, storing the first cyphertext to a blockchain based on performing a consensus algorithm; receiving a first message from the first computing device associated with the at least a first guarantor, the first message including a request to cancel the guarantee; storing the request to cancel the guarantee in the blockchain; sending a second message to a second computing device associated with the beneficiary or a representative of the beneficiary, wherein the second message includes the request to cancel the guarantee; receiving a third message from the second computing device associated with the beneficiary or the representative of the beneficiary, wherein the third message includes a confirmation that the beneficiary accepts cancellation of the guarantee; and updating a status of the guarantee stored in the blockchain to indicate that the guarantee has been canceled.

In another embodiment, a computer-implemented method performed by a blockchain node of a blockchain network comprises: receiving, by a blockchain node of a first blockchain network, a cross-chain request for relaying a cyphertext of a digital document to a second blockchain network, wherein the cross-chain request is sent from a first computing device associated with a first guarantor, the digital document specifies a guarantee from the first guarantor and one or more predetermined conditions of executing the guarantee, and wherein the guarantee is made by the first guarantor to a beneficiary, and the digital document specifies one or more predetermined conditions of executing the guarantee; storing the cross-chain request and the cyphertext to a first blockchain associated with the first blockchain network based on performing a consensus algorithm; receiving a message from a second computing device for relaying information between the first blockchain network and the second blockchain network, the message includes a confirmation that the guarantee is accepted by the beneficiary and stored on a second blockchain associated with the second blockchain network; and updating a status of the guarantee to indicate that the guarantee has been voided on the first blockchain.

In some embodiments, these general and specific aspects may be implemented using a system, a method, or a computer program, or any combination of systems, methods, and computer programs. The foregoing and other described embodiments can each, optionally, include one or more of the following aspects:

In some embodiments, the guarantee is in a form of a standby letter of credit (SBLC). In some embodiments, the guarantee specifies that the guarantor shall pay the beneficiary a predetermined amount when the one or more predetermined conditions of executing the guarantee are met.

In some embodiments, the guarantor is an offshore bank that serves the applicant, and the predetermined amount is paid to the beneficiary through an onshore bank that serves the beneficiary when the one or more predetermined conditions are met.

In some embodiments, the application further includes information that specifies an identity of the onshore bank.

In some embodiments, the application further includes information that proves the applicant is capable of paying off the predetermined amount in case of the applicant is in default of the SBLC.

In some embodiments, the identity of the applicant includes one or more of the applicant's name, address, phone number, e-mail address, and type of business.

In some embodiments, the identity of the beneficiary includes one or more of the beneficiary's name, address, phone number, e-mail address, and type of business.

In some embodiments, the one or more predetermined conditions include one or more of default conditions, amendment conditions, cancelation conditions, effective date, and expiration date.

In some embodiments, at least one of the one or more ZKPs is generated based on homomorphic encryption.

In some embodiments, the one or more ZKPs includes one or more of a range proof and a zero test.

In some embodiments, an encryption key for encrypting the digital version is derived based on a linear secret sharing scheme.

In some embodiments, the guarantee is made by the first guarantor and a second guarantor to the beneficiary, the guarantee is in the form of a SBLC, and the guarantee specifies that the first guarantor and the second guarantor shall pay the beneficiary a predetermined amount when the one or more predetermined conditions of executing the guarantee are met.

In some embodiments, the first guarantor is a first bank that serves the applicant, the second guarantor is a second bank that serves the applicant, and the application further includes information that proves the applicant has sufficient funds in the first bank and the second bank to pay off the predetermined amount in case the applicant is in default of the SBLC.

It is appreciated that methods in accordance with this specification may include any combination of the aspects and features described herein. That is, methods in accordance with this specification are not limited to the combinations of aspects and features specifically described herein, but also include any combination of the aspects and features provided.

The details of one or more embodiments of this specification are set forth in the accompanying drawings and the description below. Other features and advantages of this specification will be apparent from the description and drawings, and from the claims.

BRIEF DESCRIPTION OF THE DRAWINGS

FIG. 5 is an example of source code of a standby letter of credit in accordance with embodiments of this specification.

Like reference numbers and designations in the various drawings indicate like elements.

DETAILED DESCRIPTION

Figure 1:
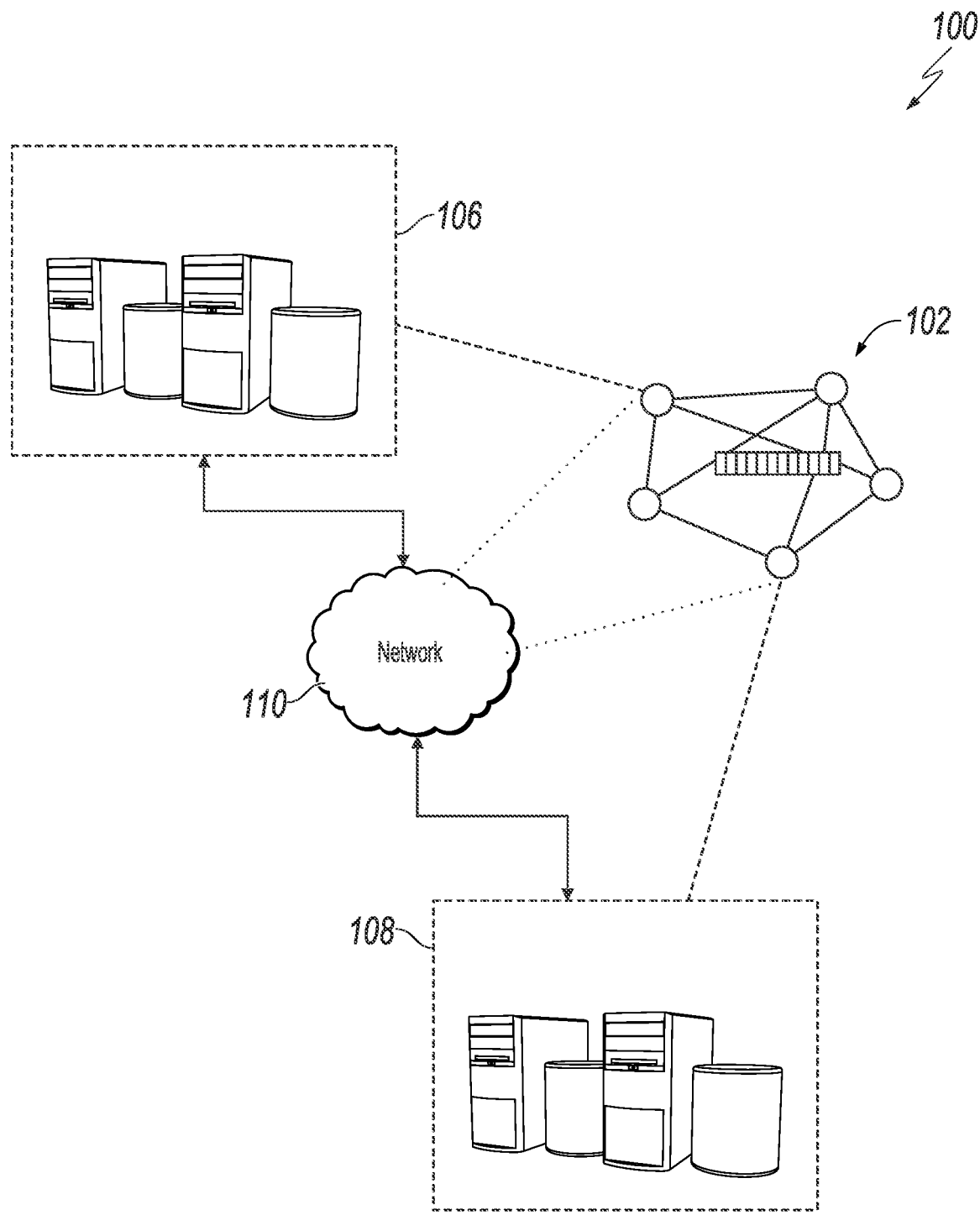
FIG. 1 is a diagram illustrating an example of an environment that can be used to execute embodiments of this specification.

This specification describes technologies for processing guarantees based on a blockchain network. These technologies generally involve receiving, from a computing device associated with an applicant, an application of a guarantee made by at least a first guarantor to a beneficiary, wherein the application includes information associated with an identity of the applicant, an identity of the beneficiary, and one or more predetermined conditions of executing the guarantee; generating a digital version of the guarantee based on the information included in the application; encrypting the digital version to generate cyphertext of the guarantee; generating one or more zero-knowledge proofs (ZKPs) related to one or more values associated with the guarantee; and sending the cyphertext of the guarantee and the one or more ZKPs to a blockchain network to store the cyphertext of the guarantee on a blockchain, wherein the cyphertext of the guarantee is stored on the blockchain through consensus of blockchain nodes of the blockchain network after the one or more ZKPs are successfully verified by the blockchain nodes.

This specification also describes technologies for a blockchain-based letter of credit issuing process. These technologies generally involve receiving a cyphertext of a digital document specifying a guarantee from a first computing device associated with a first guarantor and one or more ZKPs related to one or more values associated with the guarantee, wherein the guarantee is made by the first guarantor to a beneficiary, and the digital document specifies one or more predetermined conditions of executing the guarantee; verifying that the one or more ZKPs are correct; upon verifying that the one or more ZKPs are correct, storing the cyphertext to a blockchain based on performing a consensus algorithm; receiving a first message from a second computing device associated with a beneficiary or a representative of the beneficiary, the first message including an acceptance of the guarantee by the beneficiary; and updating a status of the guarantee to indicate that the guarantee has been accepted by the beneficiary.

This specification also describes technologies for a blockchain-based letter of credit drawdown process. These technologies generally involve receiving a cyphertext of a digital document specifying a guarantee and one or more ZKPs related to one or more values associated with the guarantee, wherein the guarantee is made by at least a first guarantor to a beneficiary, and the digital document specifies one or more predetermined conditions of executing the guarantee; verifying the one or more ZKPs; upon successfully verifying the one or more ZKPs, storing the cyphertext to a blockchain based on performing a consensus algorithm; receiving a drawdown request of the guarantee from a first computing device associated with the beneficiary or a representative of the beneficiary; storing the drawdown request to the blockchain based on performing a consensus algorithm; delivering a first message about the drawdown request to a second computing device associated with the first guarantor; receiving a second message from the second computing device associated with the first guarantor indicating that the first guarantor agrees to make a payment to the beneficiary according to the guarantee; updating a status of the guarantee stored in the blockchain to indicate that a drawdown request of the guarantee has been processed by the first guarantor; delivering a third message to the first computing device associated with the beneficiary or the representative of the beneficiary indicating that the first guarantor agrees to make the payment to the beneficiary according to the guarantee; receiving a fourth message from the first computing device associated with the beneficiary or the representative of the beneficiary indicating that the payment from the first guarantor has been received by the beneficiary; and updating a status of the guarantee stored in the blockchain to indicate that the payment of the guarantee has been received by the beneficiary.

This specification also describes technologies for a blockchain-based letter of credit expiration process. These technologies generally involve receiving a cyphertext of a digital document specifying a guarantee and one or more ZKPs related to one or more values associated with the guarantee, wherein the guarantee is made by at least a first guarantor to a beneficiary, and the digital document specifies one or more predetermined conditions of executing the guarantee; verifying the one or more ZKPs; upon successfully verifying the one or more ZKPs, storing the cyphertext to a blockchain based on performing a consensus algorithm; receiving a first message from a first computing device associated with the beneficiary or a representative of the beneficiary indicating there is no outstanding claim for the guarantee; sending a second message to a second computing device associated with the first guarantor to confirm that the first guarantor is discharged from undertaking payment under the guarantee; receiving a third message from the second computing device associated with the first guarantor requesting a status of the guarantee to be changed to expired; and updating the status of the guarantee stored in the blockchain to indicate that the guarantee has expired.

This specification also describes technologies for a blockchain-based letter of credit amendment process. These technologies generally involve receiving a first cyphertext of a first digital document specifying a guarantee from a first computing device associated with at least a first guarantor and one or more ZKPs related to one or more values associated with the guarantee, wherein the guarantee is made by the at least a first guarantor to a beneficiary, and the first digital document specifies one or more predetermined conditions of executing the guarantee; verifying that the one or more ZKPs are correct; upon verifying that the one or more ZKPs are correct, storing the first cyphertext to a blockchain based on performing a consensus algorithm; receiving a first message from a second computing device associated with a beneficiary or a representative of the beneficiary, the first message including a request to modify the guarantee; sending a second message about the request to modify the guarantee to the first computing device; and receiving from the first computing device a second cyphertext of a second digital document specifying the guarantee, the second digital document representing a modified version of the first digital document in which the modification was made based on the request.

This specification also describes technologies for a blockchain-based letter of credit cancellation process. These technologies generally involve receiving a cyphertext of a digital document specifying a guarantee from a first computing device associated with at least a first guarantor and one or more ZKPs related to one or more values associated with the guarantee, wherein the guarantee is made by the at least a first guarantor to a beneficiary, and the digital document specifies one or more predetermined conditions of executing the guarantee; verifying that the one or more ZKPs are correct; upon verifying that the one or more ZKPs are correct, storing the first cyphertext to a blockchain based on performing a consensus algorithm; receiving a first message from the first computing device associated with the at least a first guarantor, the first message including a request to cancel the guarantee; storing the request to cancel the guarantee in the blockchain; sending a second message to a second computing device associated with the beneficiary or a representative of the beneficiary, wherein the second message includes the request to cancel the guarantee; receiving a third message from the second computing device associated with the beneficiary or the representative of the beneficiary, wherein the third message includes a confirmation that the beneficiary accepts cancellation of the guarantee; and updating a status of the guarantee stored in the blockchain to indicate that the guarantee has been canceled.

This specification also describes technologies for a SBLC issuing process based on cross-chain technology. These technologies generally involve receiving, by a blockchain node of a first blockchain network, a cross-chain request for relaying a cyphertext of a digital document to a second blockchain network, wherein the cross-chain request is sent from a first computing device associated with a first guarantor, the digital document specifies a guarantee from the first guarantor and one or more predetermined conditions of executing the guarantee, and wherein the guarantee is made by the first guarantor to a beneficiary, and the digital document specifies one or more predetermined conditions of executing the guarantee; storing the cross-chain request and the cyphertext to a first blockchain associated with the first blockchain network based on performing a consensus algorithm; receiving a message from a second computing device for relaying information between the first blockchain network and the second blockchain network, the message includes a confirmation that the guarantee is accepted by the beneficiary and stored on a second blockchain associated with the second blockchain network; and updating a status of the guarantee to indicate that the guarantee has been voided on the first blockchain.

The techniques described in this specification produce several technical effects. In some embodiments, guarantee services can be provided by a plurality of guarantors. The entire lifecycle of the services between the guarantors can be recorded on a blockchain. For example, the blockchain can store an immutable and transparent chain-of-record of interactions between the guarantors. Because the records on the blockchain are reached through consensus, they can be easily verified and trusted by all blockchain nodes. As compared to peer to peer encrypted communications between two parties, the use of blockchain technology improves efficiency of secured transactions when more than two parties are involved.

In some embodiments, guarantees can be time sensitive. For example, disputes on time may arise due to timing of cancellation or expiration of an SBLC, especially when the guarantors include onshore and offshore banks located in different time zones. The use of blockchain can provide trusted time for each interaction, such that potential disputes on time can be alleviated.

In some embodiments, each party involved in a transaction associated with the guarantee services can embed a unique identification (ID) that identifies its identity. The party can also add its digital signature when sending messages through the blockchain network. As such, the identity of the party can be verified and trusted. The unique ID can also be used to trace all transactions on the blockchain performed by the party.

In some embodiments, the guarantees to be recorded on the blockchain can be encrypted. The encryption keys can be generated and shared among the parties involved in the related transactions. The guarantors can also provide zero knowledge proofs (ZKPs) to consensus nodes of the blockchain network. The ZKPs can be used by the consensus nodes to verify whether the values in the guarantee are applicable to valid transactions (e.g., whether the values are within certain reasonable range) without knowing the actual values. The consensus nodes only perform consensus after the ZKPs are verified. As such, privacy and security of the content of the guarantees recorded on the blockchain can be ensured.

In some embodiments, data privacy of the guarantees can further be protected based on using the trusted execution environment (TEE) technology. The TEE serves as an isolated and trusted computing environment that can be integrated in the blockchain nodes of the blockchain network. The TEE processes plaintext of the guarantee content and outputs cyphertext of the content. Using the TEE technology, the guarantee can be easily updated inside the TEE without revealing any content or updates. Moreover, the output of the TEE is encrypted and trusted by all blockchain nodes of the blockchain network, hence can be efficiently stored to the blockchain after the blockchain nodes reach consensus.

To provide further context for embodiments of this specification, and as introduced above, distributed ledger systems (DLSs), which can also be referred to as consensus networks (e.g., made up of peer-to-peer nodes), and blockchain networks, enable participating entities to securely, and immutably conduct transactions, and store data. Although the term blockchain is generally associated with particular networks, and/or use cases, blockchain is used herein to generally refer to a DLS without reference to any particular use case.

A blockchain is a data structure that stores transactions in a way that the transactions are immutable. Thus, transactions recorded on a blockchain are reliable and trustworthy. A blockchain includes one or more blocks. Each block in the chain is linked to a previous block immediately before it in the chain by including a cryptographic hash of the previous block. Each block also includes a timestamp, its own cryptographic hash, and one or more transactions. The transactions, which have already been verified by the nodes of the blockchain network, are hashed and encoded into a Merkle tree. A Merkle tree is a data structure in which data at the leaf nodes of the tree is hashed, and all hashes in each branch of the tree are concatenated at the root of the branch. This process continues up the tree to the root of the entire tree, which stores a hash that is representative of all data in the tree. A hash purporting to be of a transaction stored in the tree can be quickly verified by determining whether it is consistent with the structure of the tree.

Whereas a blockchain is a decentralized or at least partially decentralized data structure for storing transactions, a blockchain network is a network of computing nodes that manage, update, and maintain one or more blockchains by broadcasting, verifying and validating transactions, etc. As introduced above, a blockchain network can be provided as a public blockchain network, a private blockchain network, or a consortium blockchain network. Embodiments of this specification are described in further detail herein with reference to a consortium blockchain network. It is contemplated, however, that embodiments of this specification can be realized in any appropriate type of blockchain network.

In general, a consortium blockchain network is private among the participating entities. In a consortium blockchain network, the consensus process is controlled by an authorized set of nodes, which can be referred to as consensus nodes, one or more consensus nodes being operated by a respective entity (e.g., a financial institution, insurance company). For example, a consortium of ten (10) entities (e.g., financial institutions, insurance companies) can operate a consortium blockchain network, each of which operates at least one node in the consortium blockchain network.

In some examples, within a consortium blockchain network, a global blockchain is provided as a blockchain that is replicated across all nodes. That is, all consensus nodes are in perfect state consensus with respect to the global blockchain. To achieve consensus (e.g., agreement to the addition of a block to a blockchain), a consensus protocol is implemented within the consortium blockchain network. For example, the consortium blockchain network can implement a practical Byzantine fault tolerance (PBFT) consensus, described in further detail below.

FIG. 1 is a diagram illustrating an example of an environment 100 that can be used to execute embodiments of this specification. In some examples, the environment 100 enables entities to participate in a consortium blockchain network 102. The environment 100 includes computing systems 106, 108, and a network 110. In some examples, the network 110 includes a local area network (LAN), wide area network (WAN), the Internet, or a combination thereof, and connects web sites, user devices (e.g., computing devices), and back-end systems. In some examples, the network 110 can be accessed over a wired and/or a wireless communications link. In some examples, the network 110 enables communication with, and within the consortium blockchain network 102. In general, the network 110 represents one or more communication networks. In some cases, the computing systems 106, 108 can be nodes of a cloud computing system (not shown), or each of the computing systems 106, 108 can be a separate cloud computing system including a number of computers interconnected by a network and functioning as a distributed processing system.

In the depicted example, the computing systems 106, 108 can each include any appropriate computing device that enables participation as a node in the consortium blockchain network 102. Examples of computing devices include, without limitation, a server, a desktop computer, a laptop computer, a tablet computing device, and a smartphone. In some examples, the computing systems 106, 108 host one or more computer-implemented services for interacting with the consortium blockchain network 102. For example, the computing system 106 can host computer-implemented services of a first entity (e.g., user A), such as a transaction management system that the first entity uses to manage its transactions with one or more other entities (e.g., other users). The computing system 108 can host computer-implemented services of a second entity (e.g., user B), such as a transaction management system that the second entity uses to manage its transactions with one or more other entities (e.g., other users). In the example of FIG. 1, the consortium blockchain network 102 is represented as a peer-to-peer network of nodes, and the computing systems 106, 108 provide nodes of the first entity, and second entity respectively, which participate in the consortium blockchain network 102.

Figure 2:
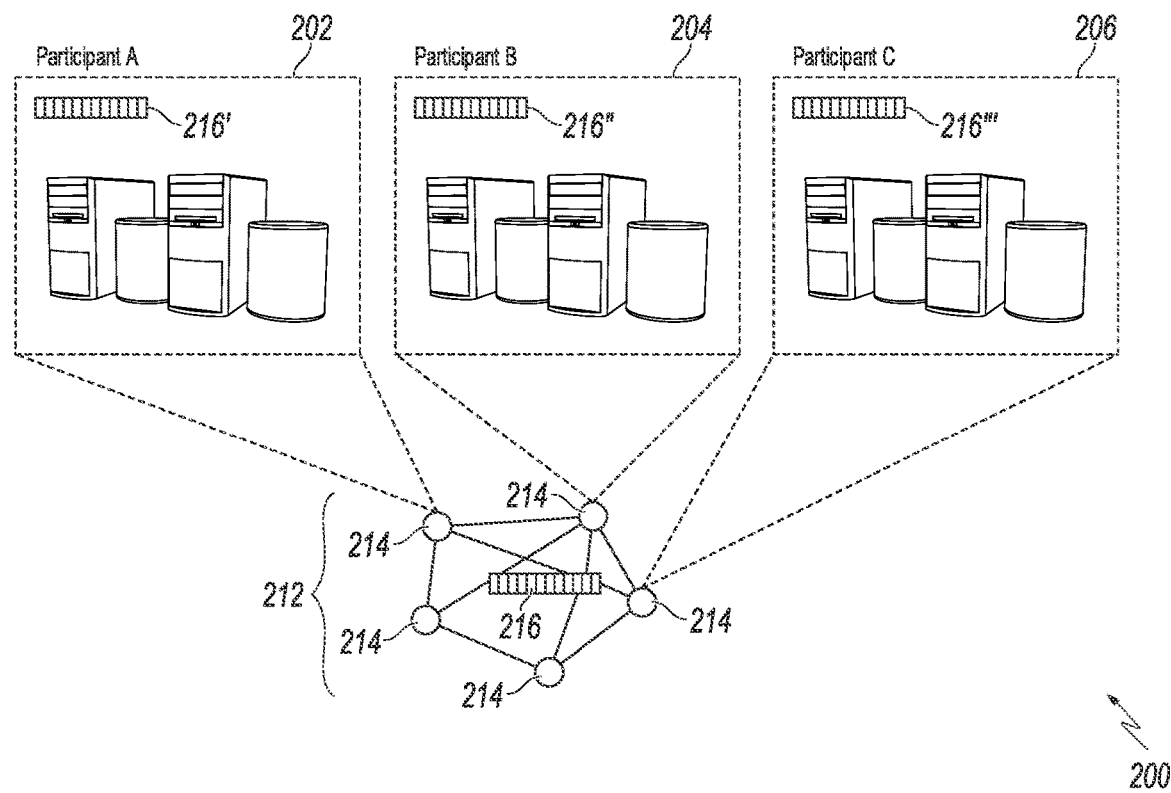
FIG. 2 is a diagram illustrating an example of an architecture in accordance with embodiments of this specification.

FIG. 2 depicts an example of an architecture 200 in accordance with embodiments of this specification. The example conceptual architecture 200 includes participant systems 202, 204, 206 that correspond to Participant A, Participant B, and Participant C, respectively. Each participant (e.g., user, enterprise) participates in a blockchain network 212 provided as a peer-to-peer network including a plurality of nodes 214, at least some of which immutably record information in a blockchain 216. Although a single blockchain 216 is schematically depicted within the blockchain network 212, multiple copies of the blockchain 216 are provided, and are maintained across the blockchain network 212, as described in further detail herein.

In the depicted example, each participant system 202, 204, 206 is provided by, or on behalf of Participant A, Participant B, and Participant C, respectively, and functions as a respective node 214 within the blockchain network. As used herein, a node generally refers to an individual system (e.g., computer, server) that is connected to the blockchain network 212, and enables a respective participant to participate in the blockchain network. In the example of FIG. 2, a participant corresponds to each node 214. It is contemplated, however, that a participant can operate multiple nodes 214 within the blockchain network 212, and/or multiple participants can share a node 214. In some examples, the participant systems 202, 204, 206 communicate with, or through the blockchain network 212 using a protocol (e.g., hypertext transfer protocol secure (HTTPS)), and/or using remote procedure calls (RPCs).

Nodes 214 can have varying degrees of participation within the blockchain network 212. For example, some nodes 214 can participate in the consensus process (e.g., as miner nodes that add blocks to the blockchain 216), while other nodes 214 do not participate in the consensus process. As another example, some nodes 214 store a complete copy of the blockchain 216, while other nodes 214 only store copies of portions of the blockchain 216. For example, data access privileges can limit the blockchain data that a respective participant stores within its respective system. In the example of FIG. 2, the participant systems 202, 204, and 206 store respective, complete copies 216', 216'', and 216''' of the blockchain 216.

A blockchain (e.g., the blockchain 216 of FIG. 2) is made up of a chain of blocks, each block storing data. Examples of data include transaction data representative of a transaction between two or more participants. While transactions are used herein by way of non-limiting example, it is contemplated that any appropriate data can be stored in a blockchain (e.g., documents, images, videos, audio). Examples of a transaction can include, without limitation, exchanges of something of value (e.g., assets, products, services, currency). The transaction data is immutably stored within the blockchain. That is, the transaction data cannot be changed.

Before storing in a block, the transaction data is hashed. Hashing is a process of transforming the transaction data (provided as string data) into a fixed-length hash value (also provided as string data). It is not possible to un-hash the hash value to obtain the transaction data. Hashing ensures that even a slight change in the transaction data results in a completely different hash value. Further, and as noted above, the hash value is of fixed length. That is, no matter the size of the transaction data the length of the hash value is fixed. Hashing includes processing the transaction data through a hash function to generate the hash value. An example of a hash function includes, without limitation, the secure hash algorithm (SHA)-256, which outputs 256-bit hash values.

Transaction data of multiple transactions are hashed and stored in a block. For example, hash values of two transactions are provided, and are themselves hashed to provide another hash. This process is repeated until, for all transactions to be stored in a block, a single hash value is provided. This hash value is referred to as a Merkle root hash, and is stored in a header of the block. A change in any of the transactions will result in change in its hash value, and ultimately, a change in the Merkle root hash.

Blocks are added to the blockchain through a consensus protocol. Multiple nodes within the blockchain network participate in the consensus protocol, and perform work to have a block added to the blockchain. Such nodes are referred to as consensus nodes. PBFT, introduced above, is used as a non-limiting example of a consensus protocol. The consensus nodes execute the consensus protocol to add transactions to the blockchain, and update the overall state of the blockchain network.

In further detail, the consensus node generates a block header, hashes all of the transactions in the block, and combines the hash value in pairs to generate further hash values until a single hash value is provided for all transactions in the block (the Merkle root hash). This hash is added to the block header. The consensus node also determines the hash value of the most recent block in the blockchain (i.e., the last block added to the blockchain). The consensus node also adds a nonce value, and a timestamp to the block header.

In general, PBFT provides a practical Byzantine state machine replication that tolerates Byzantine faults (e.g., malfunctioning nodes, malicious nodes). This is achieved in PBFT by assuming that faults will occur (e.g., assuming the existence of independent node failures, and/or manipulated messages sent by consensus nodes). In PBFT, the consensus nodes are provided in a sequence that includes a primary consensus node, and backup consensus nodes. The primary consensus node is periodically changed. Transactions are added to the blockchain by all consensus nodes within the blockchain network reaching an agreement as to the world state of the blockchain network. In this process, messages are transmitted between consensus nodes, and each consensus nodes proves that a message is received from a specified peer node, and verifies that the message was not modified during transmission.

In PBFT, the consensus protocol is provided in multiple phases with all consensus nodes beginning in the same state. To begin, a client sends a request to the primary consensus node to invoke a service operation (e.g., execute a transaction within the blockchain network). In response to receiving the request, the primary consensus node multicasts the request to the backup consensus nodes. The backup consensus nodes execute the request, and each sends a reply to the client. The client waits until a threshold number of replies are received. In some examples, the client waits for f+1 replies to be received, where f is the maximum number of faulty consensus nodes that can be tolerated within the blockchain network. The final result is that a sufficient number of consensus nodes come to an agreement on the order of the record that is to be added to the blockchain, and the record is either accepted, or rejected.

In some blockchain networks, cryptography is implemented to maintain privacy of transactions. For example, if two nodes want to keep a transaction private, such that other nodes in the blockchain network cannot discern details of the transaction, the nodes can encrypt the transaction data. An example of cryptography includes, without limitation, symmetric encryption, and asymmetric encryption. Symmetric encryption refers to an encryption process that uses a single key for both encryption (generating cyphertext from plaintext), and decryption (generating plaintext from cyphertext). In symmetric encryption, the same key is available to multiple nodes, so each node can en-/de-crypt transaction data.

Asymmetric encryption uses keys pairs that each include a private key, and a public key, the private key being known only to a respective node, and the public key being known to any or all other nodes in the blockchain network. A node can use the public key of another node to encrypt data, and the encrypted data can be decrypted using other node's private key. For example, and referring again to FIG. 2, Participant A can use Participant B's public key to encrypt data, and send the encrypted data to Participant B. Participant B can use its private key to decrypt the encrypted data (cyphertext) and extract the original data (plaintext). Messages encrypted with a node's public key can only be decrypted using the node's private key.

Asymmetric encryption is used to provide digital signatures, which enables participants in a transaction to confirm other participants in the transaction, as well as the validity of the transaction. For example, a node can digitally sign a message, and another node can confirm that the message was sent by the node based on the digital signature of Participant A. Digital signatures can also be used to ensure that messages are not tampered with in transit. For example, and again referencing FIG. 2, Participant A is to send a message to Participant B. Participant A generates a hash of the message, and then, using its private key, encrypts the hash to provide a digital signature as the encrypted hash. Participant A appends the digital signature to the message, and sends the message with digital signature to Participant B. Participant B decrypts the digital signature using the public key of Participant A, and extracts the hash. Participant B hashes the message and compares the hashes. If the hashes are same, Participant B can confirm that the message was indeed from Participant A, and was not tampered with.

In some embodiments, nodes of the blockchain network, and/or nodes that communicate with the blockchain network can operate using trusted execution environments (TEEs). At a high-level, a TEE is a trusted environment within hardware (one or more processors, memory) that is isolated from the hardware's operating environment (e.g., operating system (OS), basic input/output system (BIOS)). In further detail, a TEE is a separate, secure area of a processor that ensures the confidentiality, and integrity of code executing, and data loaded within the main processor. Within a processor, the TEE runs in parallel with the OS. At least portions of so-called trusted applications (TAs) execute within the TEE, and have access to the processor and memory. Through the TEE, the TAs are protected from other applications running in the main OS. Further, the TEE cryptographically isolates TAs from one another inside the TEE.

An example of a TEE includes Software Guard Extensions (SGX) provided by Intel Corporation of Santa Clara, Calif., United States. Although SGX is discussed herein by way of example, it is contemplated that embodiments of this specification can be realized using any appropriate TEE.

SGX provides a hardware-based TEE. In SGX, the trusted hardware is the die of the central processing until (CPU), and a portion of physical memory is isolated to protect select code and data. The isolated portions of memory are referred to as enclaves. More particularly, an enclave is provided as an enclave page cache (EPC) in memory and is mapped to an application address space. The memory (e.g., DRAM) includes a preserved random memory (PRM) for SGX. The PRM is a continuous memory space in the lowest BIOS level and cannot be accessed by any software. Each EPC is a memory set (e.g., 4 KB) that is allocated by an OS to load application data and code in the PRM. EPC metadata (EPCM) is the entry address for respective EPCs and ensures that each EPC can only be shared by one enclave. That is, a single enclave can use multiple EPCs, while an EPC is dedicated to a single enclave.

During execution of a TA, the processor operates in a so-called enclave mode when accessing data stored in an enclave. Operation in the enclave mode enforces an extra hardware check to each memory access. In SGX, a TA is compiled to a trusted portion, and an untrusted portion. The trusted portion is inaccessible by, for example, OS, BIOS, privileged system code, virtual machine manager (VMM), system management mode (SMM), and the like. In operation, the TA runs and creates an enclave within the PRM of the memory. A trusted function executed by the trusted portion within the enclave is called by the untrusted portion, and code executing within the enclave sees the data as plaintext data (unencrypted), and external access to the data is denied. The trusted portion provides an encrypted response to the call, and the TA continues to execute.

An attestation process can be performed to verify that expected code (e.g., the trusted portion of the TA) is securely executing within the SGX-provided TEE. In general, the attestation process includes a TA receiving an attestation request from a challenger (e.g., another node in the blockchain network, a key management system (KMS) of the blockchain network). In response, the TA requests that its enclave produce a remote-attestation, also referred to as a quote. Producing the remote-attestation includes a local-attestation being sent from the enclave to a so-called quoting enclave, which verifies the local-attestation, and converts the local-attestation into the remote-attestation by signing the local-attestation using an asymmetric attestation key. The remote-attestation (quote) is provided to the challenger (e.g., KMS of the blockchain network).

The challenger uses an attestation verification service to verify the remote-attestation. For SGX, Intel provides the Intel Attestation Service (IAS), which receives the remote-attestation from the challenger, and verifies the remote-attestation. More particularly, the IAS processes the remote-attestation, and provides a report (e.g., attestation verification report (AVR)), which indicates whether the remote-attestation is verified. If not verified, an error can be indicated. If verified (the expected code is securely executing in the TEE), the challenger can start, or continue interactions with the TA. For example, in response to the verification, the KMS (as challenger) can issue asymmetric encryption keys (e.g., a public-key and private-key pair) to the node executing the TEE (e.g., through a key exchange process, such as elliptical curve Diffie-Hellman (ECDH)) to enable the node to securely communicate with other nodes, and/or clients. Additional details of the TEE technology is described in, e.g., PCT application PCT/CN2019/081180, filed on Apr. 3, 2019, the contents of which are incorporated by reference.

Figure 3:
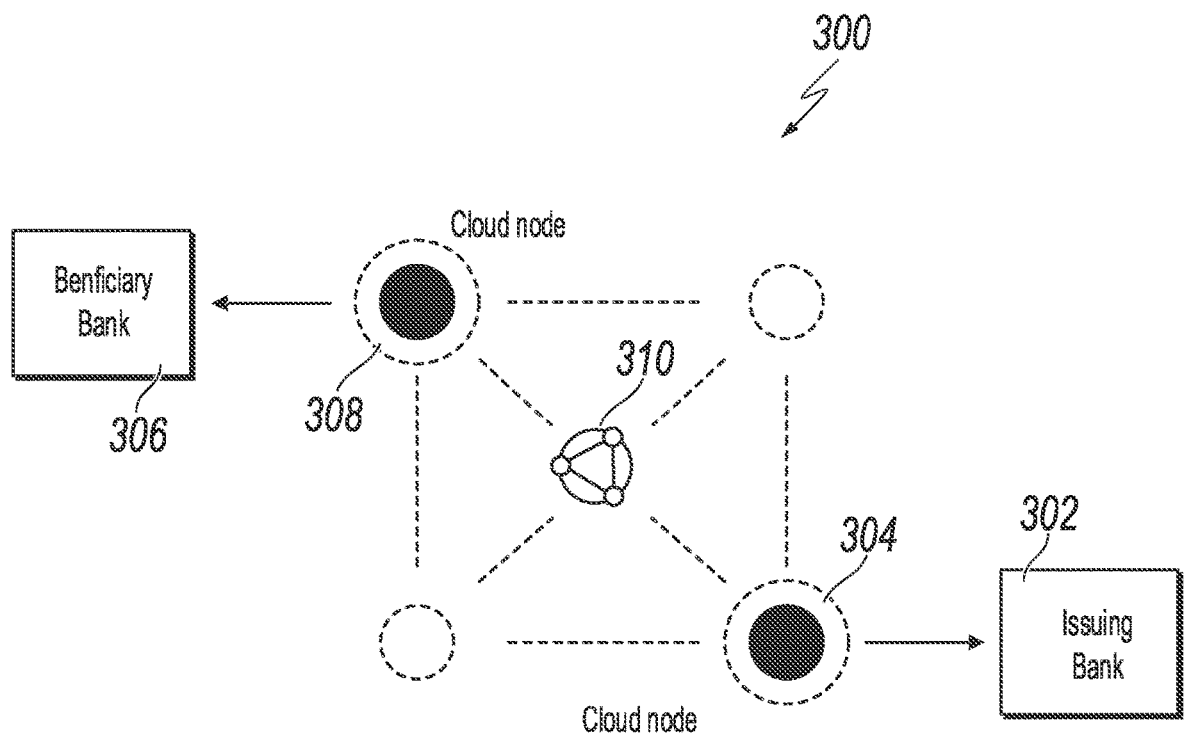
FIG. 3 is a diagram illustrating an example of a blockchain network in accordance with embodiments of this specification.

FIG. 3 is a diagram illustrating an example of a system 300 in accordance with embodiments of this specification. The system 300 can include a blockchain network 310 that includes a plurality of blockchain nodes. The blockchain nodes are associated with and/or maintain a blockchain. The blockchain nodes can reach consensus on transactions related to events of a lifecycle of a guarantee. The guarantee can be any assurances made by at least one guarantor to at least one beneficiary. For example, in a purchase transaction in which a buyer buys goods from a seller, the seller promises to deliver certain goods and the buyer promises to pay a certain amount of money to the seller, the guarantee can be made by a bank guaranteeing that the buyer's payment to the seller will be received on time and for the correct amount. In the event that the buyer is unable to pay the full amount on the purchase upon the due date, the bank will cover the full or remaining amount of the purchase. This type of guarantees can be referred to as letter of credit or documentary credit. In some examples, the bank's client may be the buyer, in which the bank provides a guarantee to the seller on behalf of the buyer. For example, the guarantees can be made by the bank to pay the seller in the event that the buyer (which can be the bank's client) defaults on the agreement with the seller. This type of guarantees can be referred to as a standby letter of credit (SBLC), sometimes also abbreviated as SLOC. The SBLC is often used to help facilitate international trade between companies that are unfamiliar with each other or are located in countries or regions that have different laws and regulations.

Using SBLC as an example of a guarantee, events in a lifecycle of an SBLC can include, but not limited to, e.g., one or more of SBLC issuance, drawdown, cancelation, and amendment, etc. As explained above, the SBLC is a bank guarantee document that the applicant/debtor (usually buyer or importer) guarantees to the beneficiary/creditor (usually the supplier, seller, or exporter) that the bank (i.e., the issuing bank) can substitute the applicant/debtor as debtor in case of default, subject to the condition that the creditor presents to the bank the proof of existence of a claim, e.g., by presenting the SBLC to the bank. The SBLC can be used to secure the performance of a contract, an obligation, or a flow of business transactions.

The SBLC provides an additional guarantee to the beneficiary that the beneficiary is assured of collecting the amount of the debts. For example, the SBLC is a financial contract that is provided in addition to a marketing contract or a purchase order contract between the debtor and the beneficiary. For example, when a buyer (debtor) intends to buy goods from a seller (beneficiary), the buyer and the seller sign a purchase order contract (or agreement) or marketing contract (or agreement) stating the terms of the transaction, such as specification of the goods, the costs of the goods, and the deadlines for delivery of the goods and the payments. The purchase order contract is an agreement between the buyer and seller. The bank is not a party to the purchase order contract, but is a party to the SBLC. The bank that issues the SBLC can be called an issuing bank 302. The creditor's bank can be called a beneficiary bank 306. In some examples in this specification, the transaction is between a seller located in a first country (onshore) who sells to a buyer located in a second country (offshore). Thus, the issuing bank 302 is also referred to as an offshore bank 302, and the beneficiary bank 306 is also referred as an onshore bank 306. The issuing bank 302 guarantees through issuance of the SBLC that, for a fixed period of time, on the instruction of the applicant of the SBLC, to pay a guaranteed amount in the event of default by the applicant, even if the applicant is not solvent and cannot repay the issuing bank 302. If the debtor has already paid the debt in part or in full based on the marketing contract, or the SBLC has expired, the SBLC can be amended or canceled.

In some embodiments, the guaranteed amount of credit in the SBLC can be viewed as a loan applied for by the applicant and pre-approved by the issuing bank 302. If the SBLC is executed before its expiration, the loan is released to the beneficiary through the beneficiary bank 306. The applicant will then need to pay off the loan to the issuing bank 302. If the SBLC is never executed during its lifecycle, the loan will be canceled at expiration and never be released to the beneficiary.

The SBLC can be practical for business operations that have repeated transactions. For example, in a long-term or regular business relationship, a seller who carries out transactions with a buyer regularly for large amounts or sometimes initiates product delivery before receiving the payment can be assured of having the guaranteed funds. In such cases, the SBLC can be put in place at the beginning of the business relationship and be used for all ensuing transactions between the parties until the buyer defaults, or the SBLC is canceled or expired.

In some embodiments, transactions associated with events of an SBLC's lifecycle can be initiated by the issuing bank 302 or the beneficiary bank 306. For example, the issuing bank's 302 internal system can perform an internal transaction approval process and store the internally approved transactions on the blockchain through a cloud node 304. In some embodiments, the cloud node 304 can be the issuing bank's 302 blockchain node of the blockchain network 310. The cloud node 304 can be managed and controlled by the issuing bank 302 and participate in the consensus of the blockchain network 310. The blockchain nodes of the blockchain network 310 can pre-verify the transactions. The pre-verification can include verifying digital signature and legitimacy of the transactions based on ZKPs. After the transactions pass pre-verification, they can be included in blocks to be appended to the blockchain. The beneficiary bank 306 can retrieve the relevant transactions from the blockchain via a cloud node 308 and invoke its own internal system for transaction approval. Similar to the cloud node 304 of the issuing bank 302, the cloud node 308 can be the beneficiary bank's 306 consensus node of the blockchain network 310.

Figure 4:
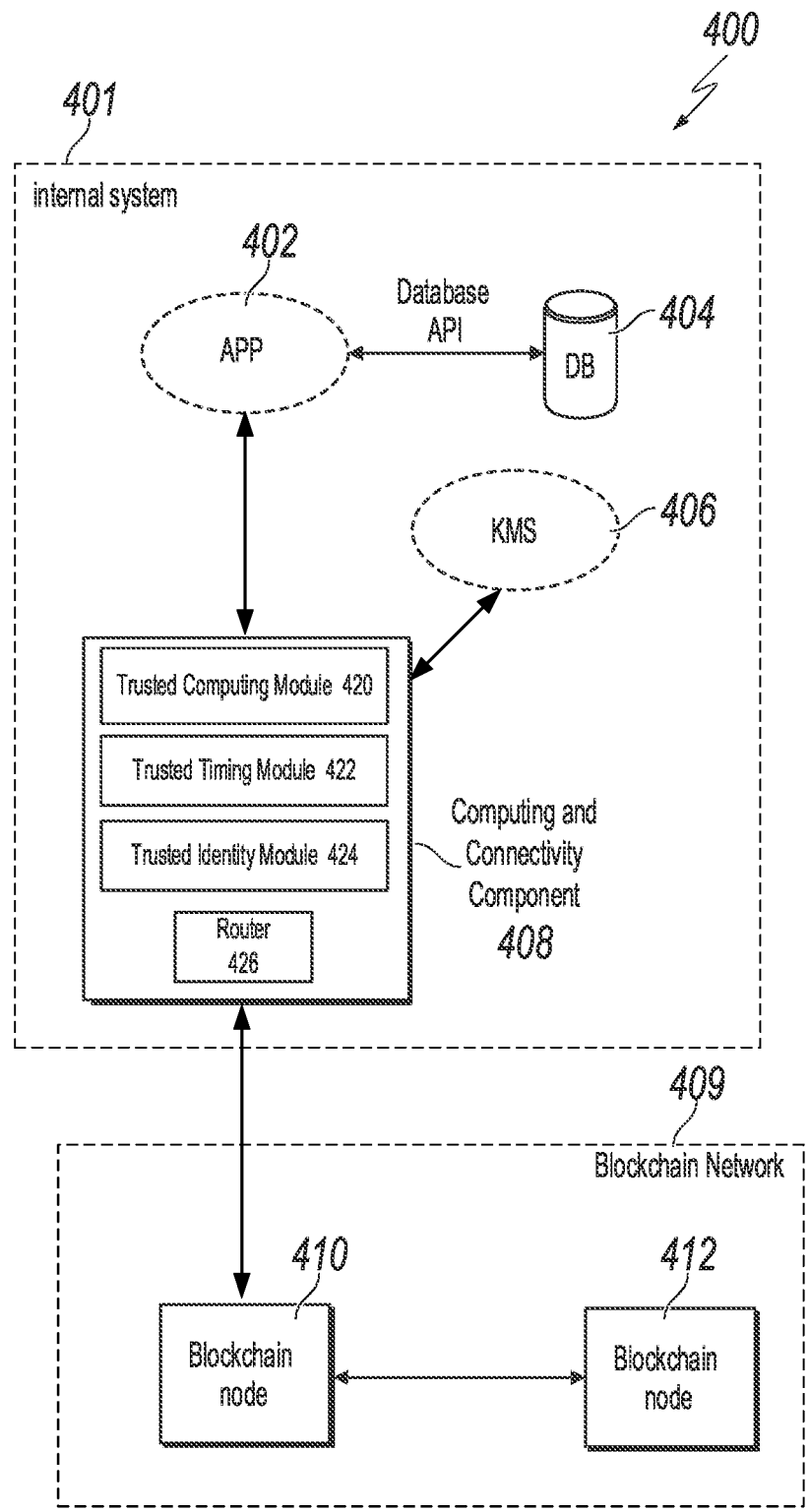
FIG. 4 is a flow diagram illustrating an example of message flows between a guarantor's internal system and a blockchain network in accordance with embodiments of this specification.

FIG. 4 is a flow diagram illustrating an example 400 of message flows between a guarantor's internal system and a blockchain network in accordance with embodiments of this specification. At a high-level, the guarantor's internal system 401 can include an application (APP) 402, a database 404, a key management system (KMS) 406, and a computing and connectivity component 408. In some embodiments, the internal system 401 can include less or more components. The internal system 401 is connected to a blockchain network 409 that includes a plurality of blockchain nodes (only blockchain node 410 and blockchain node 412 are depicted in FIG. 4 for illustration purposes, it is understood that the blockchain network 409 can include many additional blockchain nodes).

The APP 402 can be a software program for providing guarantee services. The APP 402 can be an interface between an applicant of a guarantee and the guarantor's internal system 401. For example, the APP 402 can be used to receive input including applicant's identity information, timing, amount, conditions, and content of the guarantee, etc. In some embodiments, data related to the guarantee can be stored in a database 404. The database 404 can include any memory or database module and can take the form of volatile or non-volatile memory, including, without limitation, magnetic media, optical media, random access memory (RAM), read-only memory (ROM), removable media, or any other suitable local or remote memory component. The database 404 can store various objects or data, including classes, frameworks, applications, backup data, business objects, jobs, web pages, web page templates, database tables, repositories storing business or dynamic information, and any other appropriate information including any parameters, variables, algorithms, instructions, rules, constraints, or references thereto associated with the purposes of the APP 402 or the internal system 401.

Example data can include input from the applicant, data sent or forwarded by other guarantors involved in transactions related to the guarantee, templates, and encryption keys, etc. Additionally, the database 404 can include any other appropriate data, such as VPN applications, firmware logs and policies, firewall policies, a security or access log, print or other reporting files, as well as others. In some examples, the APP 402 can retrieve data from the database 404 through a database application program interface (API).

The APP 402 can communicate information related to the guarantee with a computing and connectivity component 408. In some embodiments, the computing and connectivity component 408 can include a trusted computing module 420, a trusted timing module 422, and a trusted identity module 424. The trusted computing module 420 can include one or more processors to execute instructions provided by a software development kit (SDK). Example instructions can include performing encryption, generating digital signatures and/or ZKPs, or other applicable proofs. In some embodiments, the one or more data processors can have a TEE that is isolated from the one or more processors' operating system and configured to provide enhanced confidentiality and integrity of code executing, and data loaded within, the one or more data processors.

In some embodiments, the trusted computing module 420 can be configured to record information associated with the applicant of the guarantee in compliance with privacy laws. For example, the trusted computing module 420 can generate a hash value of the record, and adds a block that includes the record and the hash value to the blockchain associated with the blockchain network 409 that stores records associated with the guarantee.

In some embodiments, the trusted computing module 420 can be configured to provide a verified record of the steps/operations performed by the APP 402 in response to a request for the verified record associated with the guarantee to the beneficiary of the guarantee. The trusted computing module 420 can also provide a verified time stamp generated by a trusted timing module 422, a verified identity generated by a trusted identity module 424, and/or the computation result associated with each step/operation of the steps/operations performed by the APP 402.

In some embodiments, the encryption keys used to perform encryption, and generate digital signatures and proofs can be provided by a KMS 406 to the trusted computing module 420. In some embodiments, the KMS 406 can generate, store, and manage encryption keys. In some embodiments, KMS 406 includes a secure application environment implemented using the TEE technology (e.g., Intel SGX). One or more software programs or libraries can be executed by the TEE.

In some embodiments, the trusted timing module 422 can be configured to generate time stamps based on national standard timing information (e.g., Greenwich Mean Time (GMT), UTC), or timing information obtained from a global positioning system. In some embodiments, the trusted timing module 422 can synchronize the time it maintains with the global time adopted by the blockchain nodes of the blockchain network 409 to ensure accuracy of the time stamps stored on the blockchain.

In some embodiments, the trusted timing module 422 can be configured to generate time stamps associated with different users using different standard times for financial systems in different regions. For example, the trusted timing module 422 can generate time stamps associated with a first user using a first standard time recognized by an offshore financial system associated with the first user, and to generate time stamps associated with a second user using a second standard time recognized by an onshore financial system associated with the second user, in which the first and second users reside in different regions having different financial systems.

The trusted identity module 424 can be configured to verify an identity of a user (e.g., an applicant or a beneficiary) based on one or more of unique IDs associated with the user. In some embodiments, the unique IDs can include at least one of the following: (i) a mobile phone number, (ii) a credit card number, (iii) a user ID associated with an online payment system, (iv) a user ID associated with an online shopping account, (v) a user ID associated with a music streaming or downloading account, (vi) a user IDS associated with a movie streaming or downloading account, (vii) a user ID associated with a messaging or chat account, (viii)

a user ID associated with an online banking account, (ix) a user ID associated with a ride hailing service, (x) a user ID associated with an online food ordering service, (xi) a social security number, (xii) a driver's license number, (xiii) a passport number, (xiv) a user ID associated with an online gaming service, (xv) an ID issued by a government entity, (xvi) one or more fingerprints, (xvii) one or more voice prints, or (xviii) iris information.

In some implementations, the unique IDs can also include a decentralized identifier (DID) of the user. The decentralized identifier can include a universal resource locator (URL) scheme identifier, an identifier for a decentralized identifier method, and a decentralized identifier method-specific identifier. The decentralized identifier can point to a corresponding decentralized identifier document, which can include descriptive text in a preset format (e.g., JSON-LD) about the decentralized identifier and the owner of the decentralized identifier. The decentralized identifier can serve as a uniform resource identifier (URI) for locating the decentralized identifier document. The decentralized identifier document can include various properties such as contexts, decentralized identifier subject, public keys, authentication, authorization and delegation, service endpoints, creation, updates, proof, and extensibility. The decentralized identifier document can define or point to resources defining a plurality of operations that can be performed with respect to the decentralized identifier. In the examples described in this specification, the decentralized identifiers comply with the standards specified by the World Wide Web Consortium (W3C). However, other decentralized identifiers can also be used. Additional information about decentralized identifiers can be found in application PCT/CN2019/095299, filed on Jul. 9, 2019, PCT/CN2019/103780, filed on Aug. 30, 2019, and CN201910963431.0, filed on Oct. 11, 2019. The above applications are hereby incorporated by reference.

In some embodiments, the trusted identity module 424 can be configured to verify different users residing in different regions having different financial systems by using different identifiers. For example, the trusted identity module 424 can be configured to verify the identity of a first user using at least one of a first set of identifiers recognized by a first financial system associated with the first user, and to verify the identity of a second user using at least one of a second set of identifiers recognized by a second financial system associated with the second user, in which the first and second users reside in different regions having different financial systems.

In some examples, the computing and connectivity component 408 can also include a router 426 that can route information processed by the one or more processors to a blockchain node 410 in the blockchain network 409 communicably coupled to the internal system 401. As discussed earlier, the blockchain node 410 can be a cloud node that can sign and/or verify messages, and communicate with other blockchain nodes. The blockchain node 410 can also be a consensus node that participates in a consensus procedure in the blockchain network 409. In some embodiments, the communications inside and between the internal system 401 and blockchain network 409 can be performed based on a secure communication protocol such as the hypertext transfer protocol secure (HTTPS) or transport layer security (TLS). For example, the functions performed by the blockchain node 410 can be defined in a smart contract, in which mining nodes of the blockchain network execute the functions in the smart contract and consensus full nodes of the blockchain network verify the transactions.

Transactions added on a blockchain can be verified and agreed upon by blockchain nodes in the blockchain network 409 through consensus based on a consensus protocol. Example consensus protocols can include proof of work (PoW), proof of stake (PoS), and PBFT, etc. In the SBLC example, the blockchain nodes can be associated with banks, credit unions, trust companies, loan companies, insurance companies, investment institutions, and regulation authorities, etc. Once added, the transactions become immutable and can be trusted by the parties as evidence for the corresponding guarantee services or processes.

The time, identity, and content carried by transaction data recorded on the blockchain can be trusted. The blockchain enables the APP 402 that provides guarantee services to preserve verified records of information (e.g., who, what, and when) about events that occur during each of multiple steps or critical time points of the services. The records of information are preserved in ways that comply (or are more compliant compared to previous systems) with predetermined rules. For example, when the guarantee is a letter of credit or SBLC, the predetermined rule can be the Uniform Rules and Uses relating to Documentary Credits (UCR 600 of the International Chamber of Commerce) or the International Rules and Practices relating to standby (RPIS 98 of the International Chamber of Commerce), respectively.

FIG. 5 is an example of source code 500 of an SBLC in accordance with embodiments of this specification. In this example, the SBLC source code 500 includes an SBLC number ("sblcNo"), an SBLC type ("sblcType"), a code of the issuing bank ("issueBankCode"), a code of the beneficiary bank ("beneficiaryBankCode"), a maximum loanable amount in number and words ("maxAggregateSum", "maxAggregateSumInWord"), a name of an applicant ("principal"), a name of a beneficiary ("borrower"), an SBLC expiration date and time ("expiryDatetime"), an SBLC effective date and time ("effectiveDatetime"), an SBLC application date and time ("applicationDatetime"), a remaining loanable amount ("remainAggregateSum"), an actual loan amount in the SBLC ("totalLoanAmount"), a list of terms associated with the SBLC ("actionNoList"), and a status of the SBLC ("status"). The SBLC source code 500 described above is merely an example, in other examples the SBLC source code 500 can include more or less information.

The SBLC type can represent the type of SBLC. The types of the SBLC can include performance standby, advance payment standby, bid bond/tender bond standby, counter standby, financial standby, direct pay standby, insurance standby, commercial standby, etc. The maximum loanable amount can represent the total loan the issuing bank can approve to the applicant. In some examples, the maximum loanable amount can be the amount of available balance of the applicant's accounts at the issuing bank. The actual loan amount can represent the guaranteed amount in the SBLC. The remaining loanable amount can be the remaining loan the issuing bank can approve to the applicant after applying the credit in the SBLC. The status of the SBLC represents the current status of the SBLC in its lifecycle, such as issued, on hold, effective, canceled, or expired, etc.

To protect the privacy of the parties involved in the transaction associated with the SBLC, the SBLC can be encrypted before it is sent to the blockchain nodes for consensus. For example, as discussed in the description of FIG. 4, the encryption of the SBLC can be performed by the computing and connectivity component 408 before sending the encrypted SBLC to the blockchain node 410 for consensus. The encryption keys can be derived based on a linear secret sharing scheme (LSSS) through negotiations among the parties involved in the transactions. Additional details of the encryption key negotiations are described in, e.g., Chinese Application No. 201911187078.8, filed on Nov. 27, 2019, the content of which is incorporated herein by reference. Such encryption key derivation technologies enhance security of the encryption keys and reduce the possibilities of deciphering by a third party.

In some embodiments, the issuing bank (e.g., 302 in FIG. 3) can also generate ZKPs associated with the SBLC. The ZKPs are provided to the blockchain nodes together with the encrypted SBLC, such that the blockchain nodes can verify the legitimacy of the SBLC without knowing its content. After verifying that the SBLC is legitimate, the blockchain nodes can perform consensus to record the encrypted SBLC on the blockchain.

Figure 6:
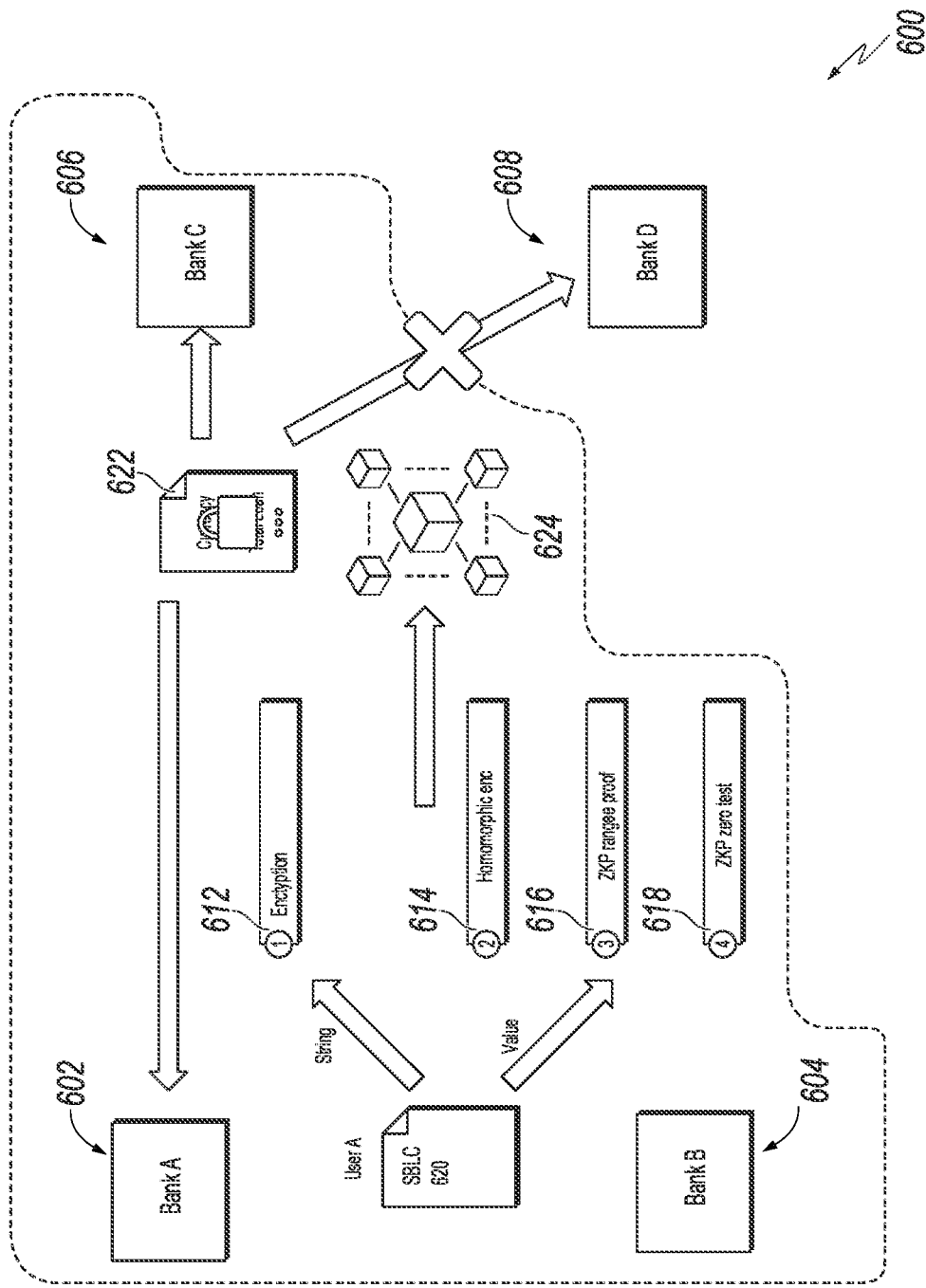
FIG. 6 is a diagram illustrating an example of cryptographical operations performed on a standby letter of credit in accordance with embodiments of this specification.

FIG. 6 is a diagram illustrating an example 600 of cryptographical operations performed on an SBLC 620 in accordance with embodiments of this specification. In this example, it is assumed that bank A 602 and bank B 604 are two joint guarantors of the SBLC 620. In other words, bank A 602 and bank B 604 are the issuing banks. Bank C 606 is the beneficiary bank of the SBLC 620. Bank D 608 can be a bank uninvolved in the transactions related to the SBLC 620. As discussed earlier, encryption keys can be negotiated among the parties involved in the transactions related to the SBLC 620. In this example 600, the parties include bank A 602, bank B 604, and bank C 606. The encryption keys agreed upon by the parties can be used to encrypt the SBLC 620 string or add digital signature 612. The encrypted SBLC cannot be decrypted by Bank D 608 which is not a party of the transaction.

Bank A 602 and bank B 604 can also generate one or more ZKPs of values associated with the SBLC 620. Such ZKPs can include proof under homomorphic encryption scheme 614, range proof 616, and/or zero test 618. The homomorphic encryption scheme 614 can be used to separately encrypt the maximum loanable amount, the actual loan amount, and the remaining loanable amount. After performing the homomorphic encryption scheme 614, the encrypted maximum loanable amount, the actual loan amount, and the remaining loanable amount cannot be revealed without decryption. However, based on the homomorphic nature of the encryption scheme, it can be verified that the actual loan amount and the remaining loanable amount add up to the maximum loanable amount if this is true for their encrypted counterparts. Additional details of the homomorphic encryption are described in, e.g., PCT/CN2018/114344, PCT/CN2018/114421, and PCT/CN2018/114420 filed on Apr. 22, 2019, the contents of which are incorporated by reference.

In some embodiments, a range proof can be used to prove that an amount is within a range without revealing the actual amount. In some examples, a range proof can be provided by Bank A 602 and Bank B 604 to show that the maximum loanable amount is under a reasonable range. For example, a reasonable range can be set as 0 to $2^{40}$. In some examples, the range proof can be provided to show that the actual loan amount or the remaining loanable amount is less than the maximum loanable amount. The zero test can be used to prove that an amount is zero. For example, after the SBLC expires or the loan is paid off, a zero test can be provided to prove that the actual loan amount in the SBLC 620 is zero. The encrypted SBLC and the ZKPs can form the cyphertext of an encrypted SBLC 622 to be verified by blockchain nodes of a blockchain network 624. One of bank A 602 and bank B 604 can send the cyphertext of the encrypted SBLC 622 to the blockchain network 624, e.g., by calling a smart contract on a blockchain associated with the blockchain network 624. After the blockchain nodes verify the ZKPs to confirm that the SBLC 620 is legitimate, they can perform consensus and record the cyphertext of the encrypted SBLC 622 on the blockchain.

Additionally or alternatively, TEE can be used to provide data privacy of SBLC content. As described early, the TEE process plaintext and outputs cyphertext. In some embodiments, the plaintext of the SBLC can be processed inside the TEE. For example, when the bank A 602 initiates amendment or status updates of a SBLC, such as amending the guaranteed amount, acceptance, or cancellation of an SBLC, the corresponding updates can be made on the plaintext of the SBLC inside of the TEE. The output of the TEE is encrypted and trustable by the blockchain nodes of the blockchain network 624. In some embodiments, the TEE encrypted SBLC can be sent to other blockchain nodes of the blockchain network 624 together with the ZKPs. After verifying the ZKPs, the blockchain nodes can perform consensus to store the updated SBLC to the blockchain.

The following descriptions provide various embodiments of blockchain-based processes associated with a lifecycle of a letter of credit. SBLC is used as an example of a letter of credit for the purpose of illustration. Other types of letter of credit or guarantee can be applicable to the processes in accordance with embodiments of this specification.

Figure 7:
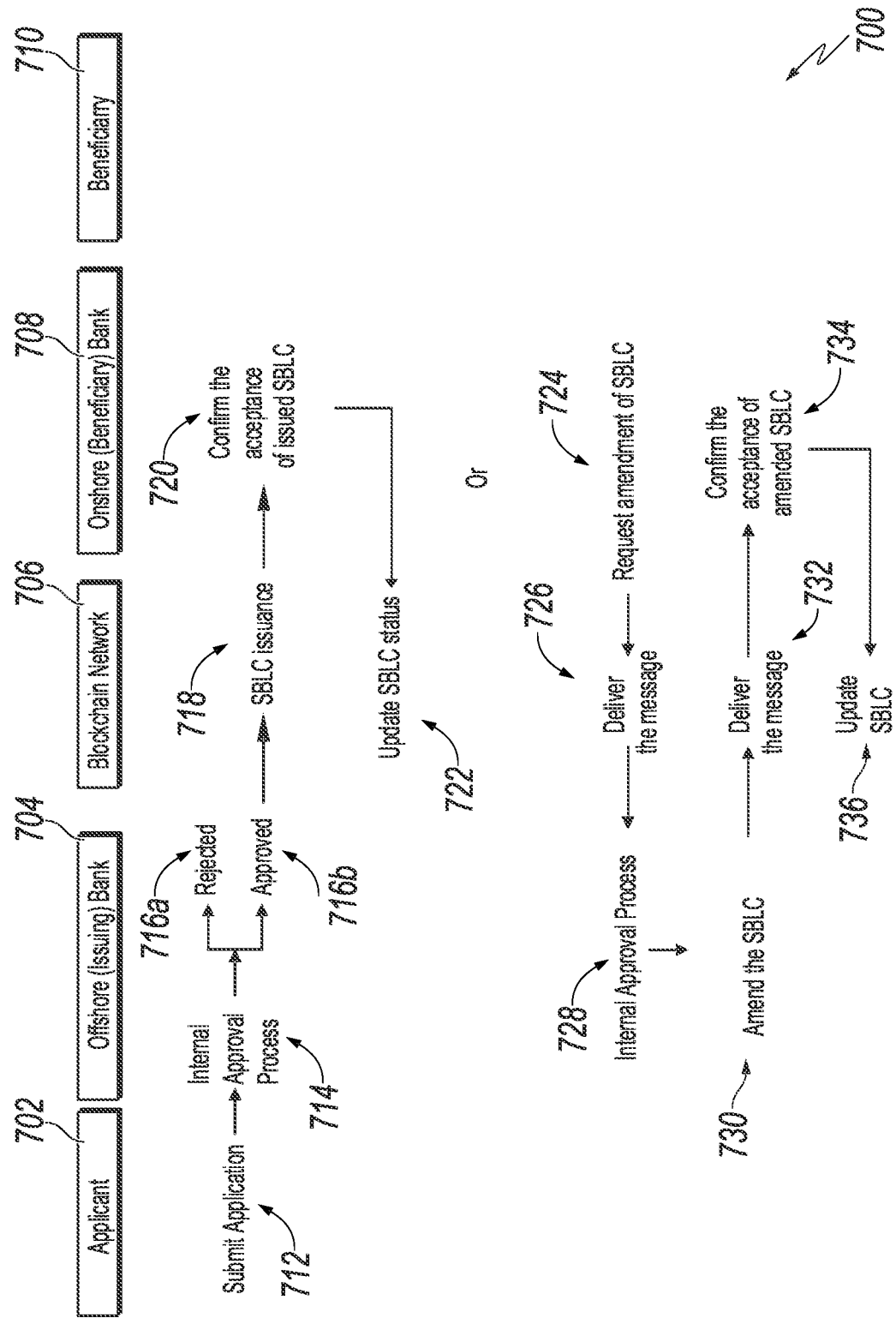
FIG. 7 is a swim-lane diagram illustrating an example of a blockchain-based letter of credit issuing process in accordance with embodiments of this specification.

FIG. 7 is a swim-lane diagram illustrating an example of a blockchain-based letter of credit issuing process 700 in accordance with embodiments of this specification. In this example, the letter of credit is a standby letter of credit, but the same principle can be applied to other types of letters of credit. The participants of the process 700 can include an applicant 702, an issuing bank 704, a blockchain network 706, a beneficiary bank 708, and a beneficiary 710. As discussed earlier, the applicant 702 is often a buyer of a business transaction. The issuing bank 702 is often an offshore bank of the buyer. The beneficiary 710 is often a seller of the business transaction. The beneficiary bank 708 is often the onshore bank of the seller. In some embodiments, the beneficiary bank 708 can act as the beneficiary's 710 representative to interact with the issuing bank 704 through the blockchain network 706.

At 712, the applicant 702 can submit an application of an SBLC to the issuing bank 704. In some embodiments, the applicant 702 and the beneficiary 710 can agree on the terms of the SBLC, such as the guaranteed amount of payment or loan in the SBLC. The guaranteed amount of payment to the beneficiary 710 can be considered a guaranteed amount of loan to the applicant 702. In the event that the applicant 702 cannot pay the guaranteed amount owed to the beneficiary 710, the guarantor will pay the guaranteed amount to the beneficiary 710 and provide a loan for the same amount to the applicant 702. For example, the guaranteed amount of payment or loan can be the monetary amount involved in the business transaction between the applicant 702 and the beneficiary 710, such as the price of goods that the buyer intends to purchase from the seller. The application can be submitted in physical form, or electronically through the bank's website or APP (such as a user-side version of the APP 402 as discussed in the description of FIG. 4). Generally, the applicant 702 can specify in the application the applicant's identity information, credit information, guarantee information, beneficiary bank's information, and beneficiary's identity information, etc. In some cases, some information can be submitted as attachment of the application.

The applicant's identity information can include one or more of the applicant's name, address, phone number, e-mail address, and business type, etc. The credit information can include one or more of the applicant's credit history, account information associated with the issuing bank 704, banknote, escrow account information, or other information that can show that the applicant has enough credit to pay off the guaranteed amount of loan in the SBLC. The guarantee information can include the guaranteed amount of the SBLC, the service or the object of the guarantee, the duration of the guarantee, and the conditions of implementation of the guarantee, etc. The beneficiary bank's information can include one or more of the beneficiary bank's bank name, address, phone number, swift code, and routing number, etc. The beneficiary's identity information can include one or more of the beneficiary's name, address, phone number, e-mail address, business type, and account number at the beneficiary bank 708, etc.

After receiving the application, the issuing bank 704 can input or store the information in the application to the bank's internal system. For example, the information input can be performed through the APP 402 as discussed in the description of FIG. 4. In some examples, the issuing bank 704 can also convert the application to a standard source code format of SBLC. The issuing bank 704 can then perform an internal approval process of the application at 714.

In some examples, the internal approval process 714 can involve the issuing bank 704 verifying whether any of the required information for approval is missing in the application. If any required information is missing, the application can be rejected 716a, and the issuing bank 704 can request the applicant 702 to supplement the missing information. The issuing bank 704 can also verify whether the applicant 702 has enough credit to pay off the guaranteed amount of payment or loan in the SBLC in case of default. For example, if the applicant has a bank account with the issuing bank 704, the issuing bank 704 can verify whether the bank account has a balance exceeding the guaranteed amount of loan. In some examples, the issuing bank can also check whether the applicant 702 has submitted other proofs of credit. If there is not enough credit to cover the guaranteed amount of loan, the issuing bank 704 can reject the application. Otherwise, the issuing bank 704 can approve the application 716b.

In some examples, the issuing bank 704 may approve an amount less than the amount the applicant 702 applied for based on the applicant's available credit, and offer the lesser amount to the applicant 702. If the applicant 702 accepts the offer, an SBLC can be approved for the accepted amount. In some examples, the issuing bank 704 can withhold the guaranteed amount of payment or loan from the applicant's bank account until the payment is released to the beneficiary bank 708 or the SBLC is canceled or expired.

After approval of the SBLC at 716b, the issuing bank 704 can finalize the SBLC source code, encrypt the SBLC source code, and generate proofs (e.g., zero knowledge proofs). The SBLC source code can be encrypted using an encryption protocol negotiated with the beneficiary bank 708 as discussed in the description of FIG. 6. For example, the issuing bank 704 can send the cyphertext of the encrypted SBLC to the blockchain network 706 by calling a smart contract on the blockchain associated with the blockchain network 706. In the description below, it is assumed that interactions with the blockchain network 706 are performed by calling relevant smart contracts on the blockchain. The smart contracts can, e.g., update the cyphertext of the SBLC, update the status of the SBLC, send messages to the issuing bank 704, and send messages to the beneficiary bank 708.

In some examples, a smart contract can be used to implement updating and recording SBLC transactions that are trackable, irreversible, and tamper resistant, without involving third parties. This ensures secure and trusted records of the entire SBLC lifecycle. The autonomous execution capacities of smart contracts extend the transactional security assurance of blockchain into situations where dynamic events updating, retrieving, and verifications are needed.

In some embodiments, the issuing bank 704 can submit a request to the associated cloud node (such as the blockchain node 410 discussed in the description of FIG. 4) and the cloud node can make a smart contract call. The smart contract can include instructions to update the cyphertext of the SBLC or the status of the SBLC based on the request included in the smart contract call.

In operation, the cloud node can generate a smart contract that includes templates to perform operations such as updating the cyphertext of the SBLC, updating the status of the SBLC, sending messages to the issuing bank 704, and sending messages to the beneficiary bank 708. In some embodiments, the cloud node can further register accounts in the smart contract and generates updating logs based on the smart contract. For example, the accounts associated with one or more of the applicant 702, the issuing bank 704, the beneficiary bank 708 and the beneficiary 710 may invoke the smart contract templates to perform the related operations. In some embodiments, those entities involved in the SBLC transactions are defined in the smart contract to gain authorizations to invoke the smart contract.

In some embodiments, the cloud node can further define rules in the smart contract templates for updating different aspects of the SBLC or issue authorizations to different entities for updating the SBLC or its status. The cloud node can further add more templates to the smart contract upon request by entities that are authorized to invoke the smart contract. In some templates, the rules in the templates include rules that associate a date, time, location, and/or entity name associated with a SBLC updating event.

In some examples, the cloud node generates and submits a transaction of smart contract to the blockchain network 706. The transaction of smart contract may include a program and an originator of the smart contract 706. The blockchain nodes of the blockchain network verifies the transaction of the smart contract. After the blockchain nodes successfully verify the transaction of the smart contract, the smart contract can be deployed in the blockchain network 706 in a distributed manner and has a unique smart contract address from which the smart contract can be called.

At 718, the encrypted SBLC can be issued on the blockchain through consensus of blockchain nodes of the blockchain network 706. For example, a blockchain node (e.g., a cloud node) connected to the issuing bank's 704 internal system can submit the encrypted SBLC and the proofs to the blockchain network 706 for consensus. The blockchain consensus nodes verify the proofs that prove the legitimacy of the SBLC to reach consensus and then store the encrypted SBLC in one or more blocks to be appended to the blockchain. Details of generating and recording encrypted SBLC on the blockchain are discussed earlier in the descriptions of FIGS. 5 and 6.

After the encrypted SBLC is recorded on the blockchain, the beneficiary bank 708 can retrieve the encrypted SBLC and perform decryption based on the encryption key negotiated with the issuing bank 702. The beneficiary bank 708 can then either confirm the acceptance of the SBLC at 720, or request amendment of the SBLC in case of any typo at 724. If the SBLC issued on the blockchain is accepted, the beneficiary bank 708 can update the SBLC's status to "issued" and request the blockchain network 706 to record the updated SBLC status on the blockchain through consensus. At 722, the blockchain network 706 can store the update the SBLC status accordingly through consensus in response to the request.

If the beneficiary bank 708 detects a typo in the SBLC, it can request an amendment of the SBLC at 724 by submitting the proposed amendments to the blockchain network 706 for consensus. If the amendments are related to the monetary values in the SBLC, the beneficiary bank 708 can generate proofs for a legitimacy check of the proposed amendments.

After consensus, the proposed amendments can be recorded on the blockchain and delivered to the issuing bank 704 at 726. For example, a smart contract on the blockchain can generate a message about the proposed amendments and deliver the message to the issuing bank 704. At 728, the issuing bank 704 performs an internal approval process of the proposed amendment. After approval, the issuing bank 704 can amend the SBLC at 730, encrypt the amended SBLC, and submit it to the blockchain network 706 to update the SBLC on the blockchain. For example, the updating of the SBLC on the blockchain can be achieved by calling a smart contract on the blockchain, in which the smart contract is configured to update the SBLC. At 732, a message indicating that the SBLC has been amended is delivered to the beneficiary bank 708 through the blockchain network 706. For example, the message can be generated by the smart contact on the blockchain and sent by the smart contract to the beneficiary bank 708. At 734, the beneficiary bank confirms acceptance of the amended SBLC and requests the blockchain network 706 to update the SBLC status to "issued." For example, the beneficiary bank can call the smart contract on the blockchain to update the SBLC status. At 736, the blockchain network 706 can update the SBLC status in response to the request for amendment 724. For example, the smart contract on the blockchain can update the SBLC status.

In this specification, when we say that a message or a document is transmitted to or from an entity such as the applicant 702, the offshore (issuing) bank 704, the onshore (beneficiary) bank 708, or the beneficiary 710, we mean that the message or document is transmitted to or from the entity or a computing device associated with the entity. In the process 700, the entity may transmit or receive one or more messages or documents, in which the computing device used to transmit or receive a particular message or document can be different from the computing device used to transmit or receive other messages or documents. The computing device associated with the entity can be, e.g., a computer local to the entity or a cloud computing device accessible to the entity through a network.

Figure 8:
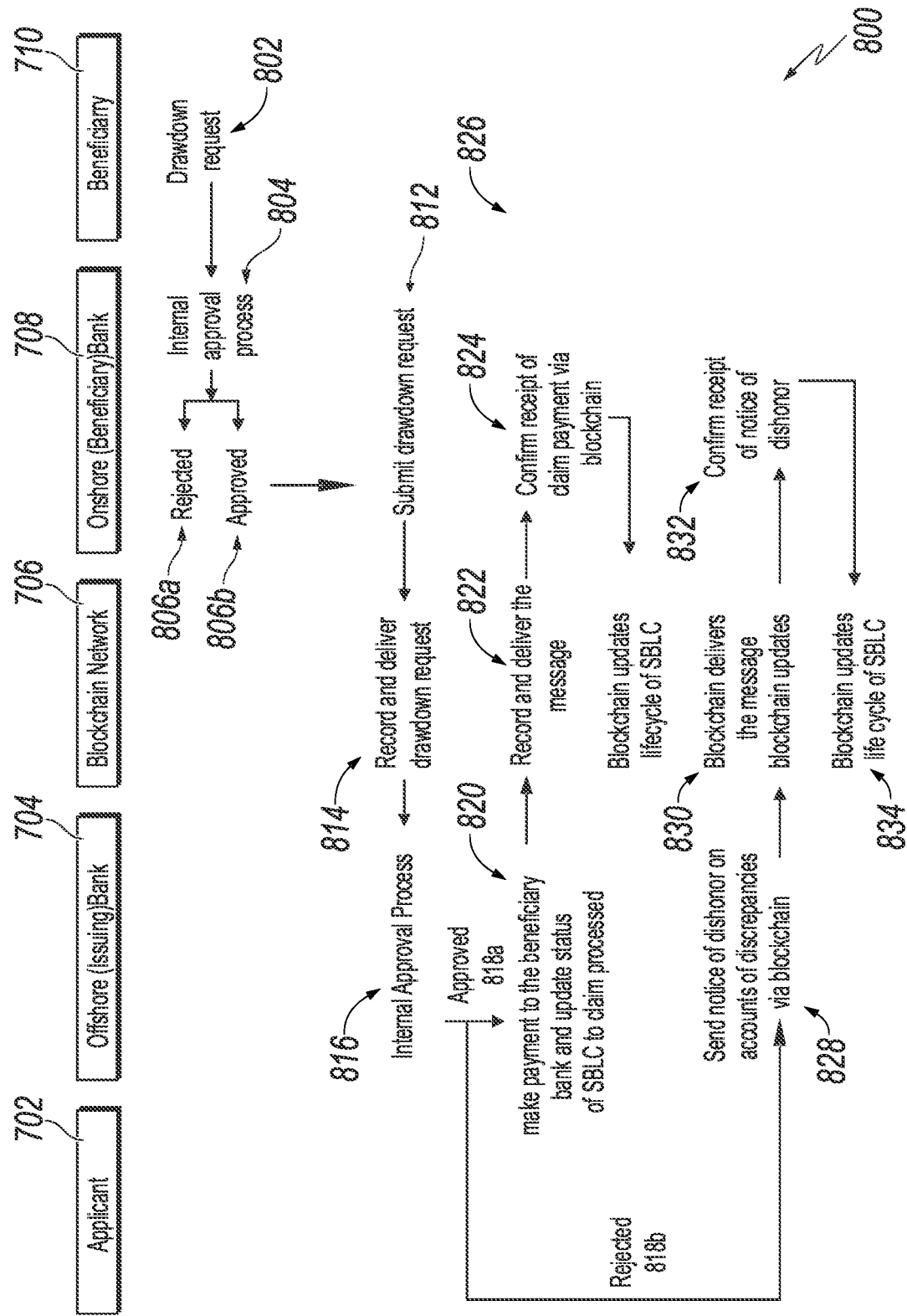
FIG. 8 is a swim-lane diagram illustrating an example of a blockchain-based letter of credit drawdown process in accordance with embodiments of this specification.

FIG. 8 is a swim-lane diagram illustrating an example of a blockchain-based letter of credit drawdown process 800 in accordance with embodiments of this specification. In this example, the letter of credit is a standby letter of credit, but the same principle can be applied to other types of letters of credit. The participants of the process 800 can include the offshore (issuing) bank 704, the blockchain network 706, the onshore (beneficiary) bank 708, and the beneficiary 710.

At 802, the beneficiary 710 or the representative of the beneficiary 710 can submit a drawdown request of an SBLC to the beneficiary bank 708. The drawdown request can be initiated by the beneficiary 710 when the applicant 702 is in default, such as nonpayment after the payment deadline agreed to by the two parties in the marketing or purchase order agreement. In some embodiments, the drawdown request 802 can also include supporting documents to support its request. For example, the supporting documents can include invoices the beneficiary 710 sent to the applicant 702, claims against the applicant 702, and proofs of the claims. For example, the proof of a breach of contract claim that an invoice is unpaid can be a presentation of a written certificate or signed affidavit mentioning the non-payment.

At 804, the beneficiary bank 708 can perform an internal approval process to review the drawdown request. In some embodiments, the beneficiary bank 708 can perform a preliminary check to determine whether necessary documents are included in the drawdown request. The beneficiary bank 708 may not conduct substantive review of the content of the claim and the proofs. For example, the beneficiary bank 708 can check whether the drawdown request includes at least a claim letter with corresponding proofs. If the documents included are sufficient to support a prima facie claim, the beneficiary bank 708 can approve the drawdown request at 806b. Otherwise, at 806a, the beneficiary bank 708 can reject the drawdown request and ask the beneficiary 710 to supplement or correct information. If the drawdown request is approved by the beneficiary bank 708 at 806b, the beneficiary bank 708 can submit the drawdown request, including the claim letter (with proofs), to the issuing bank 704 through the blockchain network 706 at 812. In some examples, the beneficiary bank 708 can encrypt the drawdown request before sending to the blockchain network 706 for consensus.

At 814, the blockchain nodes of the blockchain network 706 can perform consensus to record the drawdown request and notify the issuing bank 704 that a drawdown request has been submitted. For example, the recording and notifying of the drawdown request can be performed by calling a smart contract on the blockchain associated with the blockchain network 706. At 816, the issuing bank 704 can perform an internal approval process after decrypting the claim letter. Based on reviewing the claim and proofs included in the claim letter, the issuing bank 704 can approve the drawdown request at 818a if the claim satisfies one or more conditions indicating a breach of the agreement between the applicant 702 and the beneficiary 710 as defined in the terms of the SBLC, and the proofs are sufficient to support the claims. Otherwise, the issuing bank 704 rejects the drawdown request at 818b.

If the drawdown request is approved at 818a, the issuing bank 704 can make a payment to the beneficiary bank 708 and update the status of the SBLC to "claim processed" at 820. For example, the payment can be made to the beneficiary bank 708 through bank transfer services such as wire transfer, based on the identity information of the beneficiary bank 708 included in the SBLC.

At 822, the blockchain network 706 records the status update of the SBLC through consensus and delivers the message to the beneficiary bank 708. At 824, the beneficiary bank 708 confirms receipt of the payment and updates the SBLC status as "payment processed." At 826, the blockchain network 706 updates the SBLC status accordingly to "payment processed." For example, the recording of the status updates can be performed by calling a smart contract on the blockchain associated with the blockchain network 706.

If the drawdown request is rejected at 818b, at 828, the issuing bank 704 can send a notice of dishonor to the beneficiary bank 708 through the blockchain network 706. At 830, the blockchain network 706 records the notice of dishonor and delivers the message to the beneficiary bank 708. At 832, the beneficiary bank 708 can confirm that the notice of dishonor is received and update the status of the SBLC as "claim closed." At 834, the blockchain network 706 updates the status of the SBLC accordingly as "claim closed."

Figure 9:
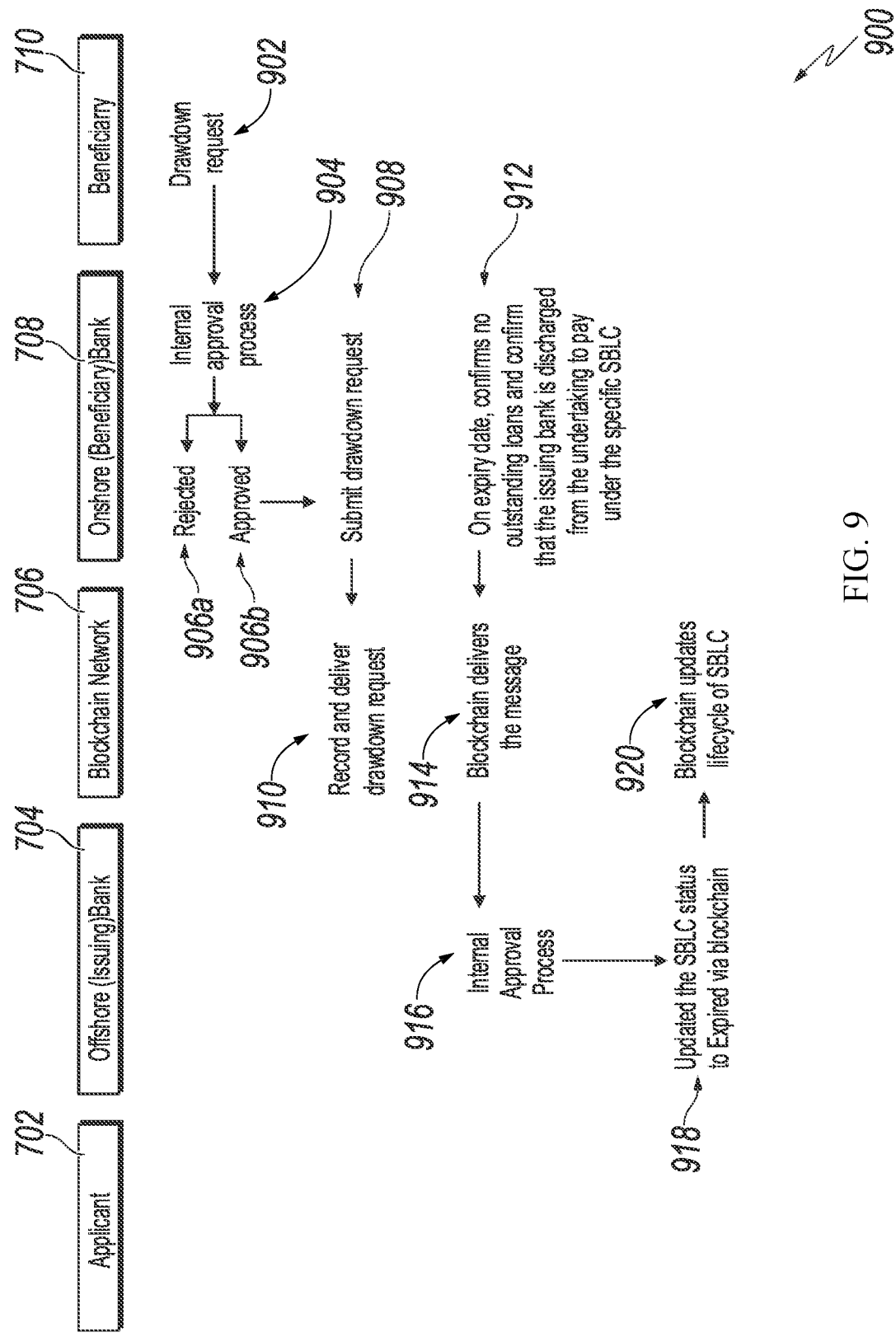
FIG. 9 is a swim-lane diagram illustrating an example of a blockchain-based letter of credit expiration process in accordance with embodiments of this specification.

FIG. 9 is a swim-lane diagram illustrating an example of a blockchain-based letter of credit expiration process 900 in accordance with embodiments of this specification. In this example, the letter of credit is a standby letter of credit, but the same principle can be applied to other types of letters of credit. The participants of the process 900 can include the offshore (issuing) bank 704, the blockchain network 706, and the onshore (beneficiary) bank 708.

As described earlier, the SBLC can have an issue date provided by the issuing bank 704, an effective date, and an expiration date agreed upon by the applicant 702 and the beneficiary 710. The guarantee in the SBLC is effective from the effective date to the expiration date. The expiration date can be determined based on the time zone of the jurisdiction that governs the SBLC. The expiration date can also be based on a time zone agreed to by the applicant 702 and the beneficiary 710, such as the time zone where the issuing bank 704 is located, the time zone where the beneficiary bank 708 is located, or the GMT. Typically, if the applicant 702 agrees to pay the beneficiary 710 by a certain due date, the expiration date of the SBLC will be several days (e.g., five business days) after the payment due date. In this example, the beneficiary 710 has submitted a drawdown request that is processed in steps 902, 904, 906*a*, 906*b*, 908, and 910, which are similar to steps 802, 804, 806*a*, 806*b*, 812, and 814, respectively, of FIG. 8.

On the expiration date of the SBLC, the beneficiary bank 708 can determine whether there is an outstanding claim at 912. If there is an outstanding claim, the beneficiary bank 708 can send a request message to request the valid period of the SBLC to be extended until a guaranteed amount of loan in the SBLC is paid to close the claim. On the other hand, if there is no outstanding claim, the beneficiary bank 708 can send a confirmation message to confirm that the issuing bank 704 is discharged from undertaking the payment under the SBLC. At 914, the blockchain network 706 delivers the request message or confirmation message to the issuing bank 704.

At 916, the issuing bank 704 performs an internal approval process of the received message. If the message is a request message to request the valid period of the SBLC to be extended, the issuing bank 704 can update the terms in the SBLC to reflect the requested extension after internal approval. At 918, if the message is a confirmation message, the issuing bank 704 can update the SBLC status to expired. The issuing bank 704 sends a message about the status update to the blockchain network 706, and at 920 the blockchain network 706 updates the status of the SBLC recorded on the blockchain as "expired." For example, the issuing bank 704 can call a smart contract on the blockchain to update the status of the SBLC.

Figure 10:
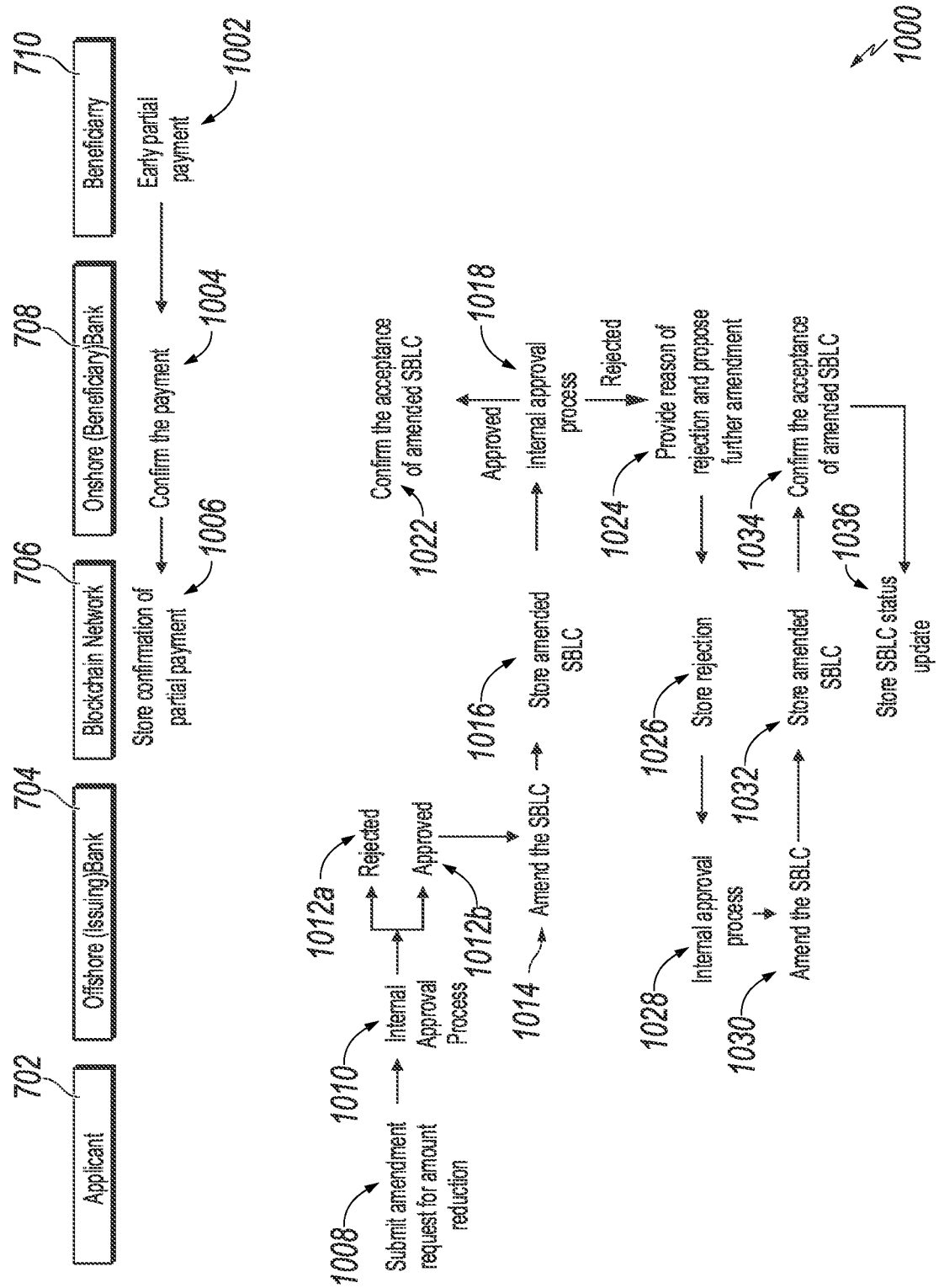
FIG. 10 is a swim-lane diagram illustrating an example of a blockchain-based letter of credit amendment process in accordance with embodiments of this specification.

FIG. 10 is a swim-lane diagram illustrating an example of a blockchain-based letter of credit amendment process 1000 in accordance with embodiments of this specification. In this example, the letter of credit is a standby letter of credit, but the same principle can be applied to other types of letters of credit. The participants of the process 1000 can include the applicant 702, the offshore (issuing) bank 704, the blockchain network 706, the onshore (beneficiary) bank 708, and the beneficiary 710. In some embodiments, the process 1000 is performed after a partial payment is made by the applicant 702 to the beneficiary 710 in accordance with a purchase order contract between the two parties. In some examples, the partial payment can be made through traditional financial channels such as wire transfer between the issuing bank 704 that serves the applicant 702 and the beneficiary bank 708 that serves the beneficiary 710. Assuming that the guaranteed loan amount in the SBLC covers the full payment of the order, because a partial payment is made, the applicant 702 can request the beneficiary 710 to confirm the partial payment. After confirmation, the applicant 702 may request the issuing bank 704 to amend the SBLC by reducing the guaranteed loan amount to the full payment of the purchase order less the partial payment. As such, the beneficiary cannot obtain more than the full payment amount of the order from the beneficiary 702 and the issuing bank 704 by filing a claim against the SBLC.

At 1002, the beneficiary 710 receives a partial payment from the applicant 702 before the expiration date of the SBLC. The beneficiary 710 can then notify the beneficiary bank 708 about the partial payment. At 1004, the beneficiary bank 708 can confirm the partial payment and submit the confirmation to the issuing bank 704 and the applicant 702 through the blockchain network 706. At 1006, the blockchain nodes of the blockchain network 706 reaches consensus and stores the confirmation of partial payment on the blockchain and delivers the confirmation to the issuing bank 704 and/or the applicant 702. For example, the beneficiary bank 708 can invoke a smart contract on the blockchain to initiate the consensus process at the blockchain nodes, store the confirmation of partial payment on the blockchain, and deliver a message about the confirmation of partial payment to the issuing bank 704 and the applicant 702.

In response to identifying the confirmation of partial payment stored on the blockchain, the applicant 702 can request the issuing bank 704 to submit an amendment request of the SBLC to reduce the guaranteed amount of loan at 1008. The reduction can be equal to the amount of the partial payment confirmed by the beneficiary 710 received through the blockchain network 706. At 1010, the issuing bank 704 can perform an internal approval process for the amendment request. In some embodiments, the issuing bank 704 can refer to information stored on the blockchain to perform the internal approval process. For example, in response to receiving the amendment request, the issuing bank 704 can check whether a confirmation of partial payment by the beneficiary bank 706 is stored on the blockchain. If no confirmation is found, the issuing bank 704 can either reject the amendment request or ask the applicant 702 to provide proof of the payment. Assuming that a confirmation by the beneficiary bank 706 is found on the blockchain, the issuing bank 704 can reject the amendment request at 1012*a* if the amendment request is flawed. For example, the amendment is flawed if the amount is not correctly stated, the SBLC has expired, or a claim is filed by the beneficiary 710. Otherwise, the issuing bank 704 can approve the request for amendment at 1012*b*. At 1014, the issuing bank 704 can amend the SBLC based on the amendment request and encrypt the amended SBLC to generate a cyphertext for the amended SBLC, in which the cyphertext is to be stored on the blockchain.

At 1016, the blockchain nodes of the blockchain network 706 reach consensus to store the cyphertext of the amended SBLC on the blockchain and deliver the message about the amended SBLC to the beneficiary bank 708. For example, a blockchain node connected to the issuing bank 704 can invoke the smart contract on the blockchain to initiate the consensus process at the blockchain nodes. At 1018, the beneficiary bank 708 performs an internal approval process to review the amended SBLC. If approved, the beneficiary bank 708 can confirm acceptance of the amended SBLC at 1022. In some examples, the beneficiary bank 708 can submit the conformation to the blockchain network 706 to be stored on the blockchain. Otherwise, at 1024, the beneficiary bank 708 can reject the amended SBLC, provide reasons for the rejection, and propose further amendment of the SBLC.

At 1026, the blockchain network 706 stores the rejection decision on the blockchain and delivers the message about the reasons of rejection and proposed amendment to the issuing bank 704. For example, a blockchain node connected to the beneficiary bank 708 can invoke the smart contract on the blockchain associated with the blockchain network 706 to perform the step. At 1028, the issuing bank 704 performs an internal approval process of the proposed amendments based on the reasons of rejection provided by the beneficiary bank 708. If approved, the issuing bank 704 can amend the SBLC based on the amendment proposed by the beneficiary bank 708 at 1030. The issuing bank 704 can then encrypt the amended SBLC to generate a cyphertext of the amended SBLC, in which the cyphertext is to be stored on the blockchain.

At 1032, the blockchain nodes of the blockchain network 706 reach consensus to store the cyphertext of the amended SBLC on the blockchain, store the cyphertext of the amended SBLC on the blockchain, and deliver the message about the amended SBLC to the beneficiary bank 708. For example, a blockchain node connected to the issuing bank 704 can invoke the smart contract on the blockchain to initiate the consensus process at the blockchain nodes. At 1034, the beneficiary bank 708 can confirm the acceptance of the amended SBLC and request the status update to be recorded on the blockchain. At 1036, the blockchain network 706 can update the status of the SBLC as "amendment accepted." For example, a blockchain node connected to the beneficiary bank 708 can invoke the smart contract on the blockchain to update the SBLC status to "amendment accepted."

Figure 11:
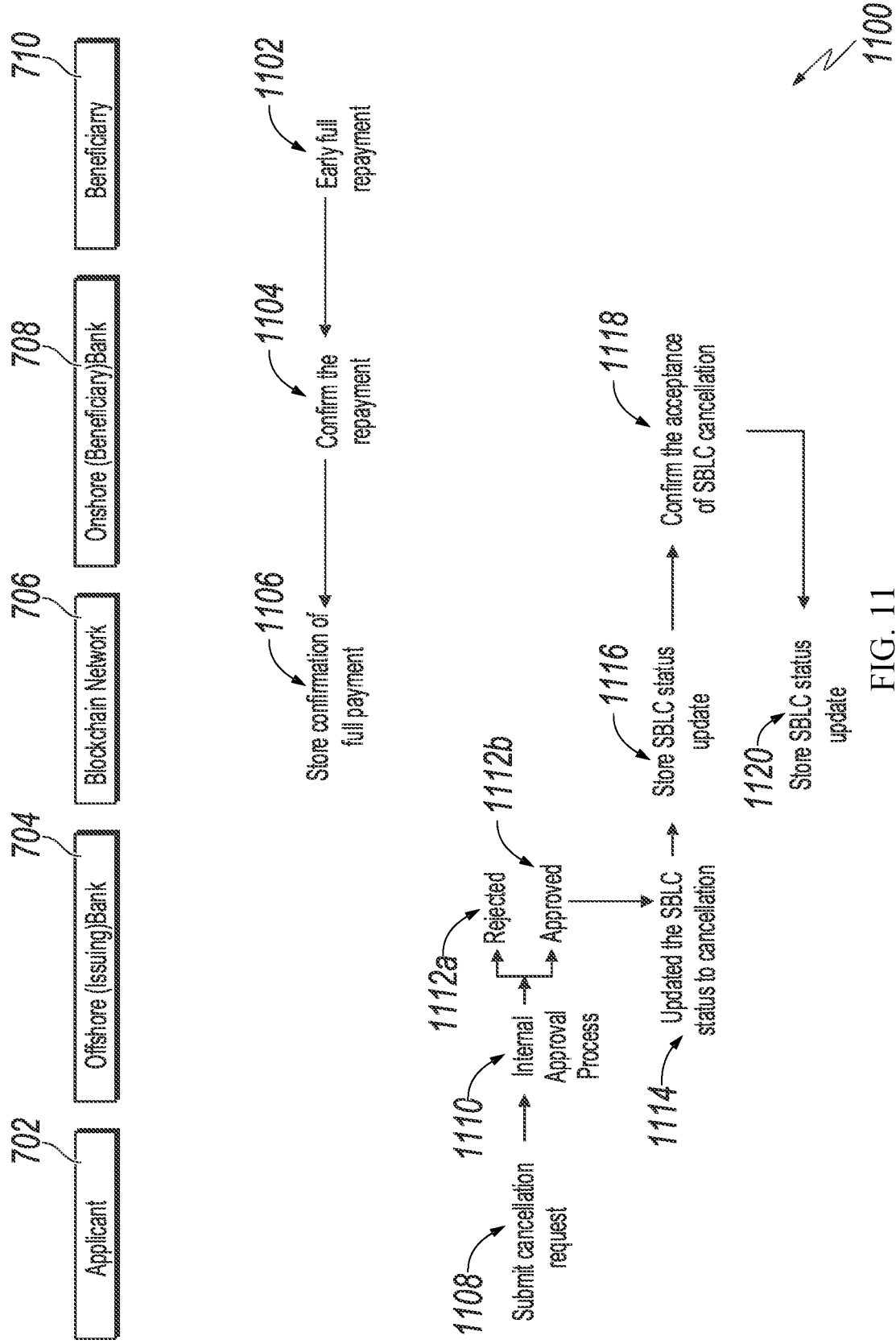
FIG. 11 is a swim-lane diagram illustrating an example of a blockchain-based letter of credit cancellation process in accordance with embodiments of this specification.

FIG. 11 is a swim-lane diagram illustrating an example of a blockchain-based letter of credit cancellation process 1100 in accordance with embodiments of this specification. In this example, the letter of credit is a standby letter of credit, but the same principle can be applied to other types of letters of credit. The participants of the process 1100 can include the applicant 702, the offshore (issuing) bank 704, the blockchain network 706, the onshore (beneficiary) bank 708, and the beneficiary 710. In some embodiments, the process 1100 is performed after a full payment is made by the applicant 702 to the beneficiary 710 in accordance to a purchase order contract between the two parties. In some examples, the full payment can be made through traditional financial channels such as wire transfer between the issuing bank 704 that serves the applicant 702 and the beneficiary bank 708 that serves the beneficiary 710. Assuming that the guaranteed loan amount in the SBLC covers the full payment of the order, because a payment is made in full, the applicant 702 can request the beneficiary 710 to confirm the payment. After confirmation, the applicant 702 may request the issuing bank 704 to cancel the SBLC since the applicant 702 is cleared of any duty to pay the beneficiary 710.

At 1102, the beneficiary 710 receives a full payment from the applicant 702 before the expiration date of the SBLC. The beneficiary 710 can then notify the beneficiary bank 708 about the full payment. At 1104, the beneficiary bank 1004 can confirm the payment and submit the confirmation to the issuing bank 704 and the applicant 702 through the blockchain network 706. At 1106, the blockchain nodes of the blockchain network 706 reach consensus and store the confirmation of full payment on the blockchain. The blockchain network 706 delivers the confirmation to the issuing bank 704 and/or the applicant 702. For example, the beneficiary bank 708 can invoke a smart contract on the blockchain to initiate the consensus process at the blockchain nodes, store the confirmation of full payment on the blockchain, and deliver a message about the confirmation of full payment to the issuing bank 704 and the applicant 702.

In response to identifying the confirmation of full payment stored on the blockchain, the applicant 702 can request the issuing bank 704 to submit a cancellation request of the SBLC at 1112. At 1110, the issuing bank 704 can perform an internal approval process for the cancellation request. In some embodiments, the issuing bank 704 can refer to information stored on the blockchain to perform the internal approval process. For example, in response to receiving the cancellation request, the issuing bank 704 can check whether a confirmation of full payment by the beneficiary bank 708 is stored on the blockchain. If no confirmation is found, or if there is a record of an outstanding claim filed by the beneficiary 710, the issuing bank 704 can either reject the cancellation request at 1112*a* or ask the applicant 702 to provide proof of the full payment. Assuming that a confirmation by the beneficiary bank 708 is found on the blockchain, the issuing bank 704 can still reject the cancellation request at 1112*a* if the cancellation request is invalid. For example, the cancellation request is invalid if the SBLC has already expired. Otherwise, the issuing bank 704 can approve the cancellation request at 1112*b*. If approved, the issuing bank 704 can update the SBLC status to "cancellation requested" at 1114.

At 1116, the blockchain network 706 stores the SBLC status update on the blockchain and delivers the message about the cancellation request to the beneficiary bank 708. For example, a blockchain node connected to the beneficiary bank 708 can invoke the smart contract on the blockchain associated with the blockchain network 706 to perform the step. At 1118, the beneficiary bank 708 can confirm the acceptance of the SBLC cancellation and request the status update to be recorded on the blockchain. At 1120, the blockchain network 706 can update the status of the SBLC as "cancelled." For example, a blockchain node connected to the beneficiary bank 708 can invoke the smart contract on the blockchain to update the SBLC status to "cancelled."

Figure 12:
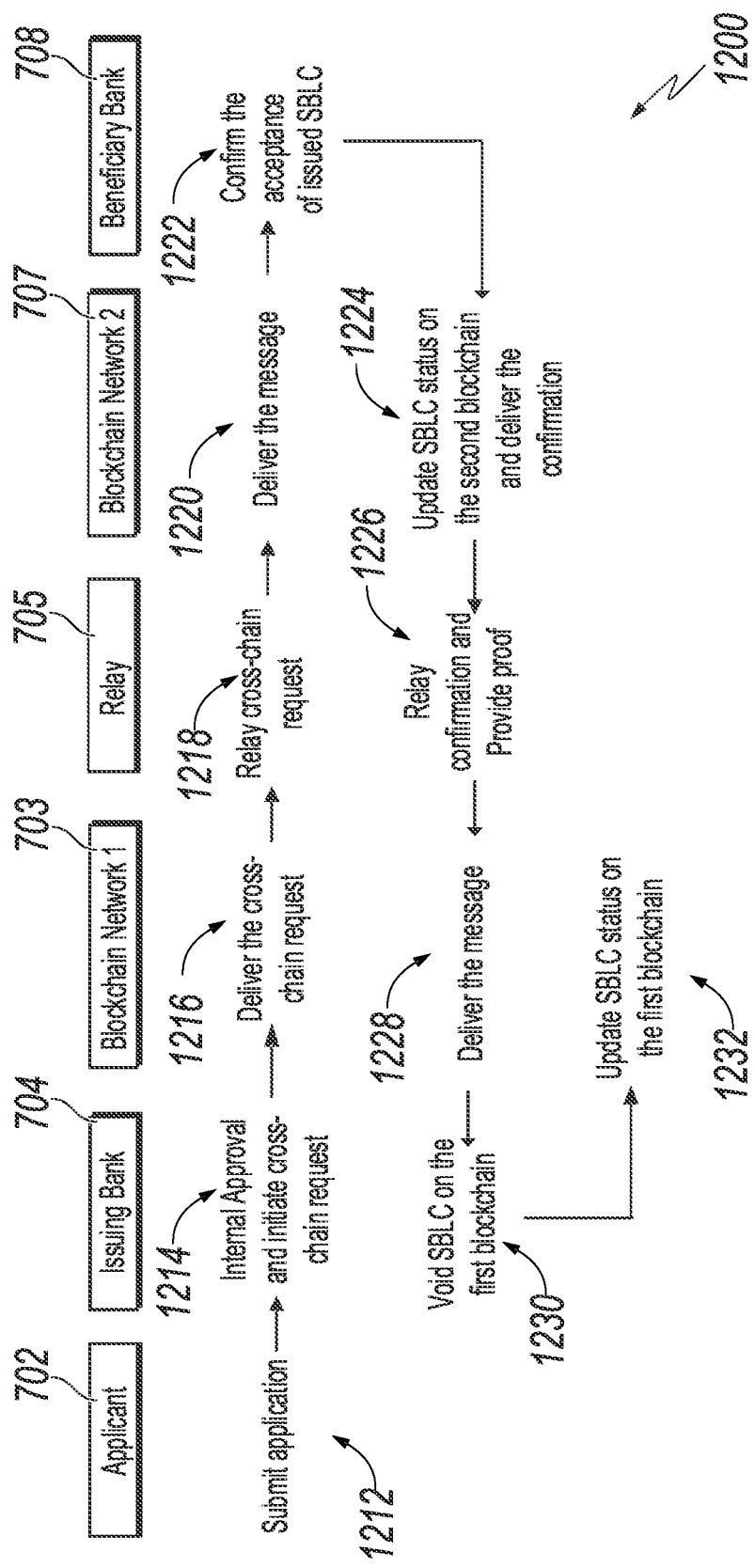
FIG. 12 is a swim-lane diagram illustrating an example of a SBLC issuing process based on cross-chain technology in accordance with embodiments of this specification

FIG. 12 is a swim-lane diagram illustrating an example of a SBLC issuing process 1200 based on cross-chain technology in accordance with embodiments of this specification. The participants of the process 1200 can include an applicant 702, an issuing bank 704, a blockchain network 1 703, a relay 705, a blockchain network 2 707, and a beneficiary bank 708. Cross-chain technology is developed to facilitate interactions and interoperability between different blockchains. As discussed earlier, the issuing bank 704 is often an offshore bank of a buyer of a business transaction. The beneficiary bank 708 is often the onshore bank of the seller located in a different country or associated with a different financial system. Therefore, the issuing bank 704 and the beneficiary bank 708 can have blockchain nodes (such as the cloud nodes discussed in the description of FIG. 3) connecting to different blockchain networks. In the example illustrated in FIG. 12, the issuing bank 704 has a blockchain node connecting to the blockchain network 1 703. The beneficiary bank 708 has a blockchain node connecting to the blockchain network 2 707.

In some embodiments, a relay 705 can be used to facilitate interactions between the blockchain network 1 703 and the blockchain network 2 707. The relay 705 is a trusted entity and can take various forms. In some examples, the relay 705 can be a blockchain node of the blockchain network 1 703 and the blockchain network 2 707. In some examples, the relay 705 can be a trusted node, which performs data verification before relaying cross-chain data between the blockchain network 1 703 and the blockchain network 2 707. In some examples, the relay 705 can also simply relay the cross-chain data without performing data verification. In some examples, the relay 705 can be a blockchain network, which performs data verification through consensus before relay cross-chain data between the blockchain network 1 703 and the blockchain network 2 707.

The trustworthiness of the relay 705 can be achieved based on various technologies in accordance with embodiments of this specification. For example, the technologies can include, TEE, proof of authority (POA), secure multi-party computation, ZKP, consensus algorithms, etc.

At 1212, the applicant 702 can submit an application of an SBLC to the issuing bank 704. As discussed in the description of FIG. 7, the applicant 702 and the beneficiary can agree on the terms of the SBLC, such as the guaranteed amount of loan in the SBLC. After receiving the application, the issuing bank 704 can input or store the information in the application to the bank's internal system. For example, the information input can be performed through the APP 402 as discussed in the description of FIG. 4. In some examples, the issuing bank 704 can also convert the application to a standard source code format of SBLC. The issuing bank 704 can then perform an internal approval process of the application and initiate cross-chain request at 1214 after approval.

In some examples, the internal approval process can involve the issuing bank 704 verifying whether any of the required information for approval is missing in the application. If any required information is missing, the application can be rejected, and the issuing bank 704 can request the applicant 702 to supplement the missing information. The issuing bank 704 can also verify whether the applicant 702 has enough credit to pay off the guaranteed amount of loan in the SBLC in case of default. For example, if the applicant has a bank account with the issuing bank 704, the issuing bank 704 can verify whether the bank account has a balance exceeding the guaranteed amount of loan. In some examples, the issuing bank can also check whether the applicant 702 has submitted other proofs of credit. If there is not enough credit to cover the guaranteed amount of loan, the issuing bank 704 can reject the application. Otherwise, the issuing bank 704 can approve the application. After approval of the SBLC, the issuing bank 704 can finalize the SBLC source code, encrypt the SBLC source code, generate proofs, and include the encrypted SBLC and the proofs in a cross-chain request to the blockchain network 2 707.

At 1216, the cross-chain request can be stored on a first blockchain associated with the blockchain network 1 703 through consensus and delivered to the relay 705. For example, a blockchain node (e.g., a cloud node) connected to the issuing bank's 704 internal system can submit the cross-chain request for consensus. After the blockchain nodes verify the proofs that prove the legitimacy of the SBLC, the blockchain nodes can perform consensus and store the encrypted SBLC in one or more blocks to be appended to the first blockchain. Details of generating and recording encrypted SBLC on the blockchain are discussed earlier in the descriptions of FIGS. 5 and 6.

At 1218, the relay 705 can relay the cross-chain request to the blockchain network 2 707. The relay 705 can be a trusted entity for both the blockchain network 1 703 and the blockchain network 2 707. The system is configured to ensure that the cross-chain data to be relayed are actually stored on the first blockchain such that it can be trusted. In some embodiments, the relay 705 can monitor cross-chain messages and relay the messages after they are verified to be stored on the first blockchain. In some embodiments, blockchain nodes of the blockchain network can generate proofs. The relay 705 can retrieve and verify the proofs to confirm that the cross-chain messages originate from the first blockchain. In some embodiments, verification data can be pre-stored in simple payment verification (SPV) nodes of the destination blockchain network. The SPV nodes can obtain the cross-chain data through the relay 705, verify the authenticity of the cross-chain data, and forward the verified cross-chain data to the destination. Additional details and embodiments of relaying cross-chain data are described in, e.g., PCT application No. PCT/CN2019/106610, filed on Sep. 19, 2019 and PCT application No. PCT/CN2020/071574, filed on Jan. 11, 2020, the contents of which are incorporated by reference.

At 1220, the blockchain network 2 707 records the cross-chain request through consensus and delivers the encrypted SBLC to the beneficiary bank 708. The beneficiary bank 708 can perform decryption of the encrypted SBLC based on the encryption key negotiated with the issuing bank 702. The beneficiary bank 708 can then confirm the acceptance of the SBLC at 1222 and request the blockchain network 2 707 to record the updated SBLC status on a second blockchain associated with the blockchain network 2 707 through consensus. In some embodiments, the beneficiary bank 708 can also send a cross-chain request to deliver the confirmation to the issuing bank 708.

At 1224, the blockchain network 2 707 can update the SBLC status on the second blockchain as "issued" through consensus and deliver the confirmation to the relay 705. At 1226, the relay 705 can verify that the SBLC is issued on the second blockchain, provide proof of the verification, and relay the confirmation of acceptance to the blockchain network 1 703.

At 1228, the blockchain nodes of the blockchain network 1 703 can verify the proof that the SBLC is issued on the second blockchain and deliver the verification result and the confirmation of acceptance to the issuing bank 704. In some embodiments, roots of trust (RoT) can be deployed on blockchain nodes of the blockchain network 1 703. The RoT can be hardware modules that host a TEE. After receiving the proof and the confirmation of acceptance, the blockchain nodes can use the RoT to verify the proof that the issuance of the SBLC on the second blockchain has been verified by the relay 705.

At 1230, the issuing bank 704 can void the SBLC stored on the first blockchain in response to receiving the verification result and that the acceptance of the SBLC has been confirmed by the beneficiary bank 708. This is to ensure that only one issued SBLC is effective, so that the beneficiary cannot obtain double payment from SBLCs stored on both the first and the second blockchains. At 1232, the blockchain network 1 703 can update the SBLC status on the first blockchain as "void."

In this specification, when describing the processes for handling events related to the lifecycle of the guarantees, such as processes 700, 800, 900, 1000, 1100, and 1200, for ease of illustration we may say that a computing device associated with an entity transmits a first message, receives a second message, transmits a third message, receives a fourth message, and so forth. It is understood that the same or different computing devices associated with the entity can be used to transmit or receive the first, second, third, and fourth messages, and so forth. Thus, for example, the phrase "a computing device associated with an entity," depending on context, can mean multiple computing devices associated with the entity, in which a first one of the multiple computing devices performs a first task and a second one of the multiple computing devices performs a second task, and so forth.

Figure 13:
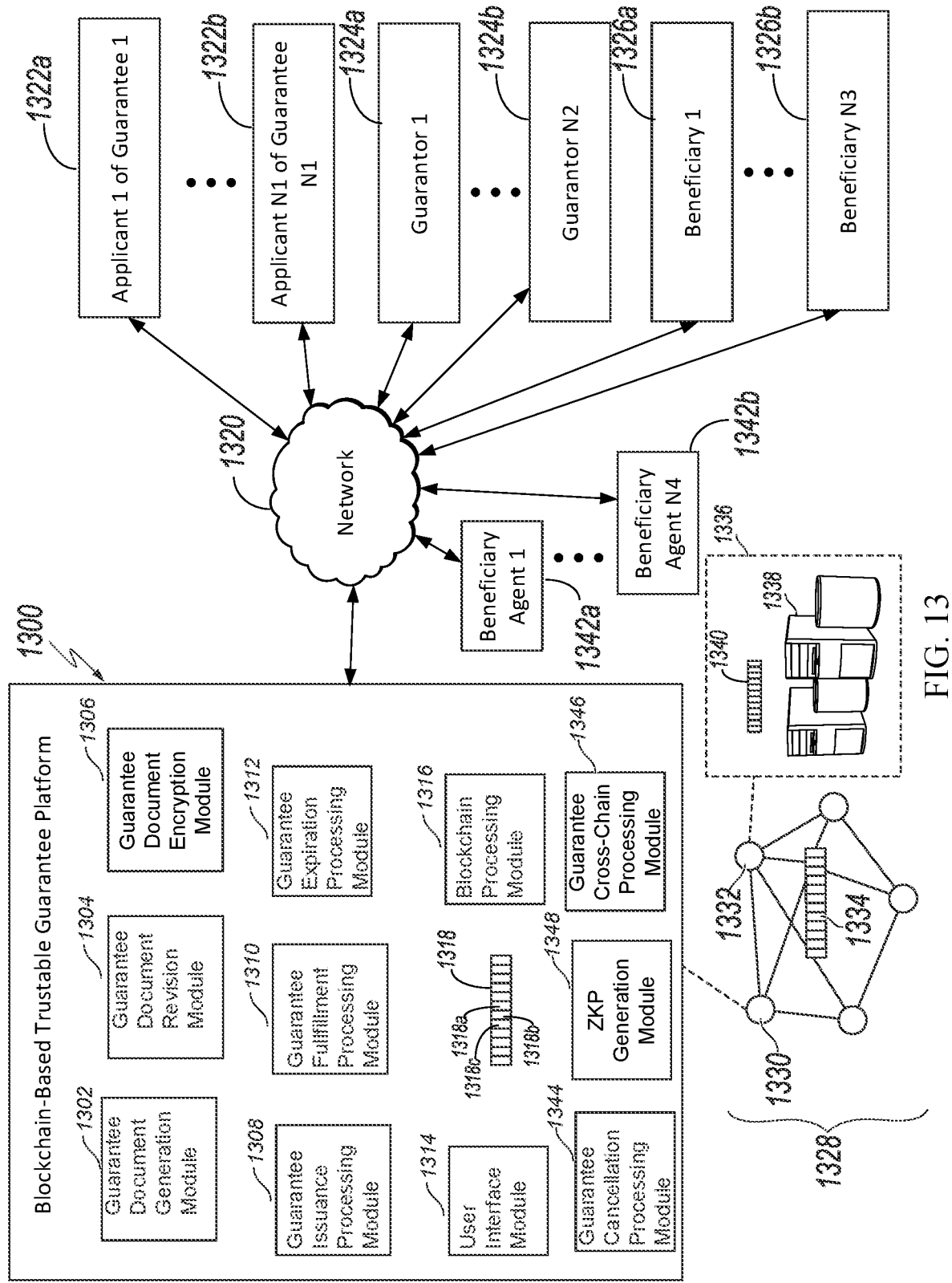
FIG. 13 is a diagram of an example of a system for implementing a trustable guarantee platform for enabling trustable guarantees in accordance with embodiments of this specification.

FIG. 13 is a diagram of an example of a system for implementing a blockchain-based trustable guarantee platform 1300 for enabling trustable guarantees. The trustable guarantee platform 1300 can provide services related to various stages of lifecycles of guarantees. In this example, the trustable guarantee platform 1300 provides services to a first applicant of a first guarantee 1322a, a second applicant of a second guarantee, . . . , an N1-th applicant of an N1-th guarantee 1322b (collectively referenced as 1322), a first guarantor 1324a, a second guarantor, . . . , an N2-th guarantor 1324b (collectively referenced as 1324), a first beneficiary 1326a, a second beneficiary, . . . , an N3-th beneficiary 1326b (collectively referenced as 1326), a first beneficiary agent 1342a, a second beneficiary agent, . . . , and an N4-th beneficiary agent 1342b (collectively referenced as 1342).

For example, the first applicant 1322a may be a buyer who intends to buy goods from the beneficiary 1326a, who may be a seller of the goods. The first applicant 1322a may apply for a first guarantee to be issued by the first guarantor 1324a, which may be an issuing bank (or offshore bank) that serves the first applicant 1322a. The first guarantor 1324a may interact with the first beneficiary agent 1342a, which may be a beneficiary bank (or onshore bank) that serves the first beneficiary 1326a.

In some examples, a guarantee may involve an applicant 1322, a guarantor 1324, a beneficiary 1326, and a beneficiary agent 1342. The applicant 1322 has an agreement with the beneficiary 1326 in which the applicant 1322 agrees to pay the beneficiary 1326 a predetermined amount of money by a predetermined due date. The guarantor 1324 issues the guarantee as an assurance that the beneficiary 1326 will receive the predetermined amount of money by the predetermined due date in the event that the applicant 1322 is unable to pay the full predetermined amount by the due date. The guarantor 1324 interacts with the beneficiary agent 1342 to carry out the processes related to the guarantee.

The trustable guarantee platform 1300 is configured to provide tools (e.g., web based portals and interfaces, and smart contracts) that enable the applicant 1322, guarantor 1324, the beneficiary 1326, and the beneficiary agent 1342 to conveniently and timely implement the processes associated with the various events in the lifecycle of the guarantee. For example, the trustable guarantee platform 1300 can provide web-based user interfaces that facilitate the application, issuance, amendment, drawdown, expiration, and cancelation of guarantees by the relevant parties, and facilitate recording of information related to the application, issuance, amendment, drawdown, expiration, and cancelation of guarantees in one or more blockchains.

For example, the guarantee can be a letter of credit, and the trustable guarantee platform 1300 can provide tools to implement the blockchain-based letter of credit issuing process 700 of FIG. 7, the blockchain-based letter of credit drawdown process 800 of FIG. 8, the blockchain-based letter of credit expiration process 900 of FIG. 9, the blockchain-based letter of credit amendment process 1000 of FIG. 10, the blockchain-based letter of credit cancellation process 1100 of FIG. 11, and the SBLC issuing process 1200 based on cross-chain technology shown in FIG. 12.

In general, each of the guarantors 1324 can issue one or more guarantees to each of one or more applicants 1322, and each applicant 1322 can apply for one or more guarantees from each of one or more guarantors 1324. One or more guarantors 1324 can issue a guarantee to an applicant 1322. A guarantor 1324 can issue a guarantee to one or more applicants 1322. Each guarantee can have one or more beneficiaries.

In some implementations, the trustable guarantee platform 1300 includes a guarantee document generation module 1302, a guarantee document revision module 1304, a guarantee document encryption module 1306, a guarantee issuance processing module 1308, a guarantee fulfillment processing module 1310, a guarantee expiration processing module 1312, a guarantee cancellation processing module 1344, a guarantee cross-chain processing module 1346, a zero-knowledge proof generation module 1348, a user interface module 1314, and a blockchain processing module 1316. The guarantee document generation module 1302 is configured to generate guarantee documents, such as the source code of a guarantee, e.g., the source code 500 of an SBLC. For example, in the process 700 of FIG. 7, the offshore (issuing) bank 704 can generate the SBLC using its own system or use the guarantee document generation module 1302. In some implementations, the guarantee document generation module 1302 is a web-based tool that provides guarantee document templates that allow the offshore bank 704 to conveniently generate the guarantee documents. The guarantee document revision module 1304 is configured to facilitate revision of guarantee documents using a process equivalent or similar to the process 700 in FIG. 7 and/or the process 1000 in FIG. 10.

The guarantee document encryption module 1306 is configured to encrypt guarantee documents, and generate encryption keys. The zero-knowledge proof generation module 1348 is configured to generate zero knowledge proofs. The guarantee issuance processing module 1308 is configured to facilitate issuance of guarantees using a process equivalent or similar to the process 700 of FIG. 7. The guarantee fulfillment processing module 1310 is configured to handle processes related to fulfilling guarantees, such as processing drawdown requests using a process equivalent or similar to the process 800 in FIG. 8.

The guarantee expiration processing module 1312 is configured to handle processes related to expiration of guarantees using a process equivalent or similar to the process 900 of FIG. 9. The guarantee cancellation processing module 1344 is configured to handle processes related to cancellation of guarantees using a process equivalent or similar to the process 1100 of FIG. 11. The guarantee cross-chain processing module 1346 is configured to handle processes that involve multiple blockchain networks, such as facilitating a SBLC issuing process based on cross-chain technology using a process equivalent or similar to the process 1200 of FIG. 12.

Information related to the guarantee and the events in the lifecycle of the guarantee can be recorded in a blockchain 1334 that is maintained by a blockchain network 1328. The blockchain processing module 1316 functions as a blockchain node 1330 of the blockchain network 1328 and maintains a local copy 1318 of the blockchain 1334. The blockchain 1318 can include records, e.g., 1318a, 1318b, 1318c. Other entities, such as entity 1336, may participate as a blockchain node 1332 of the blockchain network 1328, in which the entity 1336 may include computer servers 1338 that maintain a local copy 1340 of the blockchain 1334 and perform mining and/or consensus operations.

In some implementations, the blockchain-based trustable guarantee platform 1300 can provide a cloud service to the applicants 1322, the guarantors 1324, the beneficiaries 1326, and the beneficiary agents 1342 to facilitate the various processes related to processing guarantees. Each of the applicants 1322, the guarantors 1324, the beneficiaries 1326, and the beneficiary agents 1342 has an account with the platform 1300, and the private data belonging to each entity are not shared with other entities. Some modules may process data that are private to a particular application, a particular guarantor, a particular beneficiary, or a particular beneficiary representative, and the private data cannot be accessed by any other party.

For example, the guarantee document generation module 1302 can be used by the guarantors 1324 in generating guarantee documents. The guarantee document encryption module 1306 can be used by the guarantors 1324 to generate encryption keys and generate cyphertexts of the guarantee documents. The zero-knowledge proof generation module 1348 can be used by the guarantors 1324 to generate zero-knowledge proofs. The guarantee documents generated by the guarantee document generation module 1302 for a first guarantor 1324 cannot be accessed by any other guarantor 1324 without permission of the first guarantor 1324. The encryption keys generated by the guarantee document encryption module 1306 for the first guarantor 1324 cannot be accessed by any other guarantor 1324 without permission of the first guarantor 1324. The zero-knowledge proofs generated by the zero-knowledge proof generation module 1348 for the first guarantor 1324 cannot be accessed by any other guarantor 1324 without permission of the first guarantor 1324.

In some implementations, the user interface module 1314 can provide an integrated user interface (e.g., in the form of a web portal) that enables the applicants 1322, the guarantors 1324, the beneficiaries 1326, and the beneficiary agents 1342 to access the functions of the various modules (e.g., 1302, 1304, 1306, 1308, 1310, 1312, 1316, 1344, 1346, and 1348) of the trustable guarantee platform 1300. For example, the integrated user interface can be used by an applicant 1322 to submit an application for a guarantee and keep track of the status of the application, and/or invoke the guarantee cancellation processing module 1344 to facilitate cancellation of a guarantee. The integrated user interface can be used by a guarantor 1324 to invoke the guarantee document generation module 1302 to generate a guarantee document, invoke the guarantee document encryption module 1306 to generate a cyphertext of a guarantee document and generate encryption keys, invoke the zero-knowledge proof generation module 1348 to generate zero-knowledge proofs, invoke the guarantee cross-chain processing module 1346 to facilitate interactions between two or more blockchain networks, or any combination of the above. The integrated user interface can be used by a guarantor 1324 to invoke the guarantee issuance processing module 1308 to issue a guarantee. The integrated user interface can be used by a beneficiary agent 1342 to invoke the guarantee fulfillment processing module 1310 to process a drawdown request, and/or to invoke the guarantee expiration processing module 1312 to confirm expiration of a guarantee.

Figure 14A:
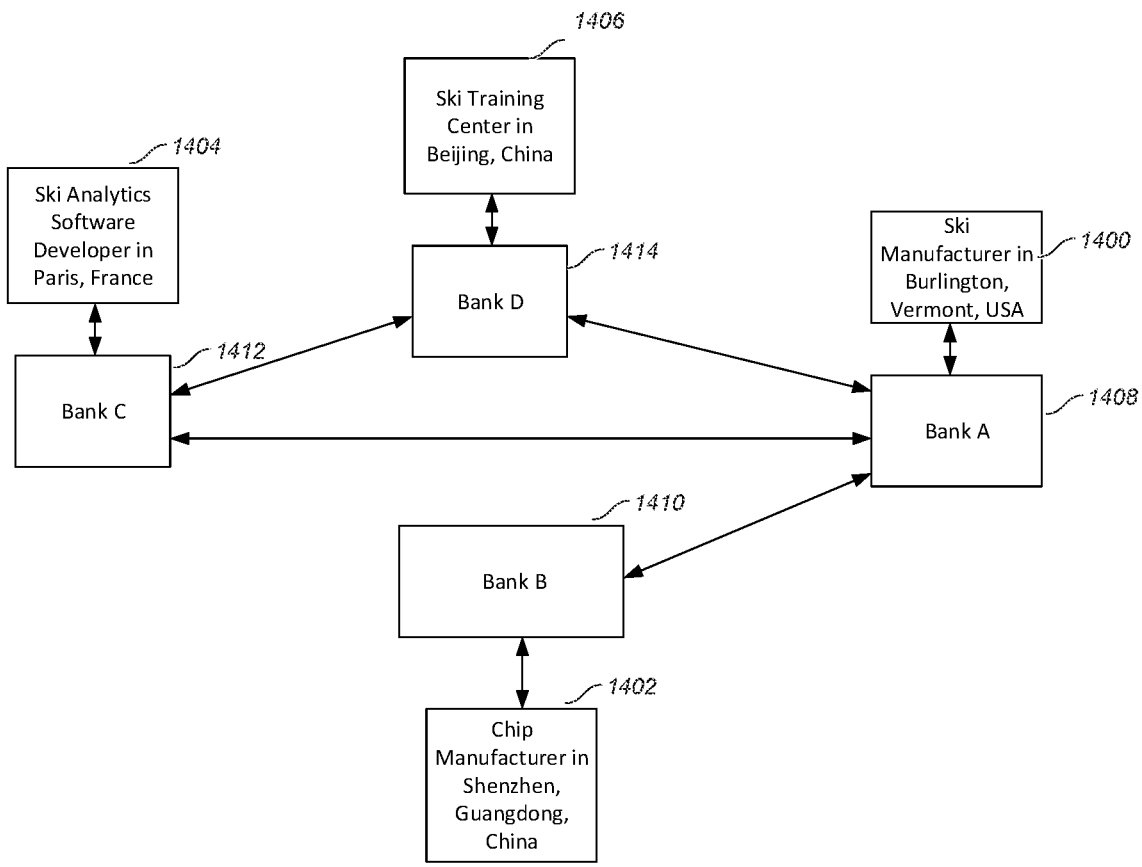
FIGS. 14a and 14b are diagrams illustrating an example of using the blockchain-based trustable guarantee platform in accordance with embodiments of this specification.
Figure 14B:
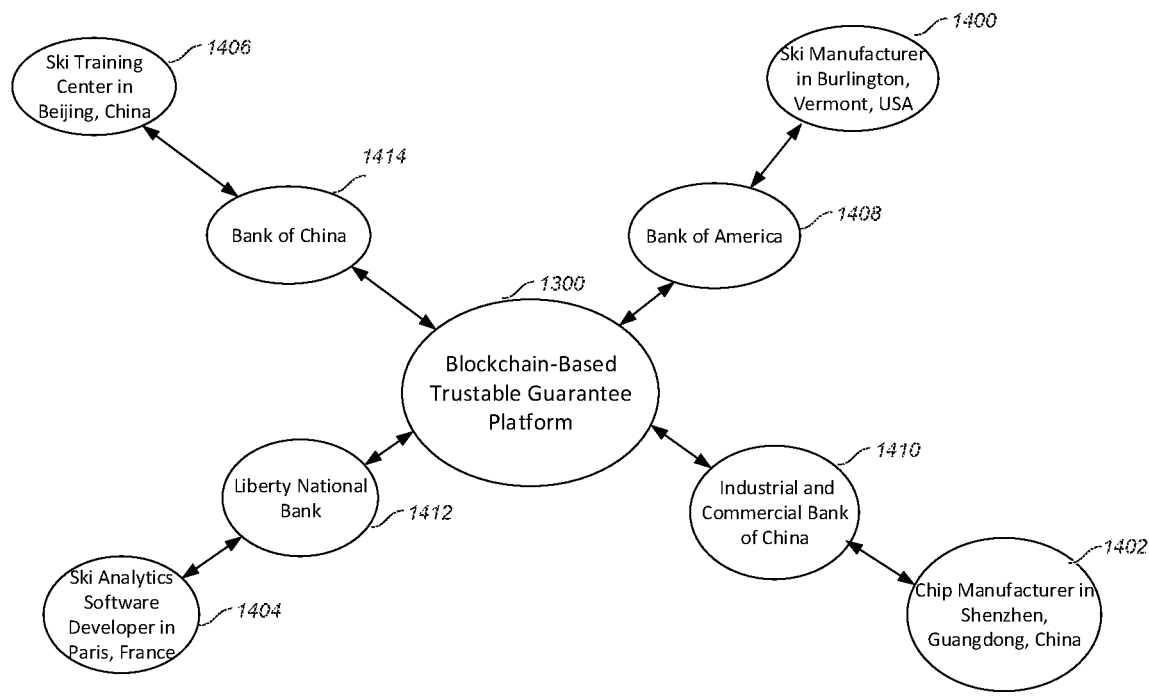

FIGS. 14a and 14b are diagrams illustrating an example of how the blockchain-based trustable guarantee platform 1300 can be used by applicants for letters of credit, a guarantor, and beneficiaries. FIG. 14a shows the relationships between the applicants, guarantors, and beneficiaries. FIG. 14b shows the relationship between the blockchain-based trustable guarantee platform 1300 and the applicants, guarantors, and the beneficiaries. In this example, a ski manufacture 1400 in Burlington, Vt., USA has developed a new type of skis that use semiconductor chips made by a chip manufacturer 1402 in Shenzhen, Guangdong, China. The skis can be used with ski analytics software developed by a software developer 1404 in Paris, France. A ski training center 1406 in Beijing, China plans to purchase the skis made by the ski manufacturer 1400 and distribute them to ski racing teams for training in preparation for the 2022 Winter Olympics.

The ski manufacturer 1400 signs a purchase agreement with the chip manufacturer 1402, in which the ski manufacturer 1400 agrees to pay USD $1 million to the chip manufacturer 1402 within 30 days of delivery of 100,000 chips that can be installed on the skis. The ski manufacturer 1400 and the chip manufacturer 1402 have no previous relationship with each other, and the chip manufacturer 1402 is not sure whether the ski manufacturer 1400 can be trusted to pay on time. The chip manufacturer 1402 asks the ski manufacturer 1400 to provide an SBLC that guarantees payment of USD $1 million. The ski manufacturer 1402 has an account with an issuing bank (or offshore bank) 1408, which in this example is Bank A. The chip manufacturer 1402 has an account with a beneficiary bank (or onshore bank) 1410, which in this example is Bank B.

The ski manufacturer 1400 accesses the trustable guarantee platform 1300 to obtain an SBLC of USD $1 million from the issuing bank (in this example, Bank of America) 1408 in accordance with the blockchain-based letter of credit issuing process 700 of FIG. 7. The SBLC is recorded in a blockchain (e.g., using a step equivalent or similar to step 718), and upon confirmation of acceptance of the SBLC by the beneficiary bank (Industrial and Commercial Bank of China) 1410, the status of the SBLC is updated to "issued" (e.g., using a step equivalent or similar to step 722). For example, if prior to the SBLC being accepted by the beneficiary bank 1410, the beneficiary bank 1410 finds a typo in the SBLC, the beneficiary bank 1410 can use the trustable guarantee platform 1300 to request amendment of the SBLC using a process including steps equivalent or similar to the steps 724 to 736.

After the chip manufacturer 1402 delivers the 100,000 chips to the ski manufacturer 1400, the ski manufacturer 1400 sends a payment of USD $1 million to the chip manufacturer 1402. Using the trustable guarantee platform 1300, the chip manufacturer 1402 notifies the beneficiary bank 1410 about the full payment, the beneficiary bank 1410 confirms the payment and submits the confirmation to the issuing bank 1408 and the ski manufacturer 1400, and the confirmation of full payment is stored in the blockchain (e.g., using steps equivalent or similar to steps 1104 and 1106 in FIG. 11). Using the trustable guarantee platform 1300, the ski manufacturer 1400 submits a request to cancel the SBLC using a process including steps equivalent or similar to the steps 1108 to 1120, resulting in the status of the SBLC being updated as "cancelled" and recorded in the blockchain.

For example, instead of one lump sum payment of USD $1 million, the ski manufacturer 1400 may agree to pay the chip manufacturer 1402 in two installments. After a first predetermined milestone is reached, the ski manufacturer 1400 pays USD $500,000 to the chip manufacturer 1402. The chip manufacturer 1402 confirms receipt of partial payment, and the confirmation of partial payment is stored in the blockchain using a process including steps equivalent or similar to steps 1002 to 1006 of FIG. 10. After making the partial payment, the ski manufacturer 1400 submits an amendment of the SBLC to reduce the guaranteed amount from USD $1 million to USD $500,000, resulting in the SBLC being amended and the amended SBLC being stored in the blockchain, using a process including steps equivalent or similar to the steps 1008 to 1036.

For example, the ski manufacturer 1400, the software developer 1404, and the ski training center 1406 signs an agreement in which (i) the ski manufacturer 1400 agrees to pay USD $200,000 to the software developer 1404 within 30 days of delivery of a general ski analytics software package that can process the data produced by custom chips integrated into the skis, and (ii) the ski training center 1406 agrees to pay USD $100,000 to the software developer 1404 within 30 days of delivery of a customized ski analytics software package that is specially configured for Chinese ski racers, plus a monthly payment of USD $10,000 for a duration of one year for software updates and services. The software developer 1404 has an account with a beneficiary bank 1412, which in this example is the Liberty National Bank. The ski training center 1406 has an account with an issuing bank 1414, which in this example is the Bank of China.

The ski manufacturer 1400 and the ski training center 1406 access the trustable guarantee platform 1300 to jointly obtain an SBLC from the issuing banks 1408 and 1414 using a process similar to the blockchain-based letter of credit issuing process 700 of FIG. 7. In this example, the SBLC has a total guaranteed amount of USD $420,000, in which the issuing bank 1408 (which serves the ski manufacturer 1400) guarantees USD $200,000, and the issuing bank 1414 (which serves the ski training center 1406) guarantees USD $220,000.

For example, the issuing bank 1408 (which serves the ski manufacturer 1400) and the issuing bank 1414 (which serves the ski training center 1406) are participant nodes of a first blockchain network that maintains a first blockchain. The beneficiary bank 1412 (which serves the software developer 1404) is a participant node of a second blockchain network that maintains a second blockchain. Initially, after the ski manufacturer 1400 and the ski training center 1406 apply for the SBLC, the SBLC is recorded in the first blockchain. The parties decide to transfer the SBLC from the first blockchain to the second blockchain. This can be achieved by using a process including steps equivalent or similar to the steps 1216 to 1232 of FIG. 12.

After the software developer 1404 delivers the general ski analytics software package to the ski manufacturer 1400 and the ski manufacturer 1400 pays USD $200,000 to the software developer 1404, the ski manufacturer 1400 can request amendment of the SBLC to reduce the guaranteed amount from USD $420,000 to USD $220,000, and update the status of the SBLC to confirm that the software developer 1404 has received the payment of USD $200,000 from the ski manufacturer 1400, using a process including steps equivalent or similar to the steps 1008 to 1036 of FIG. 10.

After the software developer 1404 delivers the customized ski analytics software package to the ski training center 1406 and the ski training center 1406 pays USD $100,000 to the software developer 1404, the ski training center 1406 can request amendment of the SBLC to reduce the guaranteed amount from USD $220,000 to USD $120,000, and update the status of the SBLC to confirm that the software developer 1404 has received the payment of USD $100,000 from the ski training center 1406, using a process including steps equivalent or similar to the steps 1008 to 1036 of FIG. 10. Afterwards, each time the ski training center 1406 makes a monthly payment of USD $10,000, the SBLC can be amended to reduce the guaranteed amount using the process described above. After paying the ski developer 1404 USD $10,000 each month for twelve months, the ski training center 1406 can request cancellation of the SBLC using a process including steps equivalent or similar to the steps 1108 to 1120 in FIG. 11.

The example of FIGS. 14*a* and 14*b* illustrate how the blockchain-based trustable guarantee platform 1300 provides an integrated system that can be used by companies located in different countries across different continents to conveniently handle the processes related to guarantees, such as letter of credits or standby letter of credits, to establish trust among the parties and facilitate business transactions, making it easy to do business anywhere.

Figure 15:
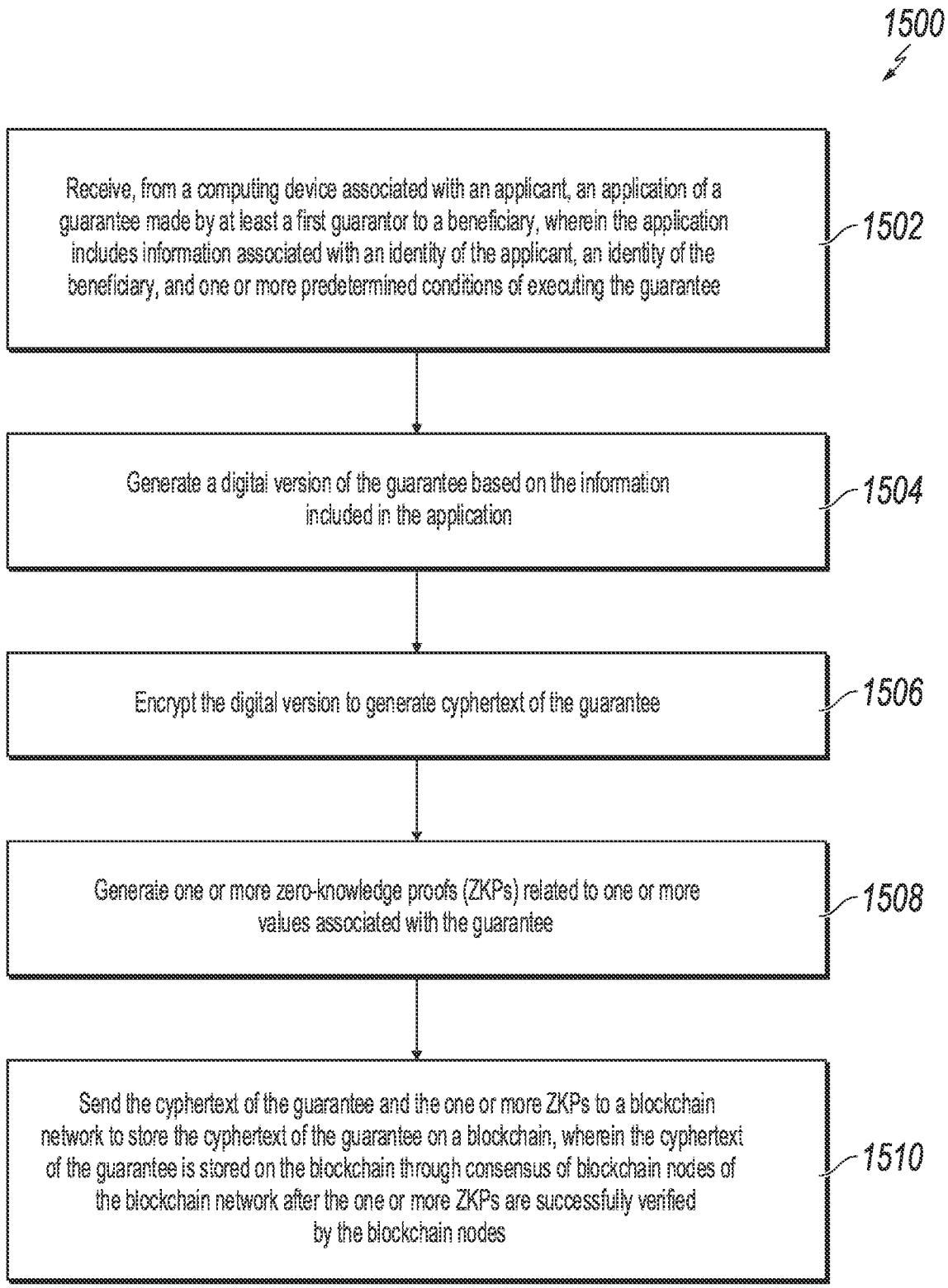
FIG. 15 depicts an example of a process that can be executed in accordance with embodiments of this specification.

FIG. 15 depicts an example of a process 1500 that can be executed in accordance with embodiments of this specification. For convenience, the process 1500 will be described as being performed by a system of one or more computers, located in one or more locations, and programmed appropriately in accordance with this specification. For example, an internal computer system, e.g., the internal system 401 of FIG. 4, appropriately programmed, can perform the process 1500.

At 1502, the computer system receives from a computing device associated with an applicant, an application of a guarantee made by at least a first guarantor to a beneficiary, wherein the application includes information associated with an identity of the applicant, an identity of the beneficiary, and one or more predetermined conditions of executing the guarantee.

At 1504, the computer system generates a digital version of the guarantee based on the information included in the application. At 1506, the blockchain node encrypts the digital version to generate cyphertext of the guarantee.

At 1508, the computer system generates one or more zero-knowledge proofs (ZKPs) related to one or more values associated with the guarantee. At 1510, the blockchain node sends the cyphertext of the guarantee and the one or more ZKPs to a blockchain network to store the cyphertext of the guarantee on a blockchain, wherein the cyphertext of the guarantee is stored on the blockchain through consensus of blockchain nodes of the blockchain network after the one or more ZKPs are successfully verified by the blockchain nodes.

In some cases, the guarantee is in a form of a SBLC. In some cases, the guarantee specifies that the guarantor shall pay the beneficiary a predetermined amount when the one or more predetermined conditions of executing the guarantee are met.

In some cases, the guarantor is an offshore bank that serves the applicant, and the predetermined amount is paid to the beneficiary through an onshore bank that serves the beneficiary when the one or more predetermined conditions are met.

In some cases, the application further includes information that specifies an identity of the onshore bank. In some cases, the application further includes information that proves the applicant is capable of paying off the predetermined amount in case of the applicant is in default of the SBLC.

In some cases, the identity of the applicant includes one or more of the applicant's name, address, phone number, e-mail address, and type of business. In some cases, the identity of the beneficiary includes one or more of the beneficiary's name, address, phone number, e-mail address, and type of business.

In some cases, the one or more predetermined conditions include one or more of default conditions, amendment conditions, cancelation conditions, effective date, and expiration date. In some cases, at least one of the one or more ZKPs is generated based on homomorphic encryption.

In some cases, the one or more ZKPs includes one or more of a range proof and a zero test. In some cases, an encryption key for encrypting the digital version is derived based on a linear secret sharing scheme.

In some cases, the guarantee is made by the first guarantor and a second guarantor to the beneficiary, the guarantee is in the form of a SBLC, and the guarantee specifies that the first guarantor and the second guarantor shall pay the beneficiary a predetermined amount when the one or more predetermined conditions of executing the guarantee are met.

In some cases, the first guarantor is a first bank that serves the applicant, the second guarantor is a second bank that serves the applicant, and the application further includes information that proves the applicant has sufficient funds in the first bank and the second bank to pay off the predetermined amount in case the applicant is in default of the SBLC.

In some cases, the process 1500 further comprises, verifying the one or more ZKPs and performing consensus based on the cyphertext of the guarantee after the one or more ZKPs are verified, and storing the cyphertext of the guarantee to the blockchain associated with the blockchain network after the consensus is successfully performed.

In some cases, the process 1500 further comprises, receiving, at a first computing device, an application of a guarantee to be made by a guarantor to a beneficiary, wherein the application includes information associated with an identity of the applicant, an identity of the beneficiary, and one or more predetermined conditions of executing the guarantee; transmitting the application to a second computing device associated with the guarantor; receiving, at the first computing device, a digital version of the guarantee that is generated based on the application; encrypting the digital version to generate a cyphertext of the guarantee; generating one or more ZKPs related to one or more values associated with the guarantee; and sending the cyphertext and the one or more ZKPs to a blockchain network to store the cyphertext on a blockchain, wherein the cyphertext is stored on the blockchain through consensus of blockchain nodes of the blockchain network after the one or more ZKPs are successfully verified by the blockchain nodes.

Figure 16:
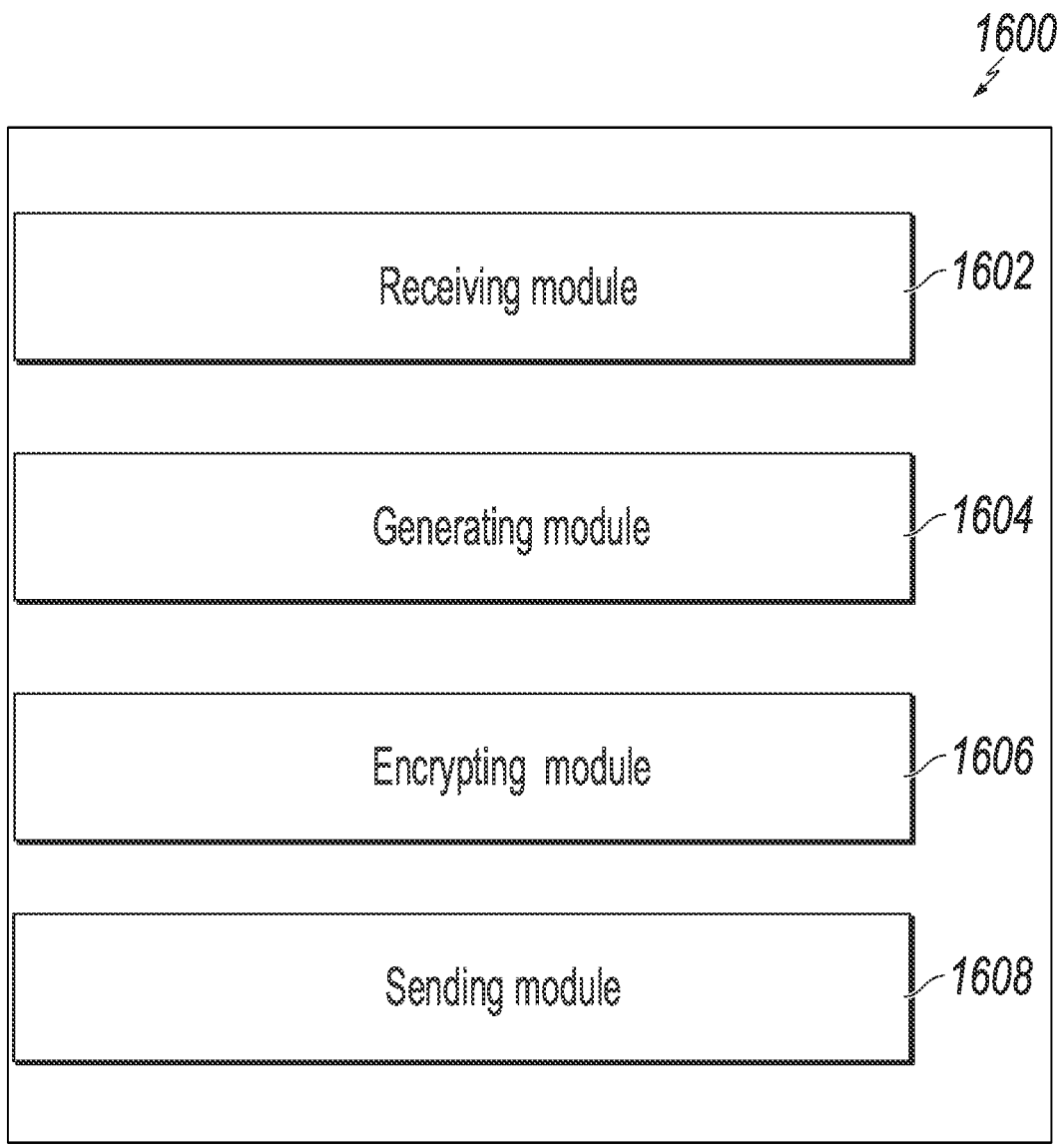
FIG. 16 depicts an example of modules of an apparatus in accordance with embodiments of this specification.

FIG. 16 is a diagram of an example of modules of an apparatus 1600 in accordance with embodiments of this specification. The apparatus 1600 can be an example of an embodiment of a computer system configured to process guarantee information. The apparatus 1600 can correspond to the embodiments described above, and the apparatus 1600 includes the following: a receiving module 1602 that receives, from a computing device associated with an applicant, an application of a guarantee made by at least a first guarantor to a beneficiary, wherein the application includes information associated with an identity of the applicant, an identity of the beneficiary, and one or more predetermined conditions of executing the guarantee; a generating module 1604 that generates a digital version of the guarantee based on the information included in the application; an encrypting module 1606 that encrypts the digital version to generate cyphertext of the guarantee; the generating module 1604 that generates one or more ZKPs related to one or more values associated with the guarantee; and a sending module 1608 that sends the cyphertext of the guarantee and the one or more ZKPs to a blockchain network to store the cyphertext of the guarantee on a blockchain, wherein the cyphertext of the guarantee is stored on the blockchain through consensus of blockchain nodes of the blockchain network after the one or more ZKPs are successfully verified by the blockchain nodes.

In an optional embodiment, the guarantee is in a form of a SBLC. In an optional embodiment, the guarantee specifies that the guarantor shall pay the beneficiary a predetermined amount when the one or more predetermined conditions of executing the guarantee are met.

In an optional embodiment, the guarantor is an offshore bank that serves the applicant, and the predetermined amount is paid to the beneficiary through an onshore bank that serves the beneficiary when the one or more predetermined conditions are met. In an optional embodiment, the application further includes information that specifies an identity of the onshore bank.

In an optional embodiment, the application further includes information that proves the applicant is capable of paying off the predetermined amount in case of the applicant is in default of the SBLC. In an optional embodiment, the identity of the applicant includes one or more of the applicant's name, address, phone number, e-mail address, and type of business.

In an optional embodiment, the identity of the beneficiary includes one or more of the beneficiary's name, address, phone number, e-mail address, and type of business. In an optional embodiment, the one or more predetermined conditions include one or more of default conditions, amendment conditions, cancelation conditions, effective date, and expiration date.

In an optional embodiment, at least one of the one or more ZKPs is generated based on homomorphic encryption. In an optional embodiment, the one or more ZKPs includes one or more of a range proof and a zero test. In an optional embodiment, an encryption key for encrypting the digital version is derived based on a linear secret sharing scheme. In an optional embodiment, the guarantee is made by the first guarantor and a second guarantor to the beneficiary, the guarantee is in the form of a SBLC, and the guarantee specifies that the first guarantor and the second guarantor shall pay the beneficiary a predetermined amount when the one or more predetermined conditions of executing the guarantee are met.

In an optional embodiment, the first guarantor is a first bank that serves the applicant, the second guarantor is a second bank that serves the applicant, and the application further includes information that proves the applicant has sufficient funds in the first bank and the second bank to pay off the predetermined amount in case the applicant is in default of the SBLC.

In an optional embodiment, the apparatus 1600 further comprises, a verifying sub-module that verifies the one or more ZKPs and performing consensus based on the cyphertext of the guarantee after the one or more ZKPs are verified, and a storing sub-module that stores the cyphertext of the guarantee to the blockchain associated with the blockchain network after the consensus is successfully performed.

In an optional embodiment, the apparatus 1600 further comprises, receiving, at a first computing device, an application of a guarantee to be made by a guarantor to a beneficiary, wherein the application includes information associated with an identity of the applicant, an identity of the beneficiary, and one or more predetermined conditions of executing the guarantee; transmitting the application to a second computing device associated with the guarantor; receiving, at the first computing device, a digital version of the guarantee that is generated based on the application; encrypting the digital version to generate a cyphertext of the guarantee; generating one or more ZKPs related to one or more values associated with the guarantee; and sending the cyphertext and the one or more ZKPs to a blockchain network to store the cyphertext on a blockchain, wherein the cyphertext is stored on the blockchain through consensus of blockchain nodes of the blockchain network after the one or more ZKPs are successfully verified by the blockchain nodes.

Figure 17:
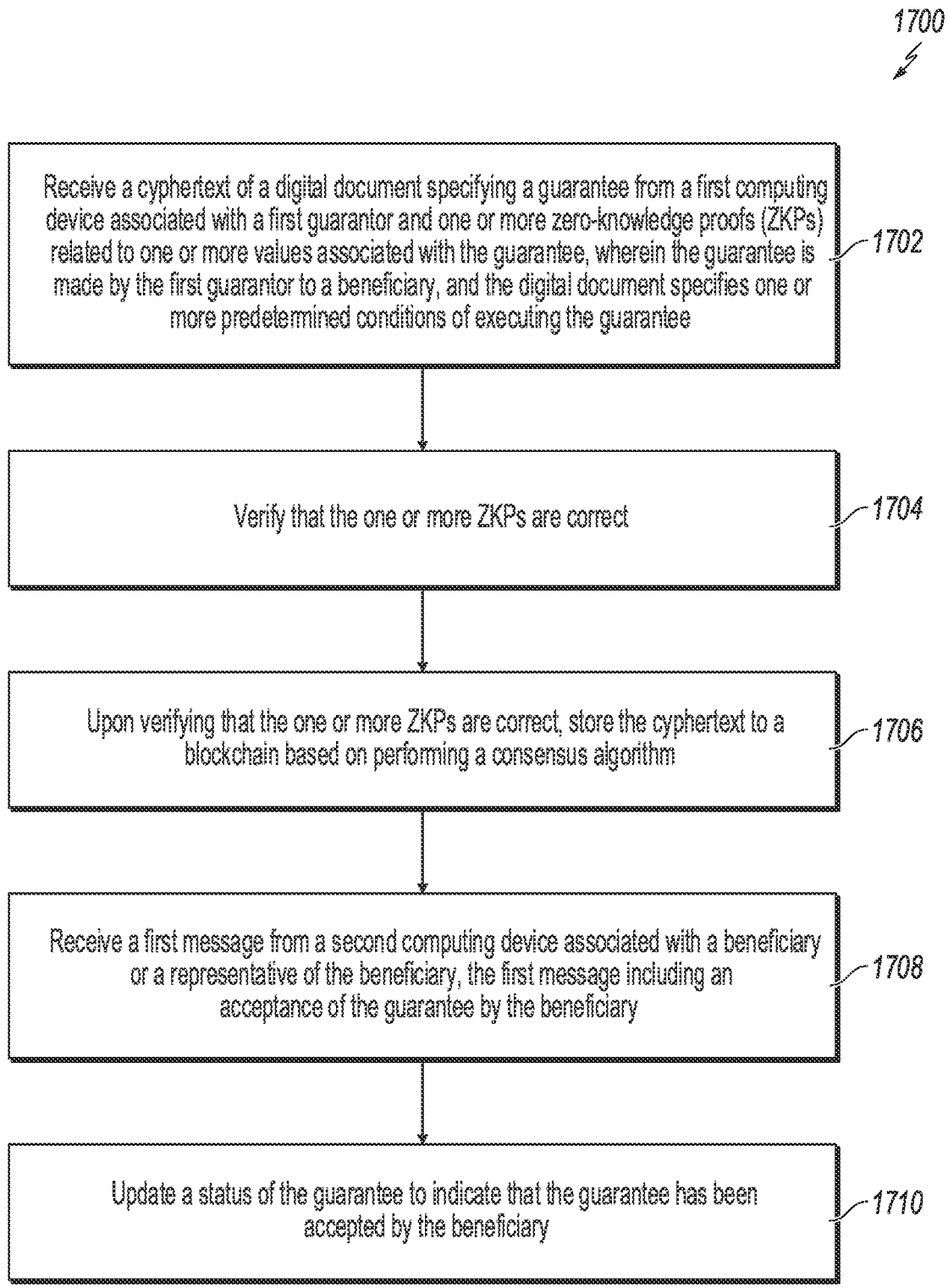
FIG. 17 depicts another example of a process that can be executed in accordance with embodiments of this specification.

FIG. 17 is a flowchart of another example of a process 1700 in accordance with embodiments of this specification. For convenience, the process 1700 will be described as being performed by a blockchain node, which can include a system of one or more computers, located in one or more locations, and programmed appropriately in accordance with this specification. For example, a computer system, e.g., the computer system 100 of FIG. 1, appropriately programmed, can perform the process 1700.

At 1702, the blockchain node receives a cyphertext of a digital document specifying a guarantee from a first computing device associated with a first guarantor and one or more ZKPs related to one or more values associated with the guarantee, wherein the guarantee is made by the first guarantor to a beneficiary, and the digital document specifies one or more predetermined conditions of executing the guarantee.

At 1704, the blockchain node verifies that the one or more ZKPs are correct. At 1706, upon verifying that the one or more ZKPs are correct, the blockchain node stores the cyphertext to a blockchain based on performing a consensus algorithm.

At 1708, the blockchain node receives a first message from a second computing device associated with a beneficiary or a representative of the beneficiary, the first message including an acceptance of the guarantee by the beneficiary. At 1710, the blockchain node updates a status of the guarantee to indicate that the guarantee has been accepted by the beneficiary.

In some cases, the guarantee is in the form of a SBLC. In some cases, the guarantee specifies that the guarantor shall pay the beneficiary a predetermined amount when the one or more predetermined conditions of executing the guarantee are met.

In some cases, the guarantor is an offshore bank that serves an applicant of the digital document, the representative of the beneficiary is an onshore bank that serves the beneficiary, and the predetermined amount is paid to the beneficiary through the onshore bank when the one or more predetermined conditions are met.

In some cases, the digital document further includes information that specifies an identity of the onshore bank. In some cases, the one or more predetermined conditions include one or more of default conditions, amendment conditions, cancelation conditions, effective date, and expiration date.

In some cases, at least one of the one or more ZKPs is generated based on homomorphic encryption. In some cases, the one or more ZKPs includes one or more of a range proof and a zero test.

In some cases, the cyphertext is encrypted using an encryption key derived based on a linear secret sharing scheme. In some cases, the guarantee is made by the first guarantor and a second guarantor to the beneficiary, the guarantee is in the form of a SBLC, and the guarantee specifies that the first guarantor and the second guarantor shall pay the beneficiary a predetermined amount when the one or more predetermined conditions of executing the guarantee are met. In some cases, the consensus algorithm is based on one of PoW, PoS, and PBFT.

Figure 18:
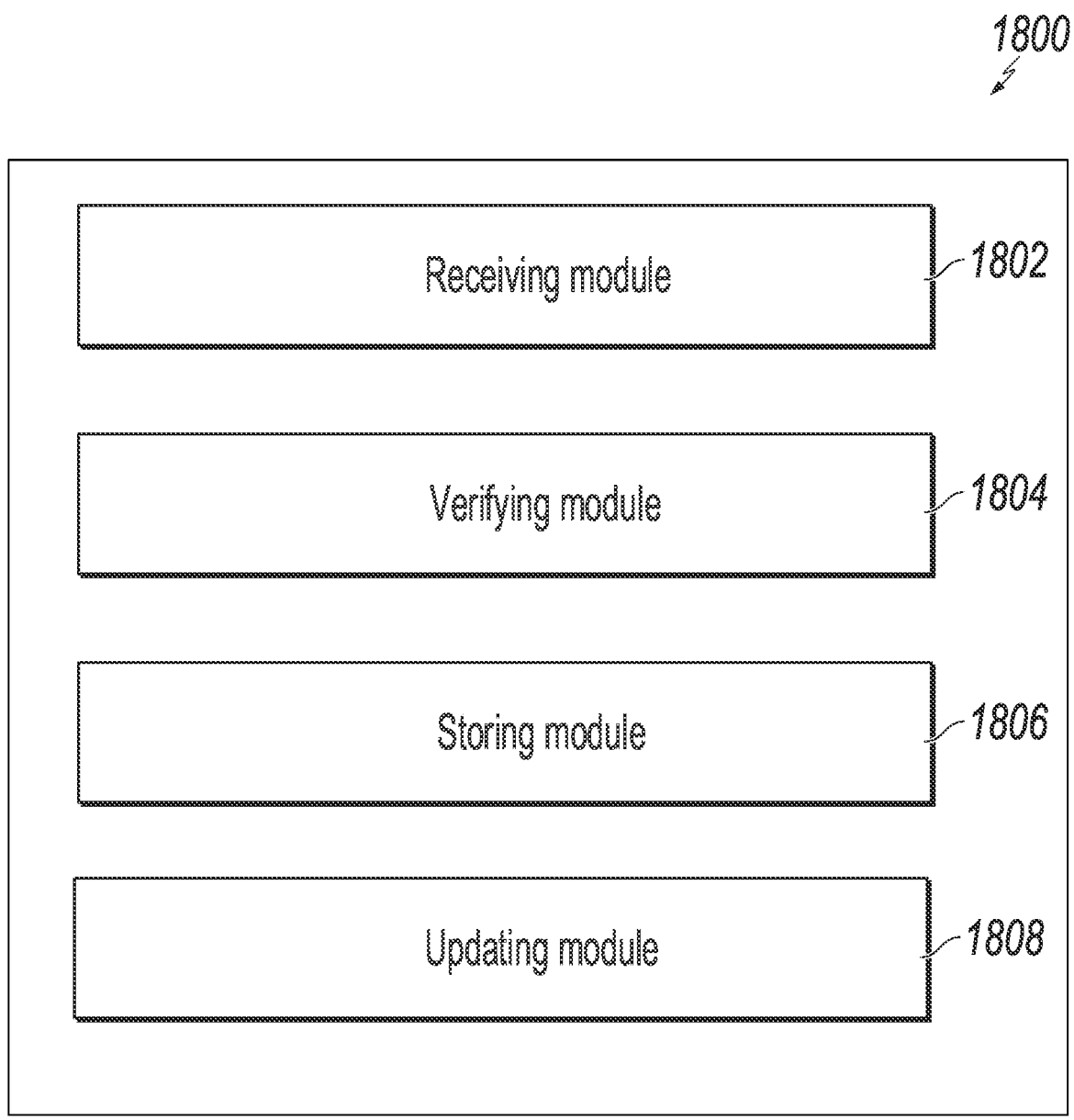
FIG. 18 depicts another example of modules of an apparatus in accordance with embodiments of this specification.

FIG. 18 is a diagram of another example of modules of an apparatus 1800 in accordance with embodiments of this specification. The apparatus 1800 can be an example of an embodiment of a blockchain node. The apparatus 1800 can correspond to the embodiments described above, and the apparatus 1800 includes the following: a receiving module 1802 that receives a cyphertext of a digital document specifying a guarantee from a first computing device associated with a first guarantor and one or more ZKPs related to one or more values associated with the guarantee, wherein the guarantee is made by the first guarantor to a beneficiary, and the digital document specifies one or more predetermined conditions of executing the guarantee; a verifying module 1804 that verifies that the one or more ZKPs are correct; upon verifying that the one or more ZKPs are correct, a storing module 1806 that stores the cyphertext to a blockchain based on performing a consensus algorithm; the receiving module 1802 that receives a first message from a second computing device associated with a beneficiary or a representative of the beneficiary, the first message including an acceptance of the guarantee by the beneficiary; and an updating module 1808 that updates a status of the guarantee to indicate that the guarantee has been accepted by the beneficiary.

In an optional embodiment, the guarantee is in the form of a SBLC. In an optional embodiment, the guarantee specifies that the guarantor shall pay the beneficiary a predetermined amount when the one or more predetermined conditions of executing the guarantee are met.

In an optional embodiment, the guarantor is an offshore bank that serves an applicant of the digital document, the representative of the beneficiary is an onshore bank that serves the beneficiary, and the predetermined amount is paid to the beneficiary through the onshore bank when the one or more predetermined conditions are met.

In an optional embodiment, the digital document further includes information that specifies an identity of the onshore bank. In an optional embodiment, the one or more predetermined conditions include one or more of default conditions, amendment conditions, cancelation conditions, effective date, and expiration date.

In an optional embodiment, at least one of the one or more ZKPs is generated based on homomorphic encryption. In an optional embodiment, the one or more ZKPs includes one or more of a range proof and a zero test.

In an optional embodiment, the cyphertext is encrypted using an encryption key derived based on a linear secret sharing scheme. In an optional embodiment, the guarantee is made by the first guarantor and a second guarantor to the beneficiary, the guarantee is in the form of a SBLC, and the guarantee specifies that the first guarantor and the second guarantor shall pay the beneficiary a predetermined amount when the one or more predetermined conditions of executing the guarantee are met. In an optional embodiment, the consensus algorithm is based on one of PoW, PoS, and PBFT.

Figure 19:
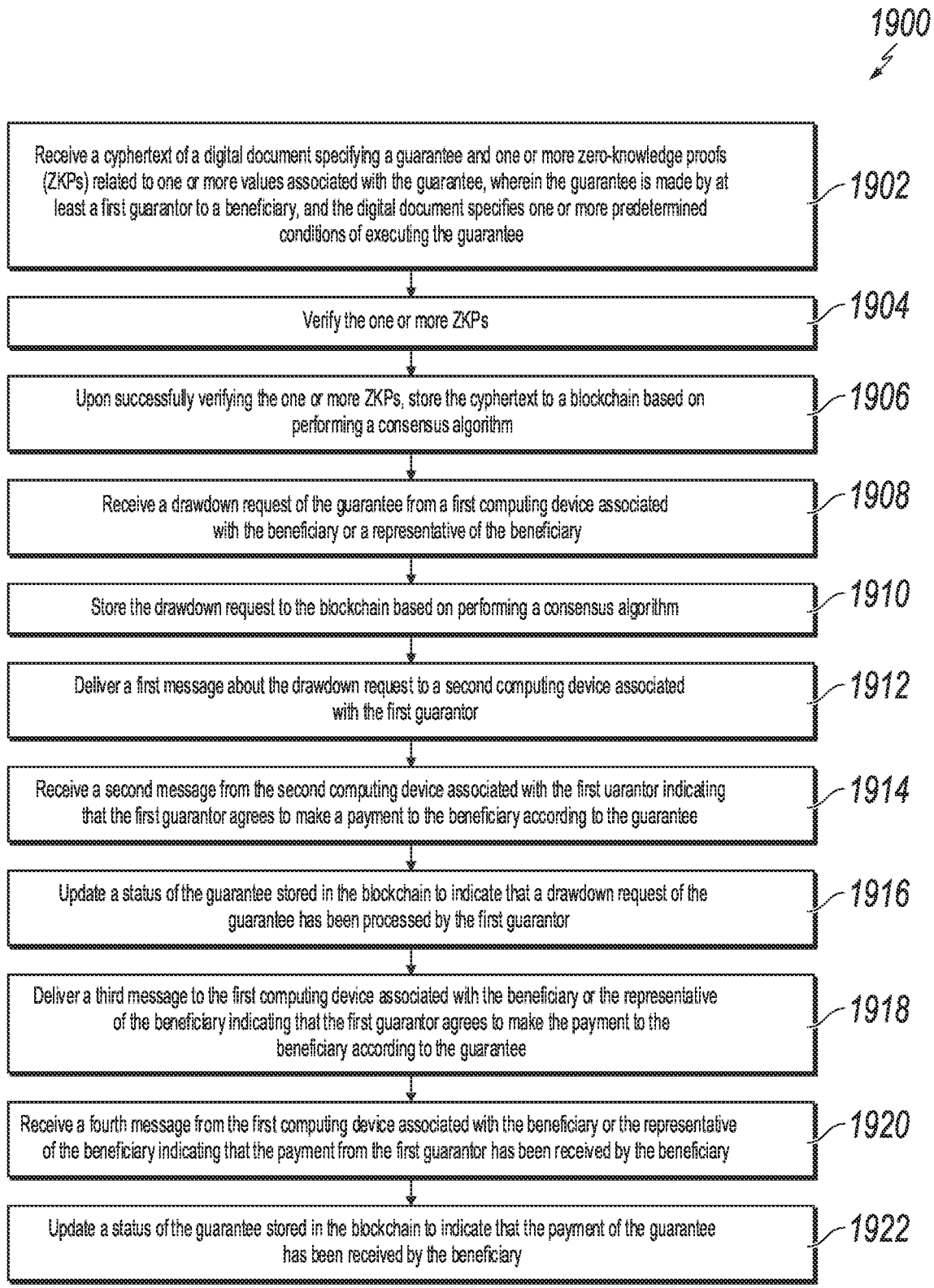
FIG. 19 depicts yet another example of a process that can be executed in accordance with embodiments of this specification.

FIG. 19 is a flowchart of yet another example of a process 1900 in accordance to embodiments of this specification. For convenience, the process 1900 will be described as being performed by a blockchain node that includes a system of one or more computers, located in one or more locations, and programmed appropriately in accordance with this specification. For example, a computer system, e.g., the computer system 100 of FIG. 1, appropriately programmed, can perform the process 1900.

At 1902, the blockchain node receives a cyphertext of a digital document specifying a guarantee and one or more ZKPs related to one or more values associated with the guarantee, wherein the guarantee is made by at least a first guarantor to a beneficiary, and the digital document specifies one or more predetermined conditions of executing the guarantee.

At 1904, the blockchain node verifies the one or more ZKPs. At 1906, upon successfully verifying the one or more ZKPs, the blockchain node stores the cyphertext to a blockchain based on performing a consensus algorithm.

At 1908, the blockchain node receives a drawdown request of the guarantee from a first computing device associated with the beneficiary or a representative of the beneficiary. At 1910, the blockchain node stores the drawdown request to the blockchain based on performing a consensus algorithm.

At 1912, the blockchain node delivers a first message about the drawdown request to a second computing device associated with the first guarantor. At 1914, the blockchain node receives a second message from the second computing device associated with the first guarantor indicating that the first guarantor agrees to make a payment to the beneficiary according to the guarantee.

At 1916, the blockchain node updates a status of the guarantee stored in the blockchain to indicate that a drawdown request of the guarantee has been processed by the first guarantor.

At 1918, the blockchain node delivers a third message to the first computing device associated with the beneficiary or the representative of the beneficiary indicating that the first guarantor agrees to make the payment to the beneficiary according to the guarantee.

At 1920, the blockchain node receives a fourth message from the first computing device associated with the beneficiary or the representative of the beneficiary indicating that the payment from the first guarantor has been received by the beneficiary.

At 1922, the blockchain node updates a status of the guarantee stored in the blockchain to indicate that the payment of the guarantee has been received by the beneficiary.

In some cases, the guarantee is in the form of a SBLC. In some cases, the guarantee specifies that the guarantor shall pay the beneficiary a predetermined amount when the one or more predetermined conditions of executing the guarantee are met.

In some cases, the first guarantor is an offshore bank that serves an applicant of the digital document, the representative of the beneficiary is an onshore bank that serves the beneficiary, and the predetermined amount is paid to the beneficiary through the onshore bank when the one or more predetermined conditions are met.

In some cases, the digital document further includes information that specifies an identity of the onshore bank. In some cases, the one or more predetermined conditions include one or more of default conditions, amendment conditions, cancelation conditions, effective date, and expiration date.

In some cases, at least one of the one or more ZKPs is generated based on homomorphic encryption. In some cases, the one or more ZKPs includes one or more of a range proof and a zero test.

In some cases, the cyphertext is encrypted using an encryption key derived based on a linear secret sharing scheme. In some cases, the guarantee is made by the first guarantor and a second guarantor to the beneficiary, the guarantee is in the form of a SBLC, and the guarantee specifies that the first guarantor and the second guarantor shall pay the beneficiary a predetermined amount when the one or more predetermined conditions of executing the guarantee are met. In some cases, the consensus algorithm is based on one of PoW, PoS, and PBFT.

In an alternative embodiments, the process 1900 comprises, receiving a cyphertext of a digital document specifying a guarantee and one or more ZKPs related to one or more values associated with the guarantee, wherein the guarantee is made by at least a first guarantor to a beneficiary, and the digital document specifies one or more predetermined conditions of executing the guarantee; verifying the one or more ZKPs; upon successfully verifying the one or more ZKPs, storing the cyphertext to a blockchain based on performing a consensus algorithm; receiving a drawdown request of the guarantee from a first computing device associated with the beneficiary or a representative of the beneficiary; storing the drawdown request to the blockchain based on performing a consensus algorithm; delivering a first message about the drawdown request to a second computing device associated with the first guarantor; receiving a second message from the second computing device associated with the first guarantor, in which the second message includes a notice of dishonor indicating that the first guarantor does not agree to make payment to the beneficiary according to the guarantee; storing the notice of dishonor in the blockchain based on performing the consensus algorithm; delivering a third message to the first computing device associated with the beneficiary or the representative of the beneficiary indicating that the first guarantor, in which the third message includes the notice of dishonor; receiving a fourth message from the first computing device associated with the beneficiary or the representative of the beneficiary indicating that the notice of dishonor has been received by the beneficiary or the representative of the beneficiary; and updating a status of the guarantee stored in the blockchain to indicate that the drawdown request is closed.

Figure 20:
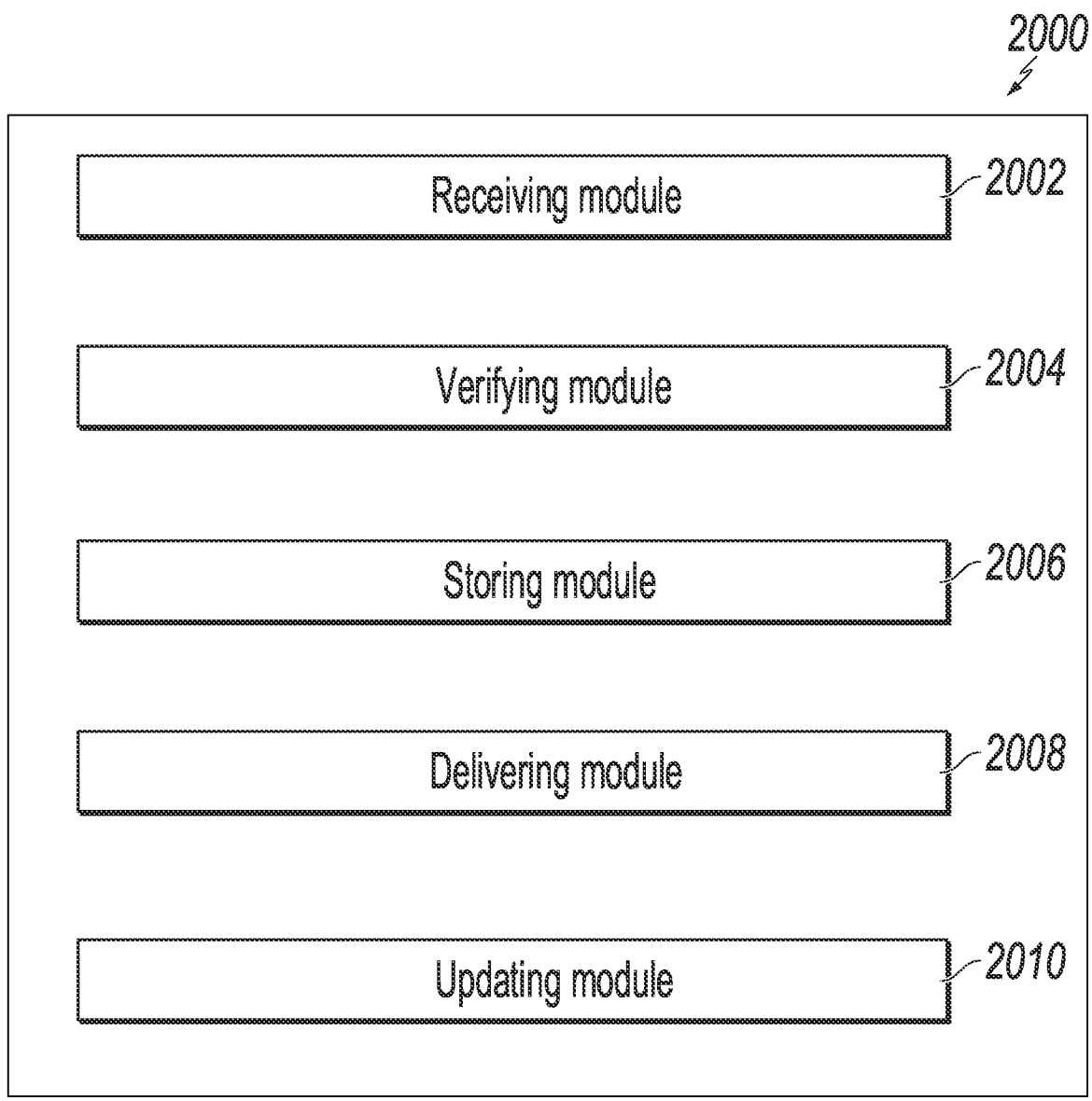
FIG. 20 depicts yet another example of modules of an apparatus in accordance with embodiments of this specification.

FIG. 20 is a diagram of yet another example of modules of an apparatus 2000 in accordance with embodiments of this specification. The apparatus 2000 can be an example of an embodiment of a blockchain. The apparatus 2000 can correspond to the embodiments described above, and the apparatus 2000 includes the following: a receiving module 2002 that receives a cyphertext of a digital document specifying a guarantee and one or more ZKPs related to one or more values associated with the guarantee, wherein the guarantee is made by at least a first guarantor to a beneficiary, and the digital document specifies one or more predetermined conditions of executing the guarantee; a verifying module 2004 that verifies the one or more ZKPs; upon successfully verifying the one or more ZKPs, a storing module 2006 that stores the cyphertext to a blockchain based on performing a consensus algorithm; the receiving module 2002 that receives a drawdown request of the guarantee from a first computing device associated with the beneficiary or a representative of the beneficiary; the storing module 2006 that stores the drawdown request to the blockchain based on performing a consensus algorithm; a delivering module 2008 that delivers a first message about the drawdown request to a second computing device associated with the first guarantor; the receiving module 2002 receives a second message from the second computing device associated with the first guarantor indicating that the first guarantor agrees to make a payment to the beneficiary according to the guarantee; an updating module 2010 that updates a status of the guarantee stored in the blockchain to indicate that a drawdown request of the guarantee has been processed by the first guarantor; the delivering module 2008 that delivers a third message to the first computing device associated with the beneficiary or the representative of the beneficiary indicating that the first guarantor agrees to make the payment to the beneficiary according to the guarantee; the receiving module 2002 that receives a fourth message from the first computing device associated with the beneficiary or the representative of the beneficiary indicating that the payment from the first guarantor has been received by the beneficiary; and the updating module 2010 that updates a status of the guarantee stored in the blockchain to indicate that the payment of the guarantee has been received by the beneficiary.

In an optional embodiment, the guarantee is in the form of a SBLC. In an optional embodiment, the guarantee specifies that the guarantor shall pay the beneficiary a predetermined amount when the one or more predetermined conditions of executing the guarantee are met.

In an optional embodiment, the first guarantor is an offshore bank that serves an applicant of the digital document, the representative of the beneficiary is an onshore bank that serves the beneficiary, and the predetermined amount is paid to the beneficiary through the onshore bank when the one or more predetermined conditions are met.

In an optional embodiment, the digital document further includes information that specifies an identity of the onshore bank. In an optional embodiment, the one or more predetermined conditions include one or more of default conditions, amendment conditions, cancelation conditions, effective date, and expiration date.

In an optional embodiment, at least one of the one or more ZKPs is generated based on homomorphic encryption. In an optional embodiment, the one or more ZKPs includes one or more of a range proof and a zero test.

In an optional embodiment, the cyphertext is encrypted using an encryption key derived based on a linear secret sharing scheme. In an optional embodiment, the guarantee is made by the first guarantor and a second guarantor to the beneficiary, the guarantee is in the form of a SBLC, and the guarantee specifies that the first guarantor and the second guarantor shall pay the beneficiary a predetermined amount when the one or more predetermined conditions of executing the guarantee are met. In an optional embodiment, the consensus algorithm is based on one of PoW, PoS, and PBFT.

In an alternative embodiment, the apparatus 2000 comprises, a receiving module 2002 that receives a cyphertext of a digital document specifying a guarantee and one or more ZKPs related to one or more values associated with the guarantee, wherein the guarantee is made by at least a first guarantor to a beneficiary, and the digital document specifies one or more predetermined conditions of executing the guarantee; a verifying module 2004 that verifies the one or more ZKPs; a storing module 2006, upon successfully verifying the one or more ZKPs, that stores the cyphertext to a blockchain based on performing a consensus algorithm; receiving a drawdown request of the guarantee from a first computing device associated with the beneficiary or a representative of the beneficiary; the storing module 2006 further stores the drawdown request to the blockchain based on performing a consensus algorithm; an delivering module 2008 that delivers a first message about the drawdown request to a second computing device associated with the first guarantor; the receiving module 2002 that further receives a second message from the second computing device associated with the first guarantor, in which the second message includes a notice of dishonor indicating that the first guarantor does not agree to make payment to the beneficiary according to the guarantee; the storing module 2006 that further stores the notice of dishonor in the blockchain based on performing the consensus algorithm; a delivering module 2008 that further delivers a third message to the first computing device associated with the beneficiary or the representative of the beneficiary indicating that the first guarantor, in which the third message includes the notice of dishonor; the receiving module 2002 that further receives a fourth message from the first computing device associated with the beneficiary or the representative of the beneficiary indicating that the notice of dishonor has been received by the beneficiary or the representative of the beneficiary; and the updating module 2010 that further updates a status of the guarantee stored in the blockchain to indicate that the drawdown request is closed.

Figure 21:
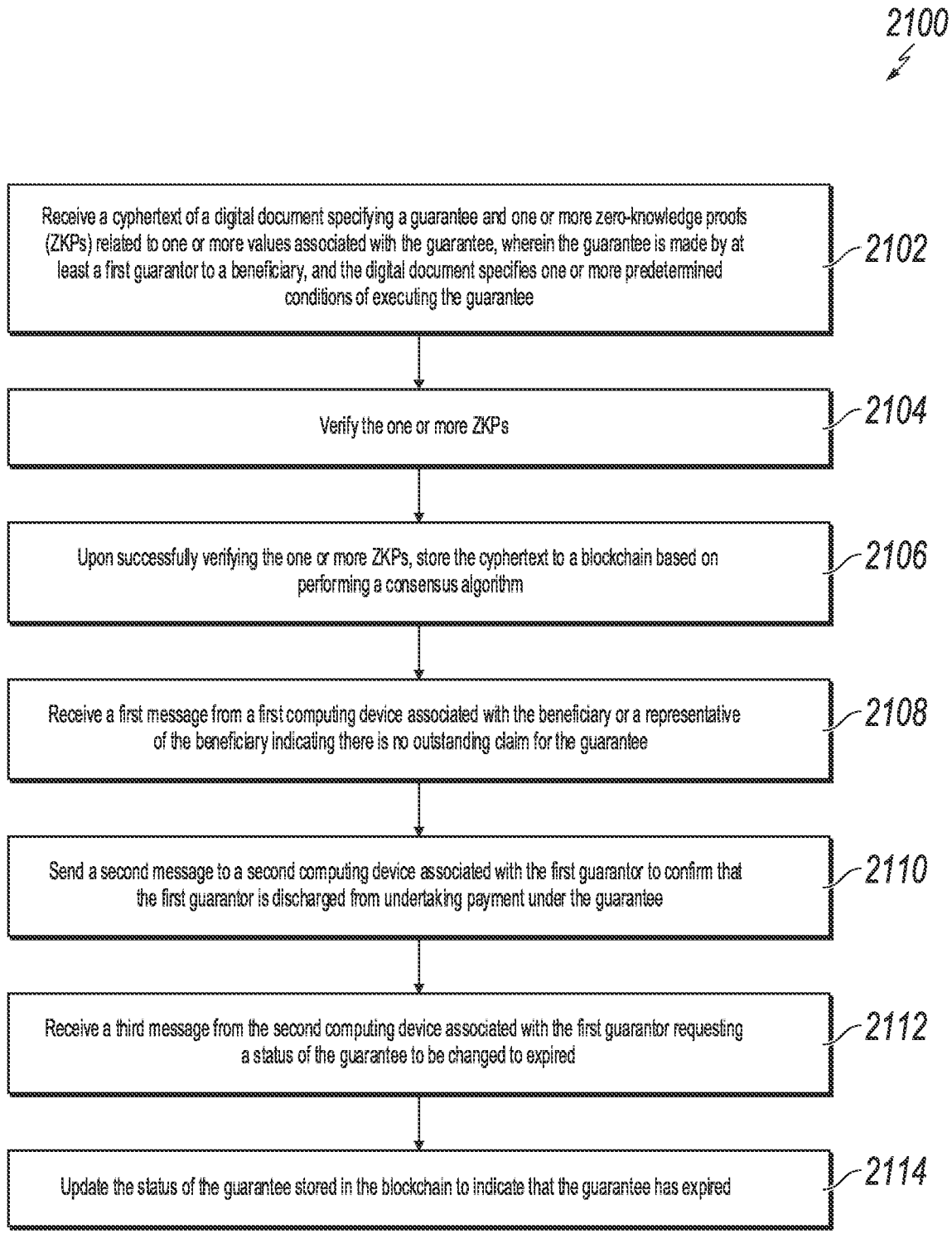
FIG. 21 depicts yet another example of a process that can be executed in accordance with embodiments of this specification.

FIG. 21 is a flowchart of yet another example of a process 2100 in accordance with embodiments of this specification. For convenience, the process 2100 will be described as being performed by a blockchain node that includes a computer system of one or more computers, located in one or more locations, and programmed appropriately in accordance with this specification. For example, a computer system, e.g., the computer system 100 of FIG. 1, appropriately programmed, can perform the process 2100.

At 2102, the blockchain node receives a cyphertext of a digital document specifying a guarantee and one or more ZKPs related to one or more values associated with the guarantee, wherein the guarantee is made by at least a first guarantor to a beneficiary, and the digital document specifies one or more predetermined conditions of executing the guarantee.

At 2104, the blockchain node verifying the one or more ZKPs. At 2106, upon successfully verifying the one or more ZKPs, the blockchain node stores the cyphertext to a blockchain based on performing a consensus algorithm. At 2108, the blockchain node receives a first message from a first computing device associated with the beneficiary or a representative of the beneficiary indicating there is no outstanding claim for the guarantee.

At 2110, the blockchain node sends a second message to a second computing device associated with the first guarantor to confirm that the first guarantor is discharged from undertaking payment under the guarantee. At 2112, the blockchain node receives a third message from the second computing device associated with the first guarantor requesting a status of the guarantee to be changed to expired.

At 2114, the blockchain node updates the status of the guarantee stored in the blockchain to indicate that the guarantee has expired.

In some cases, the guarantee is in the form of a SBLC. In some cases, the guarantee specifies that the at least a first guarantor shall pay the beneficiary a predetermined amount when the one or more predetermined conditions of executing the guarantee are met.

In some cases, the first guarantor is an offshore bank that serves an applicant of the digital document, the representative of the beneficiary is an onshore bank that serves the beneficiary, and the predetermined amount is paid to the beneficiary through the onshore bank when the one or more predetermined conditions are met. In some cases, the digital document further includes information that specifies an identity of the onshore bank.

In some cases, the one or more predetermined conditions include one or more of default conditions, amendment conditions, cancelation conditions, effective date, and expiration date. In some cases, at least one of the one or more ZKPs is generated based on homomorphic encryption.

In some cases, the one or more ZKPs includes one or more of a range proof and a zero test. In some cases, the cyphertext is encrypted using an encryption key derived based on a linear secret sharing scheme.

In some cases, the guarantee is made by the first guarantor and a second guarantor to the beneficiary, the guarantee is in the form of a SBLC, and the guarantee specifies that the first guarantor and the second guarantor shall pay the beneficiary a predetermined amount when the one or more predetermined conditions of executing the guarantee are met.

In some cases, the consensus algorithm is based on one of PoW, PoS, and PBFT. In some cases, the process 2100 further comprises, prior to receiving the first message, receiving a fourth message from the first computing device associated with the beneficiary or the representative of the beneficiary, in which the third message includes a request requesting a valid period of the guarantee to be extended; and storing the request requesting the valid period of the guarantee to be extended in the blockchain.

Figure 22:
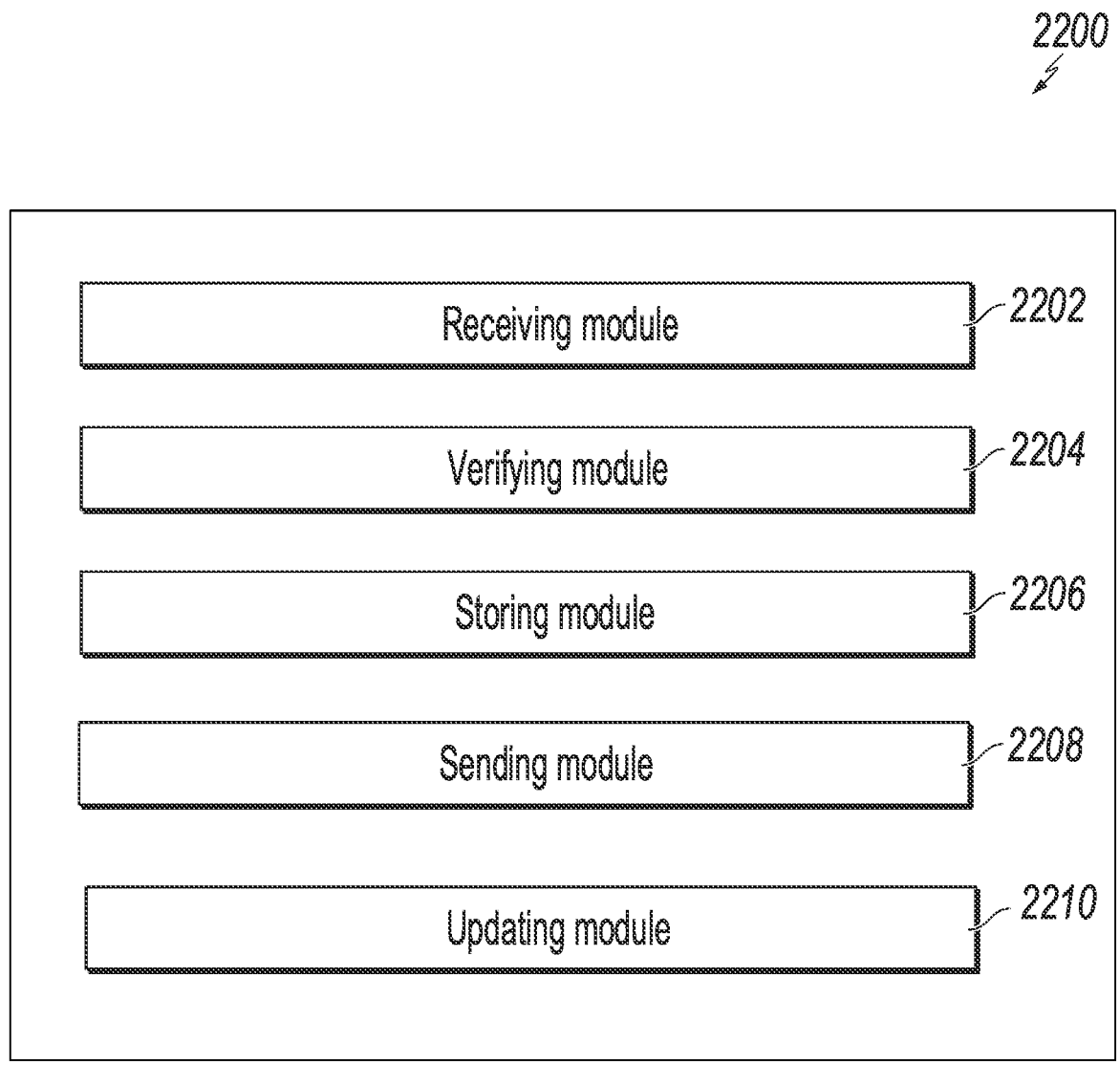
FIG. 22 depicts yet another example of modules of an apparatus in accordance with embodiments of this specification.

FIG. 22 is a diagram of yet another example of modules of an apparatus 2200 in accordance with embodiments of this specification. The apparatus 2200 can be an example of an embodiment of a blockchain node. The apparatus 2200 can correspond to the embodiments described above, and the apparatus 2200 includes the following: a receiving module 2202 that receives a cyphertext of a digital document specifying a guarantee and one or more ZKPs related to one or more values associated with the guarantee, wherein the guarantee is made by at least a first guarantor to a beneficiary, and the digital document specifies one or more predetermined conditions of executing the guarantee; a verifying module 2204 that verifies the one or more ZKPs; upon successfully verifying the one or more ZKPs, a storing module 2206 that stores the cyphertext to a blockchain based on performing a consensus algorithm; the receiving module 2202 that receives a first message from a first computing device associated with the beneficiary or a representative of the beneficiary indicating there is no outstanding claim for the guarantee; a sending module 2208 that sends a second message to a second computing device associated with the first guarantor to confirm that the first guarantor is discharged from undertaking payment under the guarantee; the receiving module 2202 that receives a third message from the second computing device associated with the first guarantor requesting a status of the guarantee to be changed to expired; and an updating module 2210 that updates the status of the guarantee stored in the blockchain to indicate that the guarantee has expired.

In an optional embodiment, the guarantee is in the form of a SBLC. In an optional embodiment, the guarantee specifies that the at least a first guarantor shall pay the beneficiary a predetermined amount when the one or more predetermined conditions of executing the guarantee are met.

In an optional embodiment, the first guarantor is an offshore bank that serves an applicant of the digital document, the representative of the beneficiary is an onshore bank that serves the beneficiary, and the predetermined amount is paid to the beneficiary through the onshore bank when the one or more predetermined conditions are met.

In an optional embodiment, the digital document further includes information that specifies an identity of the onshore bank. In an optional embodiment, the one or more predetermined conditions include one or more of default conditions, amendment conditions, cancelation conditions, effective date, and expiration date.

In an optional embodiment, at least one of the one or more ZKPs is generated based on homomorphic encryption. In an optional embodiment, the one or more ZKPs includes one or more of a range proof and a zero test.

In an optional embodiment, the cyphertext is encrypted using an encryption key derived based on a linear secret sharing scheme. In an optional embodiment, the guarantee is made by the first guarantor and a second guarantor to the beneficiary, the guarantee is in the form of a SBLC, and the guarantee specifies that the first guarantor and the second guarantor shall pay the beneficiary a predetermined amount when the one or more predetermined conditions of executing the guarantee are met.

In an optional embodiment, the consensus algorithm is based on one of PoW, PoS, and PBFT. In an optional embodiment, the apparatus 2200 further comprises, prior to receiving the first message, a receiving sub-module that receives a fourth message from the first computing device associated with the beneficiary or the representative of the beneficiary, in which the third message includes a request requesting a valid period of the guarantee to be extended; and a storing sub-module that stores the request requesting the valid period of the guarantee to be extended in the blockchain.

Figure 23:
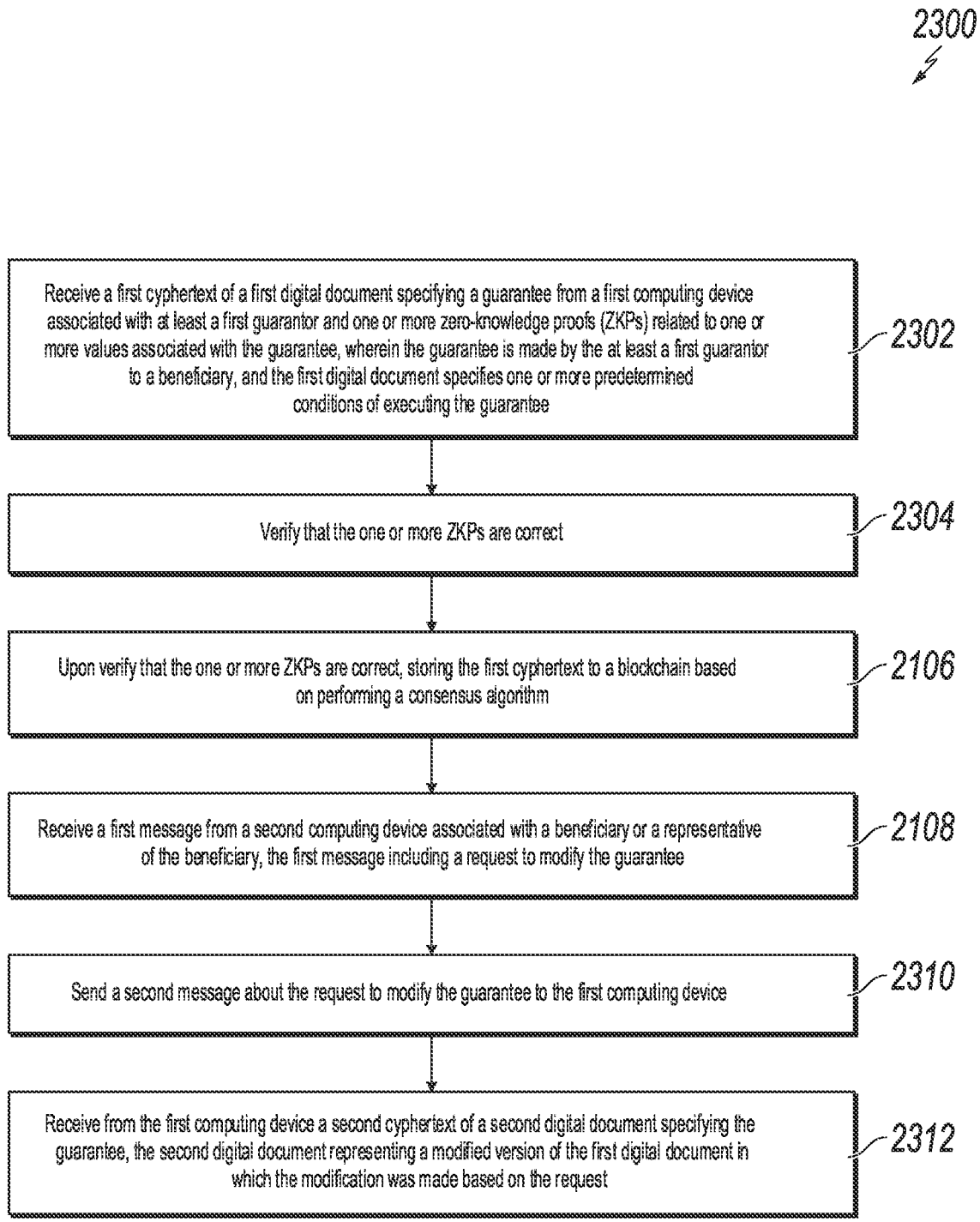
FIG. 23 depicts yet another example of a process that can be executed in accordance with embodiments of this specification.

FIG. 23 is a flowchart of yet another example of a process 2300 in accordance with embodiments of this specification. For convenience, the process 2300 will be described as being performed by a blockchain node that includes a system of one or more computers, located in one or more locations, and programmed appropriately in accordance with this specification. For example, a computer system, e.g., the computer system 100 of FIG. 1, appropriately programmed, can perform the process 2300.

At 2302, the blockchain node receives a first cyphertext of a first digital document specifying a guarantee from a first computing device associated with at least a first guarantor and one or more ZKPs related to one or more values associated with the guarantee, wherein the guarantee is made by the at least a first guarantor to a beneficiary, and the first digital document specifies one or more predetermined conditions of executing the guarantee.

At 2304, the blockchain node verifies that the one or more ZKPs are correct. At 2306, verifying that the one or more ZKPs are correct, the blockchain node upon stores the first cyphertext to a blockchain based on performing a consensus algorithm.

At 2308, the blockchain node receives a first message from a second computing device associated with a beneficiary or a representative of the beneficiary, the first message including a request to modify the guarantee. At 2310, the blockchain node sends a second message about the request to modify the guarantee to the first computing device.

At 2312, the blockchain node receives from the first computing device a second cyphertext of a second digital document specifying the guarantee, the second digital document representing a modified version of the first digital document in which the modification was made based on the request.

In some cases, the process 2300 further comprises, storing the second cyphertext to the blockchain based on performing the consensus algorithm; receiving a third message from the second computing device indicating an acceptance of the guarantee specified in the second digital document; and modifying the second cyphertext to update a status of the guarantee to indicate that the guarantee has been accepted by the beneficiary.

In some cases, the guarantee is in a form of a SBLC. In some cases, the guarantee specifies that the at least a first guarantor shall pay the beneficiary a predetermined amount when the one or more predetermined conditions of executing the guarantee are met.

In some cases, the request to modify the guarantee is a request to modify the predetermined amount to a reduced amount that equals to the predetermined amount less a payment amount already paid to the beneficiary, and the modified version of the first digital document includes the reduced amount.

In some cases, the first message further includes a ZKP associated with the reduced amount, and the storing the second cyphertext is performed in response to successfully verifying the ZKP included in the first message.

In some cases, the guarantor is an offshore bank that serves an applicant of the first digital document, and the predetermined amount is paid to the beneficiary through an onshore bank that serves the beneficiary when the one or more predetermined conditions are met.

In some cases, the one or more predetermined conditions include one or more of default conditions, amendment conditions, cancelation conditions, effective date, and expiration date. In some cases, at least one of the one or more ZKPs is generated based on homomorphic encryption.

In some cases, the one or more ZKPs includes one or more of a range proof and a zero test. In some cases, an encryption key for encrypting the digital document is derived based on a linear secret sharing scheme.

In some cases, the guarantee is made by the first guarantor and a second guarantor to the beneficiary, the guarantee is in the form of a SBLC, and the guarantee specifies that the first guarantor and the second guarantor shall pay the beneficiary a predetermined amount when the one or more predetermined conditions of executing the guarantee are met.

Figure 24:
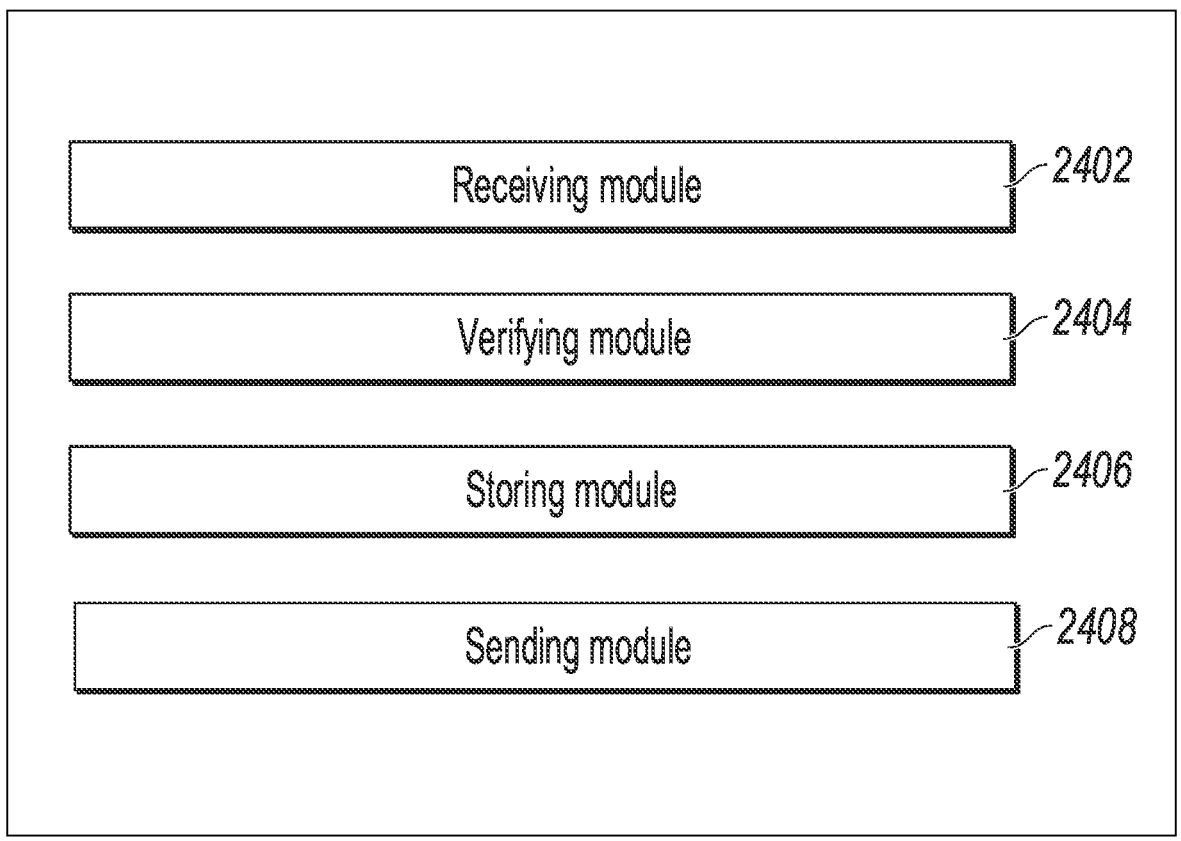
FIG. 24 depicts yet another example of modules of an apparatus in accordance with embodiments of this specification.

FIG. 24 is a diagram of yet another example of modules of an apparatus 2400 in accordance with embodiments of this specification. The apparatus 2400 can be an example of an embodiment of a blockchain node. The apparatus 2400 can correspond to the embodiments described above, and the apparatus 2400 includes the following: a receiving module 2402 that receives a first cyphertext of a first digital document specifying a guarantee from a first computing device associated with at least a first guarantor and one or more ZKPs related to one or more values associated with the guarantee, wherein the guarantee is made by the at least a first guarantor to a beneficiary, and the first digital document specifies one or more predetermined conditions of executing the guarantee; a verifying module 2404 that verifies the one or more ZKPs are correct; upon verifying that the one or more ZKPs are correct, a storing module 2406 that stores the first cyphertext to a blockchain based on performing a consensus algorithm; the receiving module 2402 that further receives a first message from a second computing device associated with a beneficiary or a representative of the beneficiary, the first message including a request to modify the guarantee; a sending module 2408 that sends a second message about the request to modify the guarantee to the first computing device; and the receiving module 2402 that further receives from the first computing device a second cyphertext of a second digital document specifying the guarantee, the second digital document representing a modified version of the first digital document in which the modification was made based on the request.

In an optional embodiment, the apparatus 2400 further comprises, the storing module 2406 that stores the second cyphertext to the blockchain based on performing the consensus algorithm; the receiving module 2402 that receives a third message from the second computing device indicating an acceptance of the guarantee specified in the second digital document; and modifying the second cyphertext to update a status of the guarantee to indicate that the guarantee has been accepted by the beneficiary.

In an optional embodiment, the guarantee is in a form of a SBLC. In an optional embodiment, the guarantee specifies that the at least a first guarantor shall pay the beneficiary a predetermined amount when the one or more predetermined conditions of executing the guarantee are met.

In an optional embodiment, the request to modify the guarantee is a request to modify the predetermined amount to a reduced amount that equals to the predetermined amount less a payment amount already paid to the beneficiary, and the modified version of the first digital document includes the reduced amount.

In an optional embodiment, the first message further includes a ZKP associated with the reduced amount, and the storing the second cyphertext is performed in response to successfully verifying the ZKP included in the first message.

In an optional embodiment, the guarantor is an offshore bank that serves an applicant of the first digital document, and the predetermined amount is paid to the beneficiary through an onshore bank that serves the beneficiary when the one or more predetermined conditions are met.

In an optional embodiment, the one or more predetermined conditions include one or more of default conditions, amendment conditions, cancelation conditions, effective date, and expiration date. In an optional embodiment, at least one of the one or more ZKPs is generated based on homomorphic encryption.

In an optional embodiment, the one or more ZKPs includes one or more of a range proof and a zero test. In an optional embodiment, an encryption key for encrypting the digital document is derived based on a linear secret sharing scheme.

In an optional embodiment, the guarantee is made by the first guarantor and a second guarantor to the beneficiary, the guarantee is in the form of a SBLC, and the guarantee specifies that the first guarantor and the second guarantor shall pay the beneficiary a predetermined amount when the one or more predetermined conditions of executing the guarantee are met.

Figure 25:
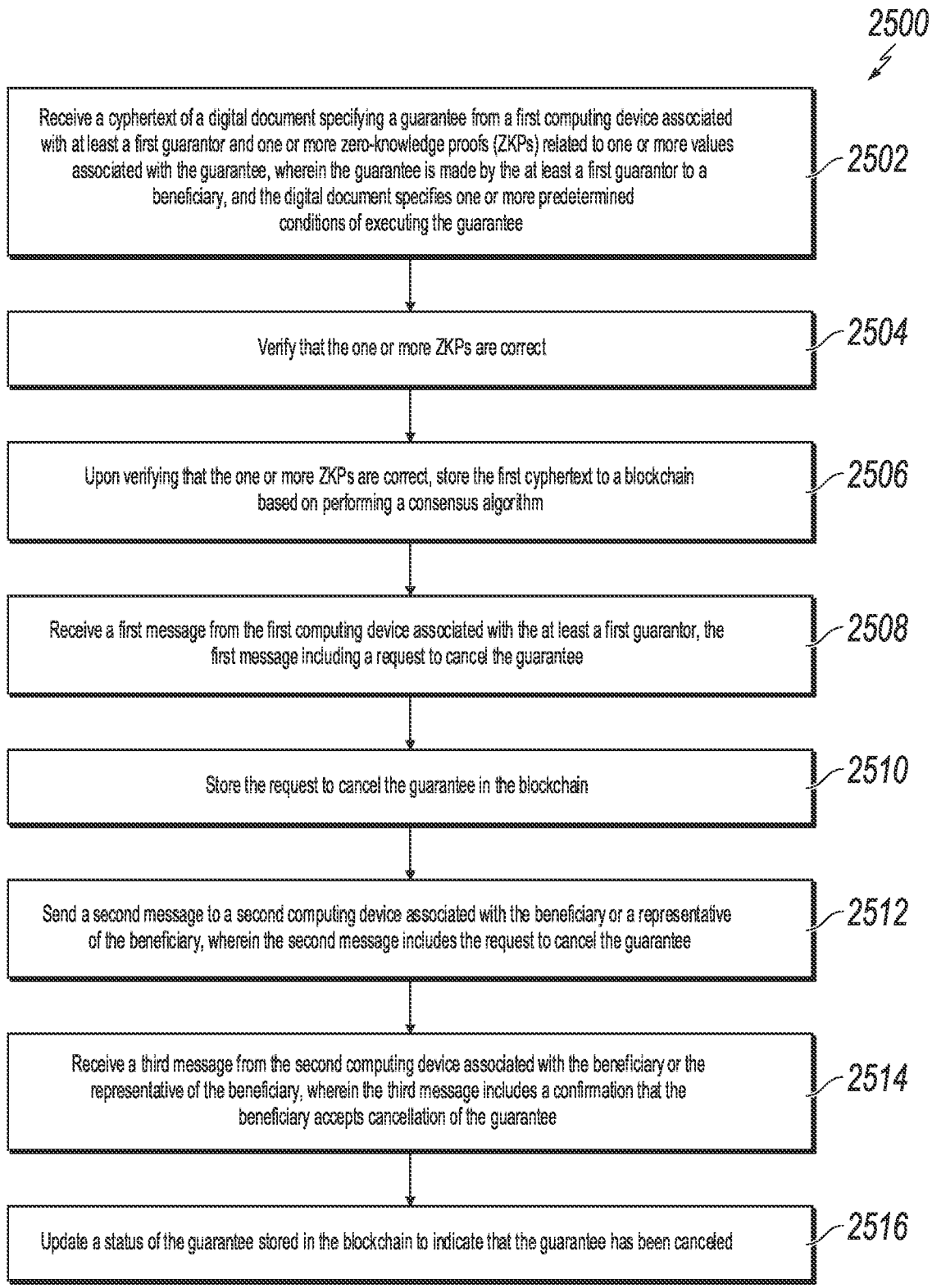
FIG. 25 depicts yet another example of a process that can be executed in accordance with embodiments of this specification.

FIG. 25 is a flowchart of yet another example of a process 2500 in accordance with embodiments of this specification. For convenience, the process 2500 will be described as being performed by a blockchain node that includes a system of one or more computers, located in one or more locations, and programmed appropriately in accordance with this specification. For example, a computer system, e.g., the computer system 100 of FIG. 1, appropriately programmed, can perform the process 2500.

At 2502, the blockchain node receives a cyphertext of a digital document specifying a guarantee from a first computing device associated with at least a first guarantor and one or more ZKPs related to one or more values associated with the guarantee, wherein the guarantee is made by the at least a first guarantor to a beneficiary, and the digital document specifies one or more predetermined conditions of executing the guarantee.

At 2504, the blockchain node verifies that the one or more ZKPs are correct. At 2506, upon verifying that the one or more ZKPs are correct, the blockchain node stores the first cyphertext to a blockchain based on performing a consensus algorithm.

At 2508, the blockchain node receives a first message from the first computing device associated with the at least a first guarantor, the first message including a request to cancel the guarantee. At 2510, the blockchain node stores the request to cancel the guarantee in the blockchain.

At 2512, the blockchain node sends a second message to a second computing device associated with the beneficiary or a representative of the beneficiary, wherein the second message includes the request to cancel the guarantee.

At 2514, the blockchain node receives a third message from the second computing device associated with the beneficiary or the representative of the beneficiary, wherein the third message includes a confirmation that the beneficiary accepts cancellation of the guarantee. At 2516, the blockchain node updates a status of the guarantee stored in the blockchain to indicate that the guarantee has been canceled.

In some cases, the guarantee is in a form of a SBLC. In some cases, the guarantee specifies that the at least a first guarantor shall pay the beneficiary a predetermined amount when the one or more predetermined conditions of executing the guarantee are met.

In some cases, the first guarantor is an offshore bank that serves an applicant of the guarantee, and the predetermined amount is paid to the beneficiary through an onshore bank that serves the beneficiary when the one or more predetermined conditions are met.

In some cases, the digital document further includes information that specifies an identity of the onshore bank. In some cases, the one or more predetermined conditions include one or more of default conditions, amendment conditions, cancelation conditions, effective date, and expiration date.

In some cases, at least one of the one or more ZKPs is generated based on homomorphic encryption. In some cases, the one or more ZKPs includes one or more of a range proof and a zero test.

In some cases, an encryption key for encrypting the digital document is derived based on a linear secret sharing scheme. In some cases, the guarantee is made by the first guarantor and a second guarantor to the beneficiary, the guarantee is in the form of a SBLC, and the guarantee specifies that the first guarantor and the second guarantor shall pay the beneficiary a predetermined amount when the one or more predetermined conditions of executing the guarantee are met. In some cases, the consensus algorithm is based on one of PoW, PoS, and PBFT.

Figure 26:
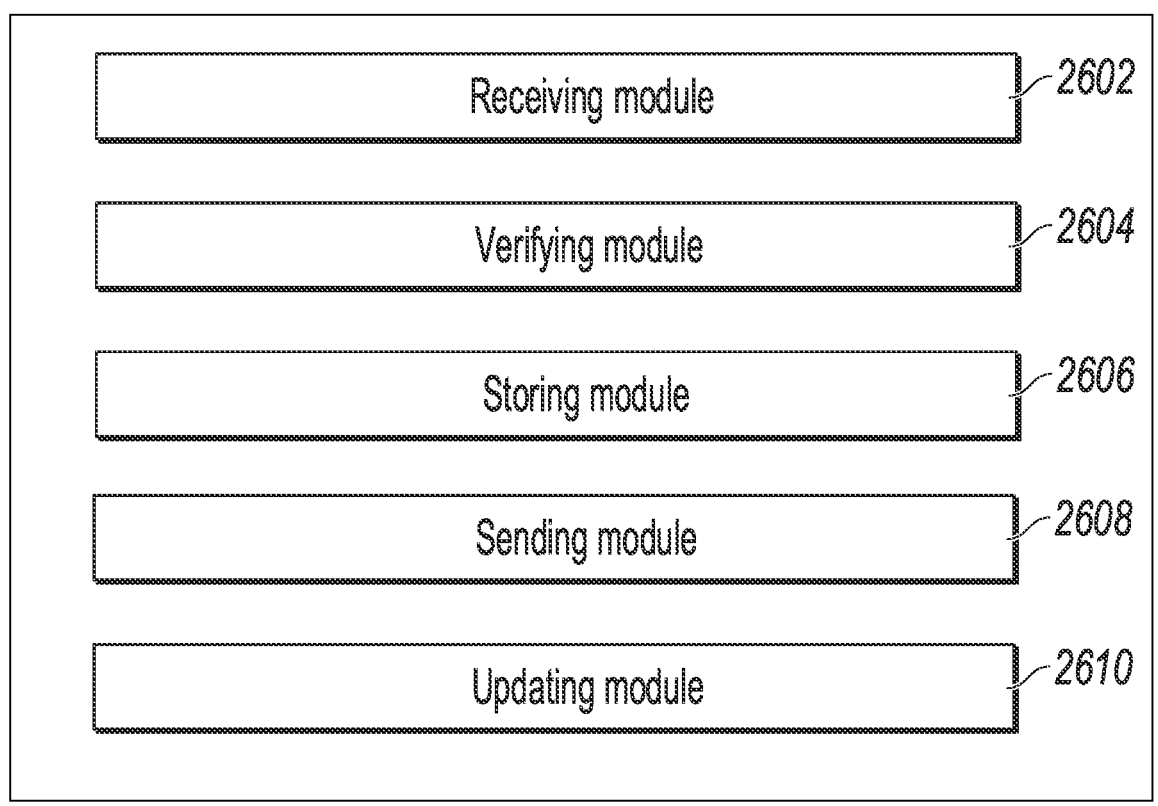
FIG. 26 depicts yet another example of modules of an apparatus in accordance with embodiments of this specification.

FIG. 26 is a diagram of yet another example of modules of an apparatus 2600 in accordance with embodiments of this specification. The apparatus 2600 can be an example of an embodiment of a blockchain. The apparatus 2600 can correspond to the embodiments described above, and the apparatus 2600 includes the following: a receiving module 2602 that receives a cyphertext of a digital document specifying a guarantee from a first computing device associated with at least a first guarantor and one or more ZKPs related to one or more values associated with the guarantee, wherein the guarantee is made by the at least a first guarantor to a beneficiary, and the digital document specifies one or more predetermined conditions of executing the guarantee; a verifying module 2604 that verifies that the one or more ZKPs are correct; upon verifying that the one or more ZKPs are correct, a storing module 2606 that stores the first cyphertext to a blockchain based on performing a consensus algorithm; the receiving module 2602 that receives a first message from the first computing device associated with the at least a first guarantor, the first message including a request to cancel the guarantee; the storing module 2606 that stores the request to cancel the guarantee in the blockchain; a sending module 2608 that sends a second message to a second computing device associated with the beneficiary or a representative of the beneficiary, wherein the second message includes the request to cancel the guarantee; the receiving module 2602 that receives a third message from the second computing device associated with the beneficiary or the representative of the beneficiary, wherein the third message includes a confirmation that the beneficiary accepts cancellation of the guarantee; and an updating module 2610 that updates a status of the guarantee stored in the blockchain to indicate that the guarantee has been canceled.

In an optional embodiment, the guarantee is in a form of a SBLC. In an optional embodiment, the guarantee specifies that the at least a first guarantor shall pay the beneficiary a predetermined amount when the one or more predetermined conditions of executing the guarantee are met.

In an optional embodiment, the first guarantor is an offshore bank that serves an applicant of the guarantee, and the predetermined amount is paid to the beneficiary through an onshore bank that serves the beneficiary when the one or more predetermined conditions are met.

In an optional embodiment, the digital document further includes information that specifies an identity of the onshore bank. In an optional embodiment, the one or more predetermined conditions include one or more of default conditions, amendment conditions, cancelation conditions, effective date, and expiration date.

In an optional embodiment, at least one of the one or more ZKPs is generated based on homomorphic encryption. In an optional embodiment, the one or more ZKPs includes one or more of a range proof and a zero test.

In an optional embodiment, an encryption key for encrypting the digital document is derived based on a linear secret sharing scheme. In an optional embodiment, the guarantee is made by the first guarantor and a second guarantor to the beneficiary, the guarantee is in the form of a SBLC, and the guarantee specifies that the first guarantor and the second guarantor shall pay the beneficiary a predetermined amount when the one or more predetermined conditions of executing the guarantee are met. In an optional embodiment, the consensus algorithm is based on one of PoW, PoS, and PBFT.

Figure 27:
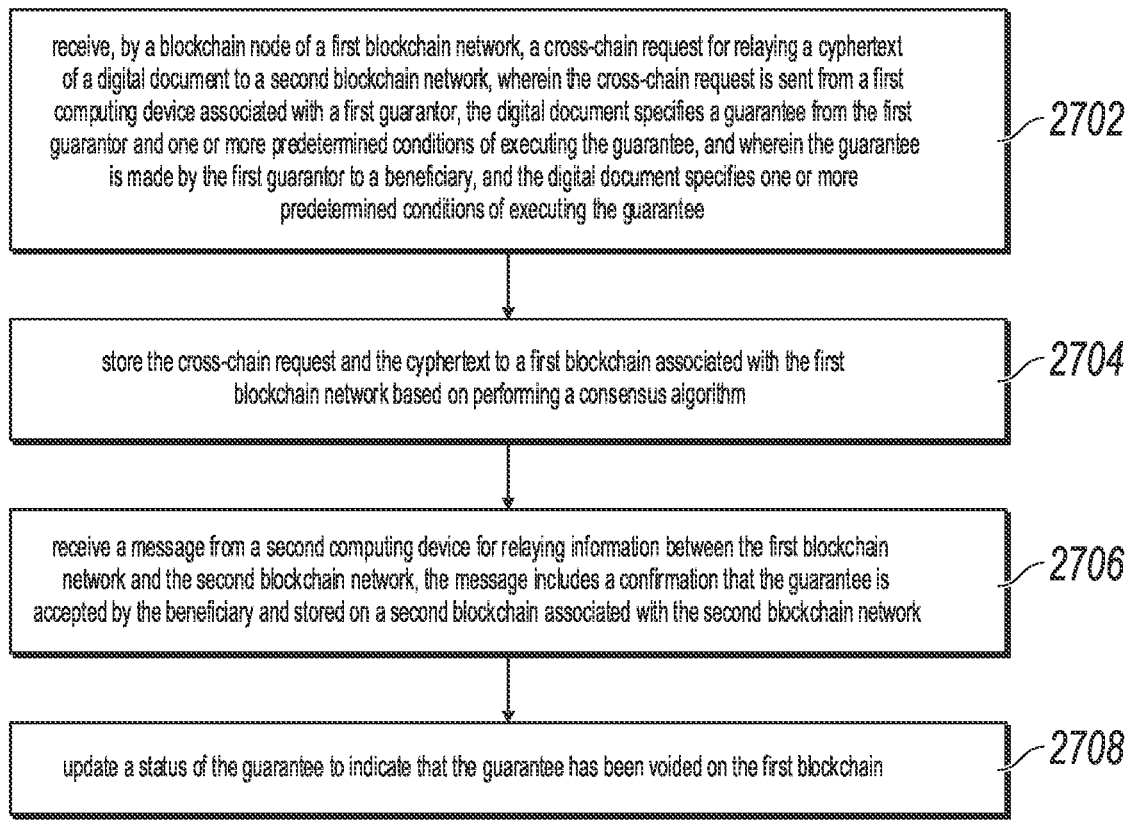
FIG. 27 depicts yet another example of a process that can be executed in accordance with embodiments of this specification.

FIG. 27 is a flowchart of yet another example of a process 2700 in accordance with embodiments of this specification. For convenience, the process 2700 will be described as being performed by a blockchain node that includes a system of one or more computers, located in one or more locations, and programmed appropriately in accordance with this specification. For example, a computer system, e.g., the computer system 100 of FIG. 1, appropriately programmed, can perform the process 2700.

At 2702, the blockchain node receives, by a blockchain node of a first blockchain network, a cross-chain request for relaying a cyphertext of a digital document to a second blockchain network, wherein the cross-chain request is sent from a first computing device associated with a first guarantor, the digital document specifies a guarantee from the first guarantor and one or more predetermined conditions of executing the guarantee, and wherein the guarantee is made by the first guarantor to a beneficiary, and the digital document specifies one or more predetermined conditions of executing the guarantee.

At 2704, the blockchain node stores the cross-chain request and the cyphertext to a first blockchain associated with the first blockchain network based on performing a consensus algorithm. At 2706, the blockchain node receives a message from a second computing device for relaying information between the first blockchain network and the second blockchain network, the message includes a confirmation that the guarantee is accepted by the beneficiary and stored on a second blockchain associated with the second blockchain network. At 2708, the blockchain node updates a status of the guarantee to indicate that the guarantee has been voided on the first blockchain.

In some cases, the process 2700 further comprises, receiving, by the blockchain node, one or more ZKPs associated with the cyphertext of the digital document, wherein the one or more ZKPs are related to one or more values associated with the guarantee; and verifying that the one or more ZKPs are correct before storing the cyphertext to the first blockchain associated with the first blockchain network.

In some cases, the second computing device is at least one of (i) a blockchain node of the first blockchain network and the second blockchain network, or (ii) a blockchain node of a third blockchain network.

In some cases, the second computing device is a trusted device that supports a TEE or a secure multi-party computation. In some cases, the updating the status of the guarantee is performed in response to receiving a request to void the guarantee from the first computing device.

In some cases, the guarantee is in the form of a SBLC. In some cases, the guarantee specifies that the guarantor shall pay the beneficiary a predetermined amount when the one or more predetermined conditions of executing the guarantee are met.

In some cases, the guarantor is an offshore bank that serves the applicant, the representative of the beneficiary is an onshore bank that serves the beneficiary, and the predetermined amount is paid to the beneficiary through the onshore bank when the one or more predetermined conditions are met.

In some cases, the one or more predetermined conditions include one or more of default conditions, amendment conditions, cancelation conditions, effective date, and expiration date. In some cases, the one or more ZKPs includes one or more of a range proof and a zero test, and at least one of the one or more ZKPs is generated based on homomorphic encryption. In some cases, the cyphertext is encrypted using an encryption key derived based on a linear secret sharing scheme.

Figure 28:
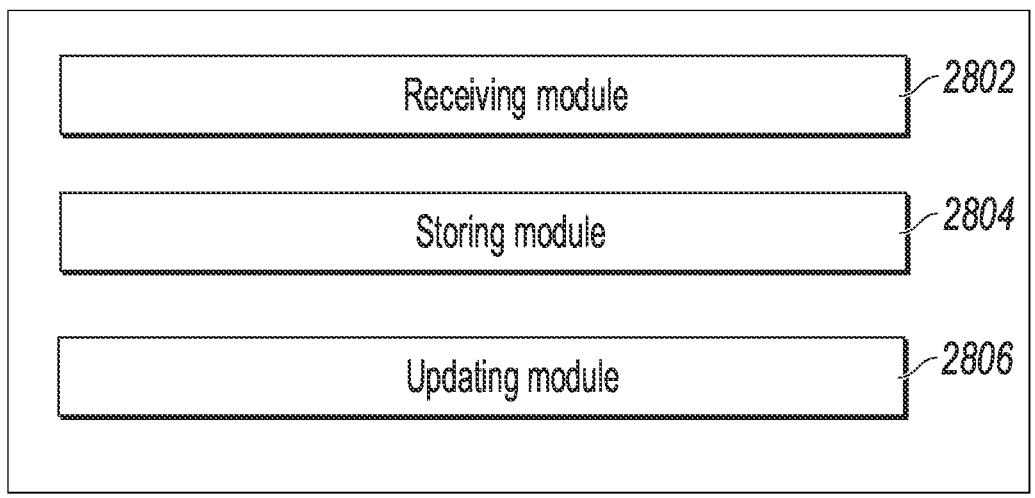
FIG. 28 depicts yet another example of modules of an apparatus in accordance with embodiments of this specification.

FIG. 28 is a diagram of yet another example of modules of an apparatus 2800 in accordance with embodiments of this specification. The apparatus 2800 can be an example of an embodiment of a blockchain. The apparatus 2800 can correspond to the embodiments described above, and the apparatus 2800 includes the following: a receiving module 2802 that receives, by a blockchain node of a first blockchain network, a cross-chain request for relaying a cyphertext of a digital document to a second blockchain network, wherein the cross-chain request is sent from a first computing device associated with a first guarantor, the digital document specifies a guarantee from the first guarantor and one or more predetermined conditions of executing the guarantee, and wherein the guarantee is made by the first guarantor to a beneficiary, and the digital document specifies one or more predetermined conditions of executing the guarantee; a storing module 2804 that stores the cross-chain request and the cyphertext to a first blockchain associated with the first blockchain network based on performing a consensus algorithm; the receiving module 2802 that receives a message from a second computing device for relaying information between the first blockchain network and the second blockchain network, the message includes a confirmation that the guarantee is accepted by the beneficiary and stored on a second blockchain associated with the second blockchain network; and an updating module 2806 that updates a status of the guarantee to indicate that the guarantee has been voided on the first blockchain.

In an optional embodiment, the apparatus 2800 further comprises, a receiving sub-module that receives, by the blockchain node, one or more ZKPs associated with the cyphertext of the digital document, wherein the one or more ZKPs are related to one or more values associated with the guarantee; and a verifying sub-module that verifies that the one or more ZKPs are correct before storing the cyphertext to the first blockchain associated with the first blockchain network.

In an optional embodiment, the second computing device is at least one of (i) a blockchain node of the first blockchain network and the second blockchain network, or (ii) a blockchain node of a third blockchain network.

In an optional embodiment, the second computing device is a trusted device that supports a TEE or a secure multi-party computation. In an optional embodiment, the updating the status of the guarantee is performed in response to receiving a request to void the guarantee from the first computing device.

In an optional embodiment, the guarantee is in the form of a SBLC. In an optional embodiment, the guarantee specifies that the guarantor shall pay the beneficiary a predetermined amount when the one or more predetermined conditions of executing the guarantee are met.

In an optional embodiment, the guarantor is an offshore bank that serves the applicant, the representative of the beneficiary is an onshore bank that serves the beneficiary, and the predetermined amount is paid to the beneficiary through the onshore bank when the one or more predetermined conditions are met.

In an optional embodiment, the one or more predetermined conditions include one or more of default conditions, amendment conditions, cancelation conditions, effective date, and expiration date. In an optional embodiment, the one or more ZKPs includes one or more of a range proof and a zero test, and at least one of the one or more ZKPs is generated based on homomorphic encryption. In an optional embodiment, the cyphertext is encrypted using an encryption key derived based on a linear secret sharing scheme.

The system, apparatus, module, or unit illustrated in the previous embodiments can be implemented by using a computer chip or an entity, or can be implemented by using a product having a certain function. A typical embodiment device is a computer, and the computer can be a personal computer, a laptop computer, a cellular phone, a camera phone, a smartphone, a personal digital assistant, a media player, a navigation device, an email receiving and sending device, a game console, a tablet computer, a wearable device, or any combination of these devices.

For an embodiment process of functions and roles of each module in the apparatus, references can be made to an embodiment process of corresponding steps in the previous method. Details are omitted here for simplicity.

Because an apparatus embodiment basically corresponds to a method embodiment, for related parts, references can be made to related descriptions in the method embodiment. The previously described apparatus embodiment is merely an example. The modules described as separate parts may or may not be physically separate, and parts displayed as modules may or may not be physical modules, may be located in one position, or may be distributed on a number of network modules. Some or all of the modules can be selected based on actual demands to achieve the objectives of the solutions of the specification. A person of ordinary skill in the art can understand and implement the embodiments of the present application without creative efforts.

Referring again to FIGS. 16, 18, 20, 22, 24, 26, and 28, it can be interpreted as illustrating an internal functional module and a structure of a computer system or a blockchain node. An execution body in essence can be an electronic device, and the electronic device includes the following: one or more processors; and one or more computer-readable memories configured to store an executable instruction of the one or more processors. In some embodiments, the one or more computer-readable memories are coupled to the one or more processors and have programming instructions stored thereon that are executable by the one or more processors to perform algorithms, methods, functions, processes, flows, and procedures, as described in this specification. This specification also provides one or more non-transitory computer-readable storage media coupled to one or more processors and having instructions stored thereon which, when executed by the one or more processors, cause the one or more processors to perform operations in accordance with embodiments of the methods provided herein.

This specification further provides a system for implementing the methods provided herein. The system includes one or more processors, and a computer-readable storage medium coupled to the one or more processors having instructions stored thereon which, when executed by the one or more processors, cause the one or more processors to perform operations in accordance with embodiments of the methods provided herein.

Embodiments of the subject matter and the actions and operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, e.g., one or more modules of computer program instructions, encoded on a computer program carrier, for execution by, or to control the operation of, data processing apparatus. For example, a computer program carrier can include one or more computer-readable storage media that have instructions encoded or stored thereon. The carrier may be a tangible non-transitory computer-readable medium, such as a magnetic, magneto optical, or optical disk, a solid state drive, a random access memory (RAM), a read-only memory (ROM), or other types of media. Alternatively, or in addition, the carrier may be an artificially generated propagated signal, e.g., a machine-generated electrical, optical, or electromagnetic signal that is generated to encode information for transmission to suitable receiver apparatus for execution by a data processing apparatus. The computer storage medium can be or be part of a machine-readable storage device, a machine-readable storage substrate, a random or serial access memory device, or a combination of one or more of them. A computer storage medium is not a propagated signal.

A computer program, which may also be referred to or described as a program, software, a software application, an app, a module, a software module, an engine, a script, or code, can be written in any form of programming language, including compiled or interpreted languages, or declarative or procedural languages; and it can be deployed in any form, including as a stand-alone program or as a module, component, engine, subroutine, or other unit suitable for executing in a computing environment, which environment may include one or more computers interconnected by a data communication network in one or more locations.

A computer program may, but need not, correspond to a file in a file system. A computer program can be stored in a portion of a file that holds other programs or data, e.g., one or more scripts stored in a markup language document, in a single file dedicated to the program in question, or in multiple coordinated files, e.g., files that store one or more modules, sub programs, or portions of code.

Processors for execution of a computer program include, by way of example, both general- and special-purpose microprocessors, and any one or more processors of any kind of digital computer. Generally, a processor will receive the instructions of the computer program for execution as well as data from a non-transitory computer-readable medium coupled to the processor.

The term "data processing apparatus" encompasses all kinds of apparatuses, devices, and machines for processing data, including by way of example a programmable processor, a computer, or multiple processors or computers. Data processing apparatus can include special-purpose logic circuitry, e.g., an FPGA (field programmable gate array), an ASIC (application specific integrated circuit), or a GPU (graphics processing unit). The apparatus can also include, in addition to hardware, code that creates an execution environment for computer programs, e.g., code that constitutes processor firmware, a protocol stack, a database management system, an operating system, or a combination of one or more of them.

The processes and logic flows described in this specification can be performed by one or more computers or processors executing one or more computer programs to perform operations by operating on input data and generating output. The processes and logic flows can also be performed by special-purpose logic circuitry, e.g., an FPGA, an ASIC, or a GPU, or by a combination of special-purpose logic circuitry and one or more programmed computers.

Computers suitable for the execution of a computer program can be based on general or special-purpose microprocessors or both, or any other kind of central processing unit. Generally, a central processing unit will receive instructions and data from a read only memory or a random access memory or both. Elements of a computer can include a central processing unit for executing instructions and one or more memory devices for storing instructions and data. The central processing unit and the memory can be supplemented by, or incorporated in, special-purpose logic circuitry.

Generally, a computer will also include, or be operatively coupled to receive data from or transfer data to one or more storage devices. The storage devices can be, for example, magnetic, magneto optical, or optical disks, solid state drives, or any other type of non-transitory, computer-readable media. However, a computer need not have such devices. Thus, a computer may be coupled to one or more storage devices, such as, one or more memories, that are local and/or remote. For example, a computer can include one or more local memories that are integral components of the computer, or the computer can be coupled to one or more remote memories that are in a cloud network. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Components can be "coupled to" each other by being commutatively such as electrically or optically connected to one another, either directly or via one or more intermediate components. Components can also be "coupled to" each other if one of the components is integrated into the other. For example, a storage component that is integrated into a processor (e.g., an L2 cache component) is "coupled to" the processor.

To provide for interaction with a user, embodiments of the subject matter described in this specification can be implemented on, or configured to communicate with, a computer having a display device, e.g., a LCD (liquid crystal display) monitor, for displaying information to the user, and an input device by which the user can provide input to the computer, e.g., a keyboard and a pointing device, e.g., a mouse, a trackball or touchpad. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser, or by interacting with an app running on a user device, e.g., a smartphone or electronic tablet. Also, a computer can interact with a user by sending text messages or other forms of message to a personal device, e.g., a smartphone that is running a messaging application, and receiving responsive messages from the user in return.

This specification uses the term "configured to" in connection with systems, apparatus, and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions. For special-purpose logic circuitry to be configured to perform particular operations or actions means that the circuitry has electronic logic that performs the operations or actions.

While this specification contains many specific embodiment details, these should not be construed as limitations on the scope of what is being claimed, which is defined by the claims themselves, but rather as descriptions of features that may be specific to particular embodiments. Certain features that are described in this specification in the context of separate embodiments can also be realized in combination in a single embodiment. Conversely, various features that are described in the context of a single embodiments can also be realized in multiple embodiments separately or in any suitable subcombination. Moreover, although features may be described above as acting in certain combinations and even initially be claimed as such, one or more features from a claimed combination can in some cases be excised from the combination, and the claim may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

The invention claimed is:

1. A computer-implemented method comprising:
receiving, by a blockchain node, a first cyphertext of a first digital document specifying a guarantee from a first computing device associated with at least a first guarantor and one or more zero-knowledge proofs (ZKPs) related to one or more values associated with the guarantee, wherein the guarantee is in a form of a standby letter of credit (SBLC) made by the first guarantor and a second guarantor to a beneficiary, and the guarantee specifies that the first guarantor and the second guarantor shall pay the beneficiary a predetermined amount in response to determining that one or more predetermined conditions of executing the guarantee are met;
verifying, by the blockchain node, that the one or more ZKPs are correct;
storing, by the blockchain node, the first cyphertext to a blockchain based on performing a consensus algorithm, in response to verifying that the one or more ZKPs are correct;
receiving, by the blockchain node, a first message from a second computing device associated with the beneficiary or a representative of the beneficiary, the first message comprising a request to modify the guarantee;
sending, by the blockchain node, a second message about the request to modify the guarantee to the first computing device; and
receiving, by the blockchain node, from the first computing device a second cyphertext of a second digital document specifying the guarantee, the second digital document representing a modified version of the first digital document in which modifications of the modified version are made based on the request.

2. The computer-implemented method of claim 1, further comprising:
storing, by the blockchain node, the second cyphertext to the blockchain based on performing the consensus algorithm;
receiving, by the blockchain node, a third message from the second computing device indicating an acceptance of the guarantee specified in the second digital document; and
modifying, by the blockchain node, the second cyphertext to update a status of the guarantee to indicate that the guarantee has been accepted by the beneficiary.

3. The computer-implemented method of claim 1, wherein the request to modify the guarantee is a request to modify the predetermined amount to a reduced amount that equals to the predetermined amount less a payment amount already paid to the beneficiary.

4. The computer-implemented method of claim 3, wherein the modified version of the first digital document comprises the reduced amount, and wherein the one or more predetermined conditions of executing the guarantee are specified in the first digital document.

5. The computer-implemented method of claim 3, wherein the first message further includes a ZKP associated with the reduced amount, and storing the second cyphertext is performed in response to successfully verifying the ZKP included in the first message.

6. The computer-implemented method of claim 1, wherein one or both of the first and second guarantor is an offshore bank that serves an applicant of the first digital document, and the predetermined amount is paid to the beneficiary through an onshore bank that serves the beneficiary when the one or more predetermined conditions of executing the guarantee are met.

7. The computer-implemented method of claim 1, wherein at least one of the one or more ZKPs is generated based on homomorphic encryption, and the one or more ZKPs includes one or more of a range proof and a zero test.

8. The computer-implemented method of claim 1, wherein an encryption key for encrypting the first digital document or the second digital document is derived based on a linear secret sharing scheme.

9. A computer-implemented system, comprising:
one or more computers; and
one or more computer memory devices interoperably coupled with the one or more computers and having tangible, non-transitory, machine-readable media storing one or more instructions that, when executed by the one or more computers, perform one or more operations comprising:
receiving, by a blockchain node, a first cyphertext of a first digital document specifying a guarantee from a first computing device associated with at least a first guarantor and one or more zero-knowledge proofs (ZKPs) related to one or more values associated with the guarantee, wherein the guarantee is in a form of a standby letter of credit (SBLC) made by the first guarantor and a second guarantor to a beneficiary, and the guarantee specifies that the first guarantor and the second guarantor shall pay the beneficiary a predetermined amount in response to determining that one or more predetermined conditions of executing the guarantee are met;
verifying, by the blockchain node, that the one or more ZKPs are correct;
storing, by the blockchain node, the first cyphertext to a blockchain based on performing a consensus algorithm, in response to verifying that the one or more ZKPs are correct;
receiving, by the blockchain node, a first message from a second computing device associated with the beneficiary or a representative of the beneficiary, the first message comprising a request to modify the guarantee;
sending, by the blockchain node, a second message about the request to modify the guarantee to the first computing device; and
receiving, by the blockchain node, from the first computing device a second cyphertext of a second digital document specifying the guarantee, the second digital document representing a modified version of the first digital document in which modifications of the modified version are made based on the request.

10. The computer-implemented system of claim 9, further comprising:
storing, by the blockchain node, the second cyphertext to the blockchain based on performing the consensus algorithm;
receiving, by the blockchain node, a third message from the second computing device indicating an acceptance of the guarantee specified in the second digital document; and
modifying, by the blockchain node, the second cyphertext to update a status of the guarantee to indicate that the guarantee has been accepted by the beneficiary.

11. The computer-implemented system of claim 9, wherein the request to modify the guarantee is a request to modify the predetermined amount to a reduced amount that equals to the predetermined amount less a payment amount already paid to the beneficiary.

12. The computer-implemented system of claim 11, wherein the modified version of the first digital document comprises the reduced amount, and wherein the one or more predetermined conditions of executing the guarantee are specified in the first digital document.

13. The computer-implemented system of claim 11, wherein the first message further includes a ZKP associated with the reduced amount, and storing the second cyphertext is performed in response to successfully verifying the ZKP included in the first message.

14. The computer-implemented system of claim 9, wherein one or both of the first and second guarantor is an offshore bank that serves an applicant of the first digital document, and the predetermined amount is paid to the beneficiary through an onshore bank that serves the beneficiary when the one or more predetermined conditions of executing the guarantee are met.

15. The computer-implemented system of claim 9, wherein the one or more predetermined conditions of executing the guarantee comprises one or more of: a default condition, amendment condition, cancelation condition, effective date, and expiration date.

16. The computer-implemented system of claim 9, wherein at least one of the one or more ZKPs is generated based on homomorphic encryption, and the one or more ZKPs includes one or more of a range proof and a zero test.

17. A non-transitory, computer-readable medium storing one or more instructions executable by a computer system to perform operations comprising:
receiving, by a blockchain node, a first cyphertext of a first digital document specifying a guarantee from a first computing device associated with at least a first guarantor and one or more zero-knowledge proofs (ZKPs) related to one or more values associated with the guarantee, wherein the guarantee is in a form of a standby letter of credit (SBLC) made by the first guarantor and a second guarantor to a beneficiary, and the guarantee specifies that the first guarantor and the second guarantor shall pay the beneficiary a predetermined amount in response to determining that one or more predetermined conditions of executing the guarantee are met;
verifying, by the blockchain node, that the one or more ZKPs are correct;

storing, by the blockchain node, the first cyphertext to a blockchain based on performing a consensus algorithm, in response to verifying that the one or more ZKPs are correct;

receiving, by the blockchain node, a first message from a second computing device associated with the beneficiary or a representative of the beneficiary, the first message comprising a request to modify the guarantee;

sending, by the blockchain node, a second message about the request to modify the guarantee to the first computing device; and receiving, by the blockchain node, from the first computing device a second cyphertext of a second digital document specifying the guarantee, the second digital document representing a modified version of the first digital document in which modifications of the modified version are made based on the request.

18. The non-transitory, computer-readable medium of claim 17, further comprising:

storing, by the blockchain node, the second cyphertext to the blockchain based on performing the consensus algorithm;

receiving, by the blockchain node, a third message from the second computing device indicating an acceptance of the guarantee specified in the second digital document; and modifying, by the blockchain node, the second cyphertext to update a status of the guarantee to indicate that the guarantee has been accepted by the beneficiary.

19. The non-transitory, computer-readable medium of claim 17, wherein the request to modify the guarantee is a request to modify the predetermined amount to a reduced amount that equals to the predetermined amount less a payment amount already paid to the beneficiary.

20. The non-transitory, computer-readable medium of claim 19, wherein the modified version of the first digital document comprises the reduced amount, and wherein the one or more predetermined conditions of executing the guarantee are specified in the first digital document.

* * * * *